(12) United States Patent
Gibson et al.

(10) Patent No.: US 10,546,180 B2
(45) Date of Patent: Jan. 28, 2020

(54) SYSTEM AND METHOD FOR PROVIDING AUTHENTIC SIGNATURES ON DEMAND

(71) Applicant: SYNGRAFII INC., Toronto (CA)

(72) Inventors: Thomas Matthew Mann Gibson, Toronto (CA); Ravi Vipool Balmukund Dave, Scarborough (CA)

(73) Assignee: SYNGRAFII INC., Toronto (CA)

( * ) Notice: Subject to any disclaimer, the term of this patent is extended or adjusted under 35 U.S.C. 154(b) by 102 days.

(21) Appl. No.: 15/768,186

(22) PCT Filed: Oct. 14, 2016

(86) PCT No.: PCT/CA2016/000260
§ 371 (c)(1),
(2) Date: Apr. 13, 2018

(87) PCT Pub. No.: WO2017/063075
PCT Pub. Date: Apr. 20, 2017

(65) Prior Publication Data
US 2018/0349676 A1    Dec. 6, 2018

Related U.S. Application Data

(60) Provisional application No. 62/242,573, filed on Oct. 16, 2015.

(51) Int. Cl.
*G06Q 30/06* (2012.01)
*G06K 9/00* (2006.01)

(52) U.S. Cl.
CPC ..... *G06K 9/00174* (2013.01); *G06K 9/00181* (2013.01); *G06Q 30/0621* (2013.01)

(58) Field of Classification Search
CPC combination set(s) only.
See application file for complete search history.

(56) References Cited

U.S. PATENT DOCUMENTS 5,544,255 A * 8/1996 Smithies ............ G06K 9/00154
382/119
6,082,774 A    7/2000 Schlauch
(Continued)

FOREIGN PATENT DOCUMENTS

CA    2806607 A1    2/2012

OTHER PUBLICATIONS

Canadian Intellectual Property Office, International Search Report and Written Opinion dated Jan. 10, 2017 in respect of PCT/CA2016/000260.

(Continued)

*Primary Examiner* — Tsung Yin Tsai
(74) *Attorney, Agent, or Firm* — Norton Rose Fulbright Canada LLP

(57) ABSTRACT

A system and method for generating a limited edition of a signed object for an artist are disclosed. The system may include: 1) an electronic database storing electronic data representative of a plurality of handwritten signatures and a plurality of handwritten numbers of the artist associated with an artist ID; 2) a signing component; and 3) a server comprising a processor configured to: a) detect or receive an object for signing; b) determine signature information regarding the object; c) determine and obtain a composition of a composite signature, the composite signature comprising a handwritten signature, the edition number associated with the object, and the total number of limited editions of the object; d) determine a location and a size for the composite signature; and e) apply the composite signature on the object, by the signing component, based on the determined location and size of the composite signature.

20 Claims, 53 Drawing Sheets

(56) References Cited

U.S. PATENT DOCUMENTS

| | | | |
|---|---|---|---|
| 7,352,899 B2* | 4/2008 | Loeb | G06F 17/214 178/18.01 |
| 7,493,634 B1 | 2/2009 | Daley | |
| 9,152,629 B1 | 10/2015 | Waters et al. | |
| 2004/0234097 A1 | 11/2004 | Verhoeven et al. | |
| 2005/0289061 A1* | 12/2005 | Kulakowski | G06Q 99/00 705/50 |
| 2010/0284033 A1 | 11/2010 | Popovic et al. | |
| 2011/0087365 A1 | 4/2011 | Arnoux | |
| 2011/0199631 A1* | 8/2011 | Healy | G06K 9/00154 358/1.14 |
| 2014/0036302 A1* | 2/2014 | Goldberg; Seth G | G06F 17/214 358/1.15 |
| 2015/0039133 A1 | 2/2015 | Popovic et al. | |

OTHER PUBLICATIONS

EPO, Extended European Search Report for EP Application No. 16854673.7 dated May 10, 2019.

* cited by examiner

ABSOLUT ART. Syngrafii

Home  Contact  Live Sign  Absolut Art ▾  MasterFile ▾

Hello Admin  Log off

« Create Project

Artist  [Select Artist ▾]

Project Name  [Project Name]

Project Art Name  [Project Art Name]

Number of Limited Editions  [Number of Limited Editions]

Project Name  [Notes – Optional]

[Create Project]  [Cancel]

LongPen | Absolut Art

Ravi Dave, welcome to the Absolut Art Signing application. Please stand by, your signing session will be initiated by the operator at the LongPen.

Status: Connected, Connection ID:24

Logged on to LongPen TWS Server

FIG. 36

LongPen Alignment Tool – Alignment using Small Steps

LongPen Alignment Tool – Alignment using Big Steps

LongPen Alignment Tool – Alignment using Small Steps

SYSTEM AND METHOD FOR PROVIDING AUTHENTIC SIGNATURES ON DEMAND

CROSS-REFERENCE TO RELATED APPLICATIONS

This application claims the benefit of U.S. Provisional Patent Application No. 62/242,573, filed on Oct. 16, 2015, the contents of which are hereby incorporated by reference in their entirety.

FIELD

The embodiments disclosed herein generally relate to technologies that allows an object to be signed remotely, and more particularly to systems and methods to provide an authentic signature on demand to an artist's or author's work.

INTRODUCTION

An artist may create objects, such as paintings, drawings, prints, sketches, and digital works, to be sold to customers. The object may be replicated without any restriction, may be replicated a limited number of times, or may be unique. There may be a marketing incentive to create limited editions of certain objects to increase commercial value of said objects.

An object may be any type of artist's works. For example, an object may be a book, a painting, a photograph, a piece of clothing, a drawing, a digital print, a sketch, and any digital work. An object may be digitally reproduced or printed on paper. An object may be hand-made or 3D-printed.

A limited edition of the object may be created by having the artist sign the object and enumerate the object with an edition number, thereby differentiating said limited edition of the object from other copies of the object. A total number of limited editions of the object may also be provided to further underscore the finite nature of the object.

However, several problems may be present as an artist attempts to sign and enumerate the objects. First, it may be cumbersome for an artist to sign each copy of the object as it may be time consuming and physically taxing, particularly if there are many copies of the object to sign. Second, the artist can make a mistake when writing their signature or provide an incorrect edition number on the object, which may diminish the value of the overall work. Third, the object may be retrieved or printed at a location away from the artist, such as at a printing press far away from the artist or in another country. It may be difficult and inefficient for the artist to travel great distances and to different locations to sign and enumerate the objects. Fourth, the object to be signed and enumerated by the artist may not yet be created, such as an object that will be retrieved or printed only after reception of a customer's confirmed order for the object. It may be challenging and inefficient for the artist to have to sign and enumerate the object each time it is ordered, especially if the orders arrive intermittently.

SUMMARY

In one embodiment, a system for generating a limited edition of a signed object for an artist is provided. The system may include: 1) an electronic database storing electronic data representative of a plurality of handwritten signatures and a plurality of handwritten numbers of the artist associated with an artist ID; 2) a signing component; and 3) a server comprising a processor configured to: a) receive or detect an object for signing; b) receive or determine signature information regarding the object, the signature information comprising the artist ID, an edition number associated with the object, and a total number of limited editions of the object; c) determine a composition of a composite signature, the composite signature comprising one handwritten signature of the plurality of handwritten signatures, the edition number associated with the object, and the total number of limited editions of the object; d) obtain the handwritten signature from the plurality of handwritten signatures stored in the database based on the artist ID; e) obtain a first handwritten number of the plurality of handwritten numbers corresponding to the edition number associated with the object, and a second handwritten number of the plurality of handwritten numbers corresponding to the total number of limited editions of the object based on the artist ID; f) determine a location and a size for the composite signature; and g) apply the composite signature on the object by the signing component, based on the determined location and size of the composite signature.

In one aspect, the signing component may be a plotting apparatus.

In another aspect, the plotting apparatus may include a plotting instrument and a plotting surface upon which the object may be placed for signing.

In another aspect, the system may be configured to permit a particular handwritten signature to be applied to only one limited edition of an object, for example, to prevent fraud.

In yet another aspect, the system may be configured to associate a handwritten signature to only one limited edition of an object.

In one embodiment, a method for generating a limited edition of a signed object for an artist is provided. The method may include: detecting an object placed on top of the plotting surface; receiving or determining signature information regarding the object, the signature information comprising the artist ID, an edition number associated with the object, and a total number of limited editions of the object; determining a composition of a composite signature, the composite signature comprising one handwritten signature of the plurality of handwritten signatures, the edition number associated with the object, and the total number of limited editions of the object; obtaining the handwritten signature from the plurality of handwritten signatures stored in the database based on the artist ID; obtaining a first handwritten number of the plurality of handwritten numbers corresponding to the edition number associated with the object, and a second handwritten number of the plurality of handwritten numbers corresponding to the total number of limited editions of the object based on the artist identification; determining a location and a size for the composite signature; and applying the composite signature on the object with a signing component, based on the determined location and size of the composite signature.

BRIEF DESCRIPTION OF THE FIGURES

In the drawings, embodiments of the present disclosure are illustrated by way of example. It is to be expressly understood that the description and drawings are only for the purpose of illustration and as an aid to understanding, and are not intended as a definition of the limits of the present disclosure.

Embodiments will now be described, by way of example only, with reference to the attached figures, wherein:

FIGS. 22-36 are screenshots of an example user interface for use with the systems and methods described herein.

DETAILED DESCRIPTION

Figure 1:
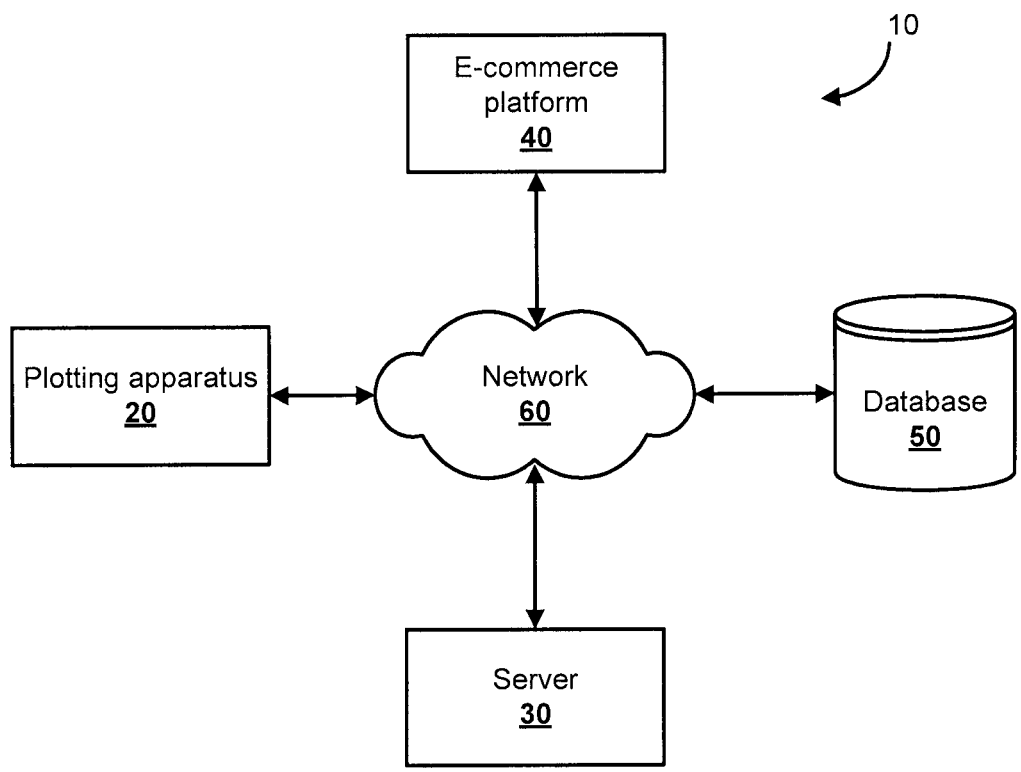
FIG. 1 provides a high-level block schematic of a system suitable for providing authentic signatures on demand, according to some example embodiments.

A system to provide authentic signatures on demand is disclosed herein.

The embodiments of the devices, systems, methods, or processes described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory ("CD-ROM"), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

FIG. 1 provides a high-level block schematic of system 10, according to some example embodiments. Embodiments disclosed herein may provide a system 10 that provides authentic signatures on demand. System 10 may be configured to collect or store electronic data representative of an artist's one or more handwritten signatures and handwritten numbers, and to plot a handwritten signature and one or more handwritten numbers onto a limited edition of an object. System 10 may be operable for said handwritten signatures and numbers to be collected, received, and/or stored, and may allow a limited edition of an object to be signed on demand, without the artist's physical presence being required at the time of signing of the object.

Even though an artist is being referred to throughout this disclosure, it is to be appreciated that the artist may be any person capable of producing a handwritten signature or number. The person may be a book author or a singer.

In one example embodiment, system 10 may provide a solution to sign a limited edition of an object on demand with a biomechanically or biometrically accurate digital or physical signature of an artist. The object may be a digital object, such as a digital photograph or a digital drawing, or a physical object, such as a painting. System 10 may be configured to include pre-determined and configurable rules configured to facilitate the signing of limited editions of an object on demand. For example, for each object, there may be a pre-determined number of limited editions of said object to be signed. System 10 may be able to record one or more handwritten signatures and handwritten numbers of an artist at a time and location that may be convenient to the artist. System 10 may extract various unique attributes of the artist's handwritten signatures and handwritten numbers, which may include the pressure, speed, acceleration, and cadence of the artist's handwritten strokes, such that system 10 may generate a biomechanically or biometrically accurate representation of an artist's handwritten signature or handwritten numbers. System 10 may generate or produce, on demand, a pre-determined number of limited editions of an object by placing a previously collected artist's handwritten signature and handwritten numbers on a digital object, or by physically plotting the handwritten signature and handwritten numbers on the object, such that each of an artist's handwritten signatures may be associated only with a single produced limited edition object.

In one embodiment, a biomechanically or biometrically accurate signature may be forensically verified based on the characteristics of the handwritten signature.

In one embodiment, a plurality of handwritten signatures of an artist may be stored in a database and collectively referred to as a "store of signatures" for the artist. Each of the handwritten signatures may be a unique signature that can be authenticated as the artist's handwriting. Each handwritten signature, as digitally stored, may be retrieved on demand for signing a single object. The object may be a digital object such as a digital paper, eBook or document, or the object may be a physical object such as a CD or book. The object may or may not have a limited edition run. A unique handwritten signature may be retrieved when needed to sign the object. The signing may be performed digitally, for example, the signing may be effected by a signing module or by clicking motion of a mouse, such that the handwritten signature is digitally printed on the object in an appropriate area. The signing may be performed by a physical plotting machine that engraves or plots the handwritten signature on a physical object.

In one embodiment, the digital object with the unique handwritten signature printed thereon may be stored in a database and may be printed one or more times.

In one embodiment, the store of signatures may become reduced or depleted each time a handwritten signature is applied to a digital or physical object, such that the same digital copy of a handwritten signature may not be used more than once to be applied to an object.

In one embodiment, system 10 may not generate or produce more limited editions of an object than a pre-determined number of limited editions of an object, such that the number of times an artist's handwritten signature(s) may be plotted cannot be greater than the pre-determined number of limited editions of an object.

A limited edition object may only be authenticated as a true limited edition by having at least a unique signature of the associated artist printed or digitally placed thereon. The unique signature may be a unique composite signature, where the composite signature includes a handwritten signature of the artist, as well as (1) a limited edition handwritten number and (2) a handwritten number indicating the total amount of limited editions that can be issued for said object (collectively, (1) and (2) may be referred to as "handwritten numbers"). For example, the composite signature may be "JANE DOE, 3/10". In other embodiments, the unique signature may be the handwritten signature on its own. In some embodiments, the handwritten signature may only be used or applied once.

The handwritten signature may be selected from a plurality of handwritten signatures previously collected from the artist, and stored on a database. The handwritten numbers may be previously collected from the artist and re-used. However, for each object, the same limited edition number (e.g. "3" from "3/10") may not be used more than once, as the unique aspect of a limited edition object dictates that only one #3 limited edition should be issued for an object, out of for example, a total of 10 limited editions that can ever be issued.

In one embodiment, system 10 may determine the limited edition number to be applied for the composite signature. For example, the system may choose the next available limited edition number associated with the object. For instance, if two limited edition numbers have already been previously used and printed, as "1" and "2", then the next available limited edition number would be three "3", provided that this number does not exceed the total number of limited editions that can be issued for the object.

In another embodiment, the system may determine, or may allow an operator or an artist to choose any available limited edition number value to apply to the object. For example, if two limited edition numbers have already been previously used and printed, as "1" and "2", then the system may determine any one of "3" to "10" (e.g. "5") as the appropriate limited edition number, provided that this number does not exceed the total number of limited editions that can be issued for the object. Once selected to be associated with an object for production, the same limited edition number may not be used again.

For example, a customer may request for a limited edition of an object with the limited edition number "7", even though only two limited editions have been issued thus far. As long as the number "7" has not been used, and that it is less than the total number of limited editions that can be issued for the object, then the system may allow the use of "7" as a limited edition number for the production of the limited edition object. This feature allows customers or artists to further customize the limited edition objects as appropriate, such as when the customer may be interested in a particular serial item, for example because they have been collecting limited editions with a particular number; or when a particular number may have some significance or value for the customer, for example as the customer's lucky number or month of birth.

In one embodiment, when a handwritten signature has been selected and applied to a limited edition object, the exact same digital copy of the handwritten signature may not be used again for that class of object, or another object.

In another embodiment, when a handwritten signature has been selected and applied to a limited edition object, the exact same digital copy of said handwritten signature may only be used again for a limited edition of a different object, In yet another embodiment, a digital copy of a handwritten signature may be re-used for any limited edition object, provided that the handwritten signature is applied, printed, or plotted with a unique limited edition number, so as to create a unique composite signature, as described herein.

In one embodiment, the pre-determined number of limited editions of an object may be dependent on the current number of handwritten signatures available for signing, as stored in database 50. For example, the pre-determined number of limited editions of an object at any given time may not exceed the current number of handwritten signatures available for signing as stored in database 50.

In some embodiments, system 10 may authenticate the limited edition of an object plotted with an artist's handwritten signature based on information relating to the biometric characteristics of an artist's handwritten signature, for example, the pressure, speed, acceleration, and cadence of the artist's handwritten strokes.

The artist may provide their handwritten signatures and handwritten numbers on a device, for example, a tablet, in communication with system 10, which may have a pressure-sensitive screen that may receive the artist's handwritten signatures and handwritten numbers. The device may convert the artist's handwritten signatures and handwritten numbers into electronic signals that may be stored in database 50.

The number of times an artist's handwritten signature may be plotted by system 10 on a limited edition of an object may be limited by a pre-determined number of limited editions of an object to be generated. For example, the artist may provide one handwritten signature to system 10, which system 10 may plot on each of the pre-determined number of limited editions of an object, but not more times than the pre-determined number of limited editions of an object. As another example, the artist may provide a number of handwritten signatures to system 10, but not more than the pre-determined number of limited editions of an object, and system 10 may use each of the artist's handwritten signatures only once to plot on one limited edition of an object.

System 10 may provide a biomechanically or biometrically accurate digital representation of an artist's handwritten signature and handwritten numbers on a digital object, or system 10 may plot a biometrically accurate physical representation of an artist's handwritten signature and handwritten numbers on a physical object.

Referring back to FIG. 1, In one example embodiment, system 10 may capture, receive or store an artist's one or more handwritten signatures and handwritten numbers. The artist's handwritten signatures and handwritten numbers may be obtained by receiving, from a device, electronic data representative of the artist's handwritten signature and handwritten numbers. The device may be a device proximate to the artist. For example, the device may be a tablet device with a touch screen. The artist may use the tablet device to record and transmit digital copies of his or her handwritten signatures and handwritten numbers to system 10.

Figure 3:
FIG. 3 is an example of a composite signature, containing an artist's signature, an edition number, and a total number of limited editions of an object.
Figure 4:
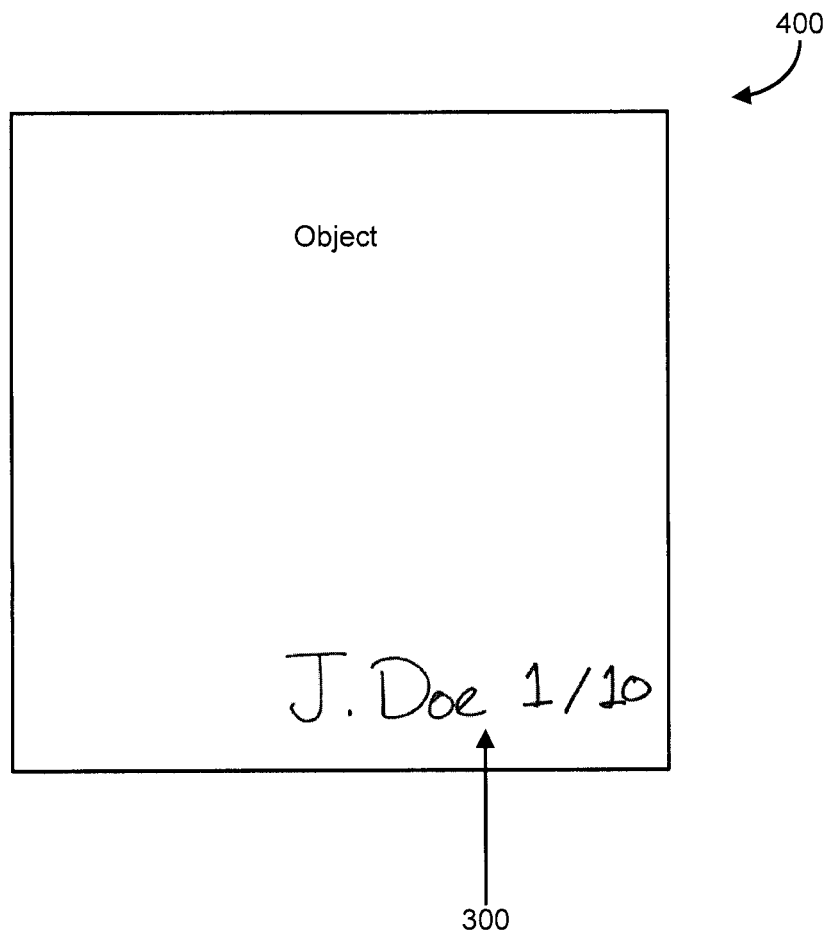
FIG. 4 is an example of a limited edition of an object with a composite signature plotted by a system suitable for providing authentic signatures on demand.

When a limited edition of an object is purchased by a customer at e-commerce platform 40, the confirmed order may be sent to system 10, which may "release" a limited edition of the purchased object for signing. As shown in FIG. 3, system 10 may plot a composite signature 300, which may include an artist signature 310, a limited edition (or simply "edition") number 320, and a total number of limited editions 330 of the object. FIG. 4 shows an example of a limited edition object 400, having a composite signature 300 plotted thereon.

Referring back to FIG. 1, system 10 may comprise a plotting apparatus 20, a server 30, an e-commerce platform 40, a database 50 and a network 60.

In one embodiment, signing component 20 may be a digital signing module in communication with, or as part of, server 30. Signing component 20 may be operable to apply a digital copy of a handwritten signature to a digital object, such as a digital eBook, a digital document, or a digital video or audio file.

In one embodiment, the plotting apparatus 20 is a signing component.

Figure 2:
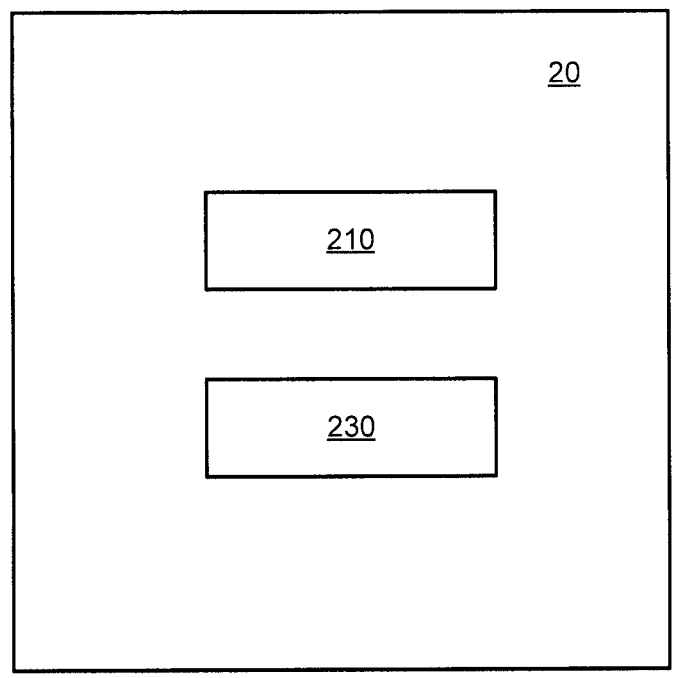
FIG. 2 provides a high-level block schematic of a plotting apparatus for plotting on an object.

In some embodiments, plotting apparatus 20 may include a plotting instrument 210 and a plotting surface 230, as shown in FIG. 2. In some embodiments, plotting apparatus 20 may be a plotting apparatus that facilitates the plotting of a signature and operable to replicate or approximate the pressure, speed, acceleration, and cadence of the original handwritten signature in plotting the handwritten signature, for example, the LongPen™ plotting apparatus as disclosed in U.S. Pat. No. 8,867,062 B2, which is herein incorporated by reference in its entirety. Plotting instrument 210 may be configured to engrave or print a selected handwritten signature onto an object in ink, graphite, clay, crayon, or any other suitable material.

System 10 may be comprised of one or more servers 30 having one or more processors, operating in conjunction with one or more computer-readable storage media, configured to provide backend services, such as data processing, data storage, data backup, data hosting, among others. Each of these subsystems may be implemented using one or more modules comprising instruction sets executed on one or more processors.

Server 30 may be configured to receive electronic signals representative of handwritten signatures and handwritten numbers. Server 30 may transmit electronic signals representative of handwritten signatures and handwritten numbers of an artist to database 50 to be stored. Server 30 may be in communication with, and control plotting apparatus 20 through a controller module in server 30. Server 30 may cause plotting apparatus 20 to plot a composite signature 300 on an object placed on top of plotting surface 230.

In some embodiments, server 30 may receive and/or transmit data from external systems, databases or applications over network 60.

In some embodiments, based on a customer's order for a limited edition of an object created by an artist, server 30 may compose composite signature 300, which may comprise artist signature 310, limited edition number 320, and total number of limited editions 330 of the object, and cause plotting apparatus 20 to engrave or print (collectively "plot") composite signature 300 onto the limited edition of the object. The plotting apparatus 20 may be configured to plot the composite signature 300 in ink, pencil, crayon, pastel, or any other suitable material.

System 10 may include e-commerce platform 40 configured to facilitate the navigating, browsing, reviewing, purchasing, making payment for, and confirming orders of the available inventory of objects. For example, e-commerce platform 40 may be a website that may allow a customer to navigate or discover the available inventory of objects, review the objects, select the number of objects to purchase, and purchase the object(s). A customer may navigate e-commerce platform 40 to discover available objects to purchase. The objects available to be purchased on e-commerce platform 40 may include objects plotted with system 10 or objects not plotted with system 10. The objects plotted with system 10 may be unique or may have a certain number of limited editions. A consumer may purchase multiple limited editions of an object, and may also purchase a limited edition of two or more objects. In some embodiments, e-commerce platform 40 may be configured to receive order information from the customer and process payment information, and may transmit confirmed order information to server 30 such that the object or objects in the order may be prepared for further processing, such as printing, signature plotting, and/or shipment.

In some embodiments, e-commerce platform 40 may be configured to facilitate the navigation or discovery of the objects based on the interests of the customer or the ultimate recipient of the object.

In one embodiment, e-commerce platform 40 may be operable to review an order for compliance with limited edition rules prior to the payment stage. For example, the platform 40 may check the total number of limited editions of a particular object purchased in an order with a pre-determined total number of limited editions available for purchase or production. If the number of order exceeds the pre-determined total number of limited editions available, platform 40 may be operable to modify or reject the order.

In another embodiment, the platform 40 may check the total number of limited editions of a particular object purchased in an order with a current number of handwritten signatures as stored in database 50, in accordance with a rule that each handwritten signature may only be used once, for a single limited edition object. If the number of order exceeds the current number of handwritten signatures, platform 40 may be operable to modify or reject the order.

For example, server 30 may receive a customer's confirmed order for a limited edition of an object created by an artist from e-commerce platform 40. The confirmed order may include information such as customer information (e.g. name, delivery address, payment method), artist information (e.g. artist ID, artist name) and art information (e.g. art ID, size and dimension of art work, material, frames). Based on the artist and art information, server 30 may retrieve the artist's handwritten signatures and handwritten numbers from database 50. For example, based on the artist ID, server 30 may be configured to locate a plurality of handwritten signatures in a "signature inventory" stored on database 50. For another example, based on art ID, server 30 may retrieve the dimensions and size of the object, as well as the material (e.g. glossy or matte paper) on which it is to be printed or reproduced. Each order may include one or more pieces of purchased objects.

Database 50 may include various types of non-transitory computer readable media, and may, in some embodiments, be a distributed networking implementation, such as a cloud computing implementation. The data storage may include various types of databases and/or storage media, such as SQL servers, flat files, Microsoft Excel™ files, etc. Information may be stored as records and may, in some embodiments, have one or more relationships defined between various records. In some embodiments, the data storage may preprocess and/or transform, extract or load the data for data mining and/or data warehousing purposes.

Database 50 may include a variety of data from a plurality of data sources. In some embodiments, the data may include or be linked to one or more artist IDs. An artist ID may be associated with an artist, and may be linked to additional data fields such as a name and contact information for the artist, one or more handwritten signatures and handwritten numbers of the artist, and/or an art ID or a plurality of art IDs. An art ID may be associated with an artist's work or object, and may be linked to information associated with the object's size, number of editions that have been used or sold, number of remaining edition numbers, information associated with an appropriate location to plot artist signature 310, limited edition number 320, total number of limited editions 330 of the object, or composite signature 300, and/or the number of limited editions of the object that may still be available.

In some embodiments, there are a plurality of databases 50 in system 10.

Network 60 may be any type of network, including, but not limited to, the internet, various intranets, wireless connections, wired connections, or the like.

In some embodiments, server 30 may receive electronic signals representative of an artist's handwritten signatures and handwritten numbers. The electronic signals representative of the artist's handwritten signatures and handwritten numbers may be communicated to database 50 via network 60 and may be stored in database 50. The artist's handwritten signatures and handwritten numbers may be stored in database 50 as part of the artist ID. E-commerce platform 40 may receive order information from a customer. E-commerce platform 40 may process the customer's payment and confirm the customer's order. E-commerce platform 40 may communicate the customer's confirmed order to server 30 via network 60 with an order ID associated with the customer's order. The order ID may include an art ID associated with the ordered objects, the amount of objects ordered, payment information, and/or shipping information. Server 30 may associate the art ID in the order ID received from e-commerce platform 40 with an artist ID stored in database 50 to determine a composition of composite signature 300, which may include artist signature 310, limited edition number 320, and total number of limited editions 330, as shown in FIG. 3. Server 30 may obtain artist signature 310, edition number 320, and total number of limited editions 330 from database 50 to compose composite signature 300. Server may determine a location and size to plot composite signature 300 on the object based on the object's art ID. Server 30 may communicate to plotting apparatus 20 via network 60 to plot composite signature 300 on the object.

Plotting apparatus 20 may be controlled by software. In some embodiments, the software controlling plotting apparatus 20 may be a controller application.

In some embodiments, artist signature 310 may be a first initial of the artist and the full last name of the artist, the initials of the artist, the full name of the artist, the full signature of the artist, or any mark that the artist chooses to associate with the limited edition of the object.

In another embodiment, limited edition number 320 and total number of limited editions 330 may be any number.

In one embodiment, server 30 may determine any available limited edition number value to apply to the object. For example, if two limited edition numbers have already been previously used and printed, as "1" and "2", then the system may determine any one of "3" to "10" (e.g. "5") as the appropriate limited edition number, provided that this number does not exceed the total number of limited editions that can be issued for the object. Once selected to be associated with an object for production, the same limited edition number may not be used again.

For example, a customer may request for a limited edition of an object with the limited edition number "7", even though only two limited editions have been issued thus far. As long as the number "7" has not been used, and that it is less than the total number of limited editions that can be issued for the object, then the system may use "7" as a limited edition number for the production of the limited edition object. This feature may allow customers or artists to further customize the limited edition objects as appropriate, such as when the customer may be interested in a particular serial item, for example because they have been collecting limited editions with a particular number; or when a particular number may have some significance or value for the customer, for example as the customer's lucky number or month of birth.

In yet another embodiment, composite signature 300 may be a combination of artist signature 310, limited edition number 320, and/or total number of limited editions 330.

The electronic signals representative of the artist's handwritten signatures and handwritten numbers may be stored in database 50 as an inventory of the artist's handwritten signatures and handwritten numbers, which may allow objects that may be retrieved or printed to be plotted on demand, for example, after the collection of the electronic signals representative of the artist's handwritten signatures and handwritten numbers.

FIG. 4 is an example illustration of a limited edition object 400 with composite signature 300 plotted onto the lower right section of limited edition object 400 by plotting apparatus 20. In some embodiments, composite signature 300 may be plotted on any area of limited edition object 400. In some embodiments, composite signature 300 may be plotted on an area of limited edition object 400 based on the art ID of limited edition object 400.

In some embodiments, limited edition object 400 may be a painting, drawing, print, sketch, and/or a digital work.

In one embodiment, a stored handwritten signature may be a biomechanical or biometric signature. The signature may be applied to a digital document (e.g. PDF document) associated with certain properties. A timestamp including date and time of application of signature may be recorded in metadata of the document, or in a MasterFile™. The document may be part of a unique transaction which becomes effective or sealed by application of said biomechanical or biometric signature. The transaction then may be referred to as a secure transaction verifiable with a unique signature and metadata.

Figure 5:
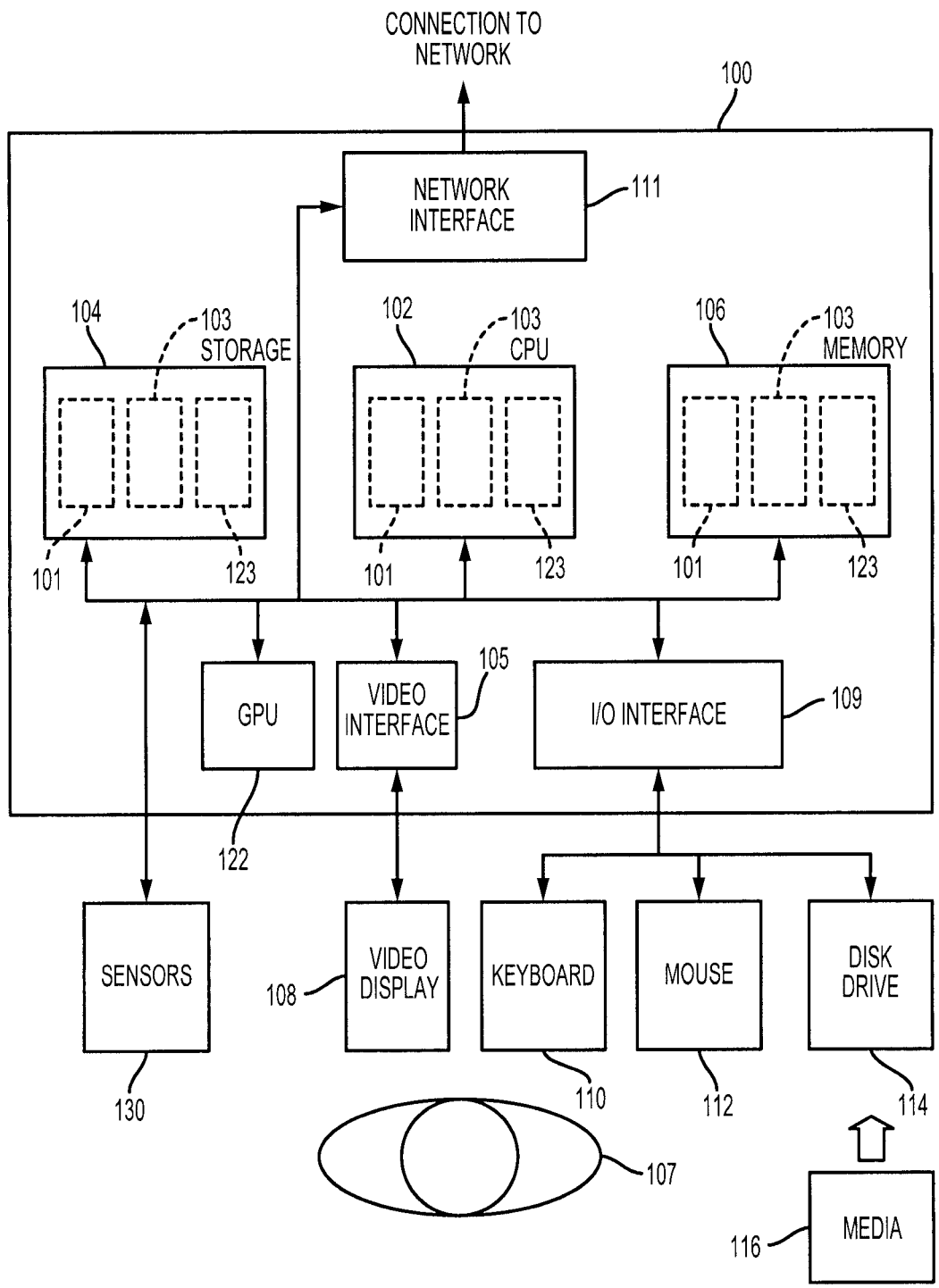
FIG. 5 is an illustrative diagram providing computer hardware and software for implementation of certain aspects, as detailed in the description.

The present system and method may be practiced in various embodiments. A suitably configured computer device, and associated communications networks, devices, software and firmware may provide a platform for enabling one or more embodiments as described above. By way of example, FIG. 5 shows a computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit ("GPU") 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

Computing device 100 is operable to register and authenticate users (using a login, unique identifier, and password for example) prior to providing access to applications, a local network, network resources, other networks and network security devices. Computing devices 100 may serve one user or multiple users.

Figure 6:
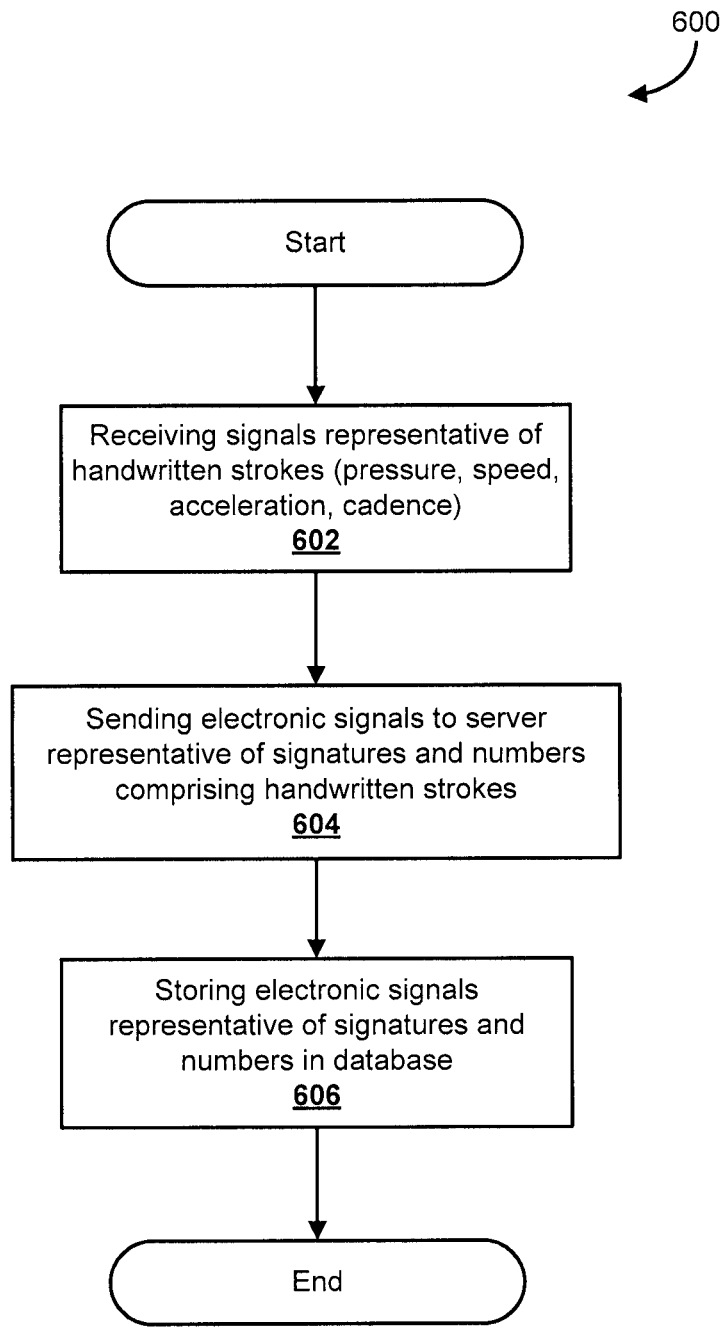
FIG. 6 is a flow chart illustrating an example method for receiving electronic signals representative of an artist's handwritten signature and handwritten numbers.

FIG. 6 illustrates a flowchart of an example method 600 for receiving electronic signals representative of an artist's handwritten signature and handwritten numbers representative of the artist's handwritten strokes. System 10 may carry out method 600 in its entirety or in part to collect electronic signals representative of an artist's signature and numbers representative of the artist's handwritten strokes.

For example, server 30 of system 10 may be used to receive at 602, from a device, electronic signals representative of the artist's handwritten signatures and handwritten numbers comprising the artist's handwritten strokes, which may include electronic signals representative of the pressure, speed, acceleration and cadence of the handwritten strokes, send, at 604, electronic signals representative of the artist's handwritten signatures and handwritten numbers comprising the artist's handwritten strokes, and database 50 may store, at 606, electronic signals representative of the artist's handwritten signatures and handwritten numbers.

In some embodiments, system 10 may be in communication with a device such as a computer or a tablet, which may transmit, to server 30, electronic signals representative of the artist's handwritten signatures and handwritten numbers comprising the artist's handwritten strokes. For example, the artist may provide one or more handwritten signatures and/or handwritten numbers by writing said signatures and/or numbers on a writing pad or a screen of the device, which may be configured to record and store all strokes sensed from the writing pad or screen, and transmit the strokes in real time or near real time to server 30.

In some embodiments, the device into which the artist provides their handwritten signatures and handwritten numbers is a tablet with a writing instrument such as a stylus. The artist may record their handwritten signatures and handwritten numbers on the tablet, for example, by using a writing instrument.

In some embodiments, the tablet may have a touch screen that is configured to sense, detect, or determine the pressure, speed, acceleration and cadence of an artist's writing strokes as the artist is writing their handwritten signatures and handwritten numbers with the tablet's stylus. The tablet may convert the contact between the stylus and the touch screen into electronic signals representative of the artist's handwritten signature and handwritten numbers. Said contact between the stylus and the touch screen may vary in at least pressure, angle and speed depending on various handwriting characteristics, such as a force, angle, speed, acceleration, as applied by a stylus-holder (e.g. artist or author). The touch screen or writing pad of the tablet may be sensitive to said handwriting characteristics as to be able to detect and record any changes in each characteristic.

In one embodiment, a device, which may be a tablet, and a corresponding user application for signature collection on the device, is provided. A version of the user application for signature collection may be configured to provide the functionality to record and store an artist's handwritten signatures, numbers "0-9" and the character "/" in the artist's own handwriting. These stored handwritten signatures and numbers may be retrieved on demand at a printing or production facility through the user application for signature collection. Server 30 may cause plotting apparatus 20 to plot the handwritten signatures and limited edition markings in the artist's handwriting.

At the time when an artist's signature is recorded by the tablet, the number of limited editions for a particular object or the number of objects to be retrieved or printed in the future may be unknown or undetermined. The tablet and the corresponding user application for signature collection may enable an artist to sign a pre-determined amount of their signatures and numbers separately. Once server 30 has determined that a limited edition of an object is to be produced, for example, when the limited edition object is released, server 30 of system 10 may allocate a specified number of artist signatures 310 for a particular run of limited editions of the object through the creation of a project associated with a project ID. The project ID may be linked to a plurality of data fields. For example, the data fields may be one or more of: artist ID, the art ID, miscellaneous note, expected delivery date and time. When server 30 recalls artist signature 310 on demand from database 50, the appropriate edition number 320 and total number of limited editions 330 may be appended and merged to artist signature 310 in order to create composite signature 300 including a limited edition number 320, as shown in FIG. 3.

The composite signature 300 may be unique, partially due to the limited edition number 320 being selected. For each object with a limited edition run, only a single piece of the object may be printed with a unique composite signature 300.

In some embodiments, artist signature 310 may not be used more than once. The handwritten numbers from the artist may be recorded only once and may be reused.

In some embodiments, an administrator of system 10 may generate a signature capture request on a server, for example server 30. Once such a signature capture request is generated by the administrator, an artist may log into a user application for signature collection through a tablet to record their signature and numbers. If this is the first time the artist has logged into the user application for signature collection, the artist may need to accept a privacy notice and/or a user agreement to use the user application.

Server 30 may check if an artist has recorded their numbers (e.g. 0-9 and /) by reviewing the artist ID associated with the artist. If the artist has not recorded their numbers, a notification may be shown and the Artist may have to sign the numbers one by one. Once server 30 has saved the numbers, the signature requests may be shown and the artist may see how many signatures are needed. The artist may be able to record their signature one by one. The user application may be closed at any time and the artist may be able to continue where he or she left off at any time by logging into server 30.

Figure 8:
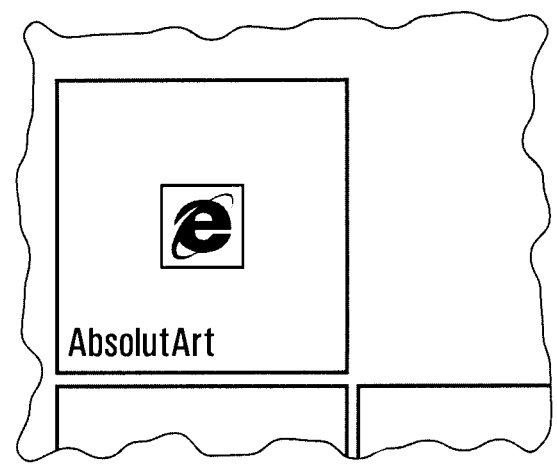
FIG. 8 is an example of a shortcut for a user application on a device.

FIG. 8 is an example of a shortcut for a user application on a device. In some embodiments, a user application for signature collection may be launched by opening a menu as shown on a device, for example the Start menu on a tablet, and by clicking on a shortcut for the user application, as illustrated in FIG. 8.

Figure 9:
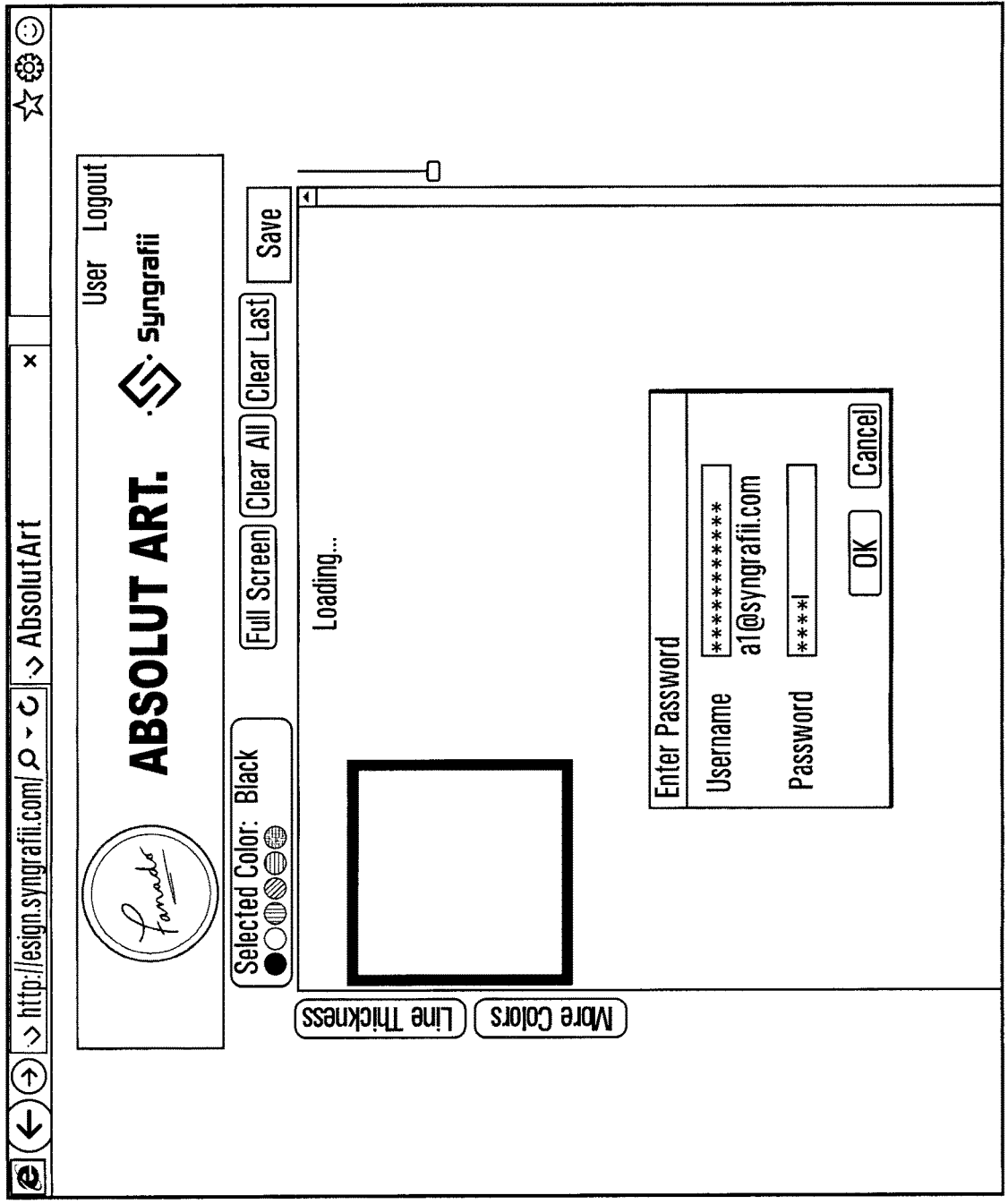
FIG. 9 is an example of a login user interface on a device.

FIG. 9 is an example of a login user interface on a device. In some embodiments, once the user application is launched, the artist may have to enter a username and password in order to log in, as shown in FIG. 9. In some embodiments, the artist may select their username and password.

Figure 10:
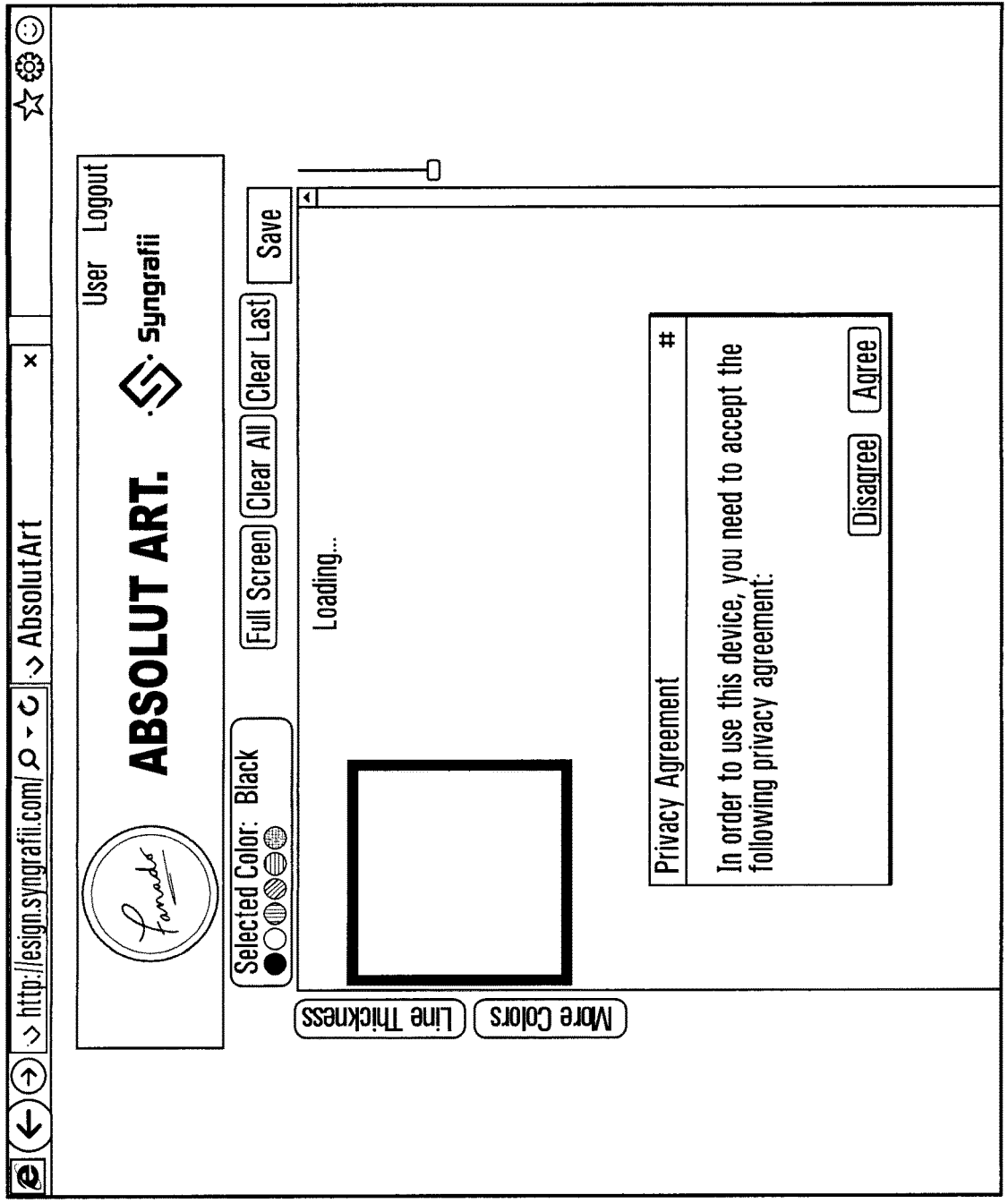
FIG. 10 is an example screenshot of a user interface containing a privacy notice.

FIG. 10 is an example screenshot of a user interface containing a privacy notice. If this is the first time the artist has logged into the user application, the artist may need to accept a privacy notice and/or a user agreement to use the user application, as shown in FIG. 10.

Figure 11:
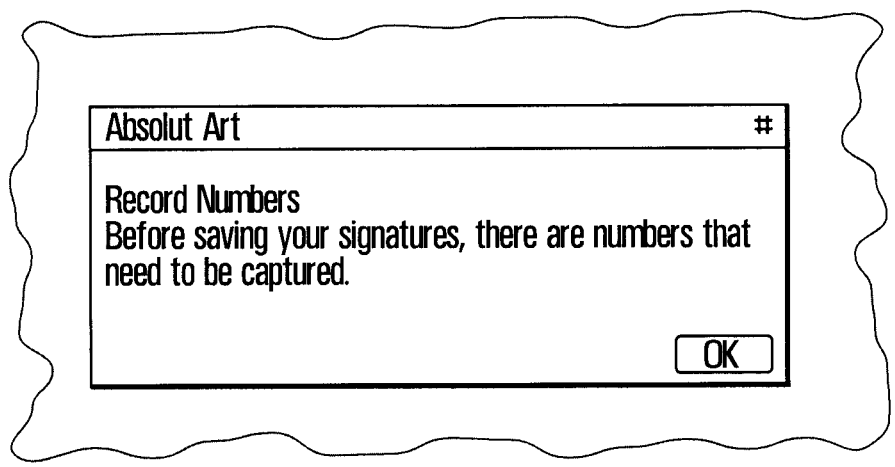
FIG. 11 is an example of a prompt which may be presented to the user if handwritten numbers are required.

When the user has logged into the user application, server 30 may check if the artist's handwritten numbers have been collected. If the artist's handwritten numbers have not been collected, a prompt, for example a prompt as illustrated in FIG. 11, may be shown by the user application to notify the artist that the handwritten numbers need to be collected.

Figure 12:
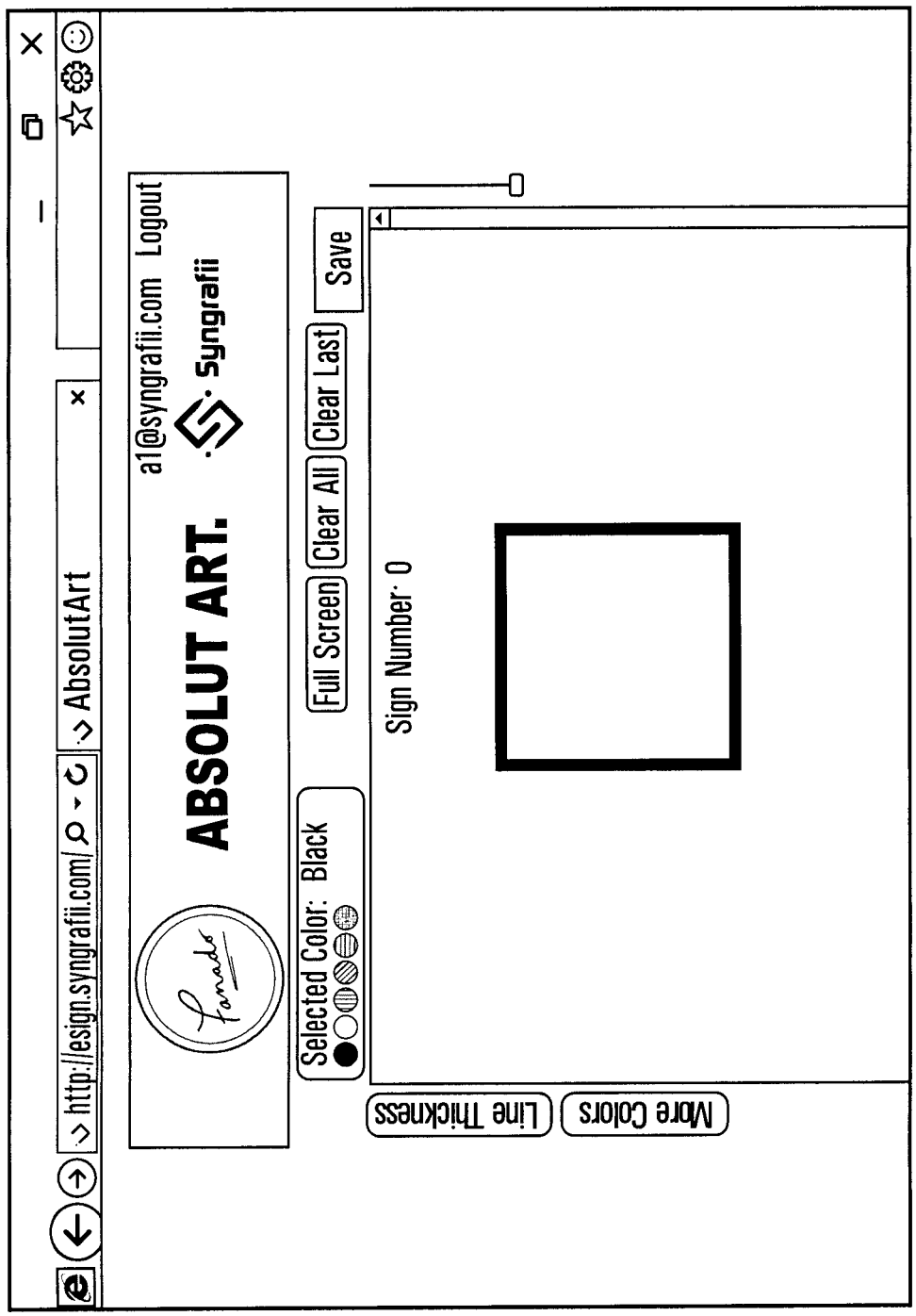
FIG. 12 is an example screenshot containing a signing area in which a user can enter a handwritten number.

If the artist's handwritten numbers have not been collected, the user application for signature collection may display what handwritten number or handwritten numbers needs to be collected from the user, as shown in FIG. 12.

Figure 13:
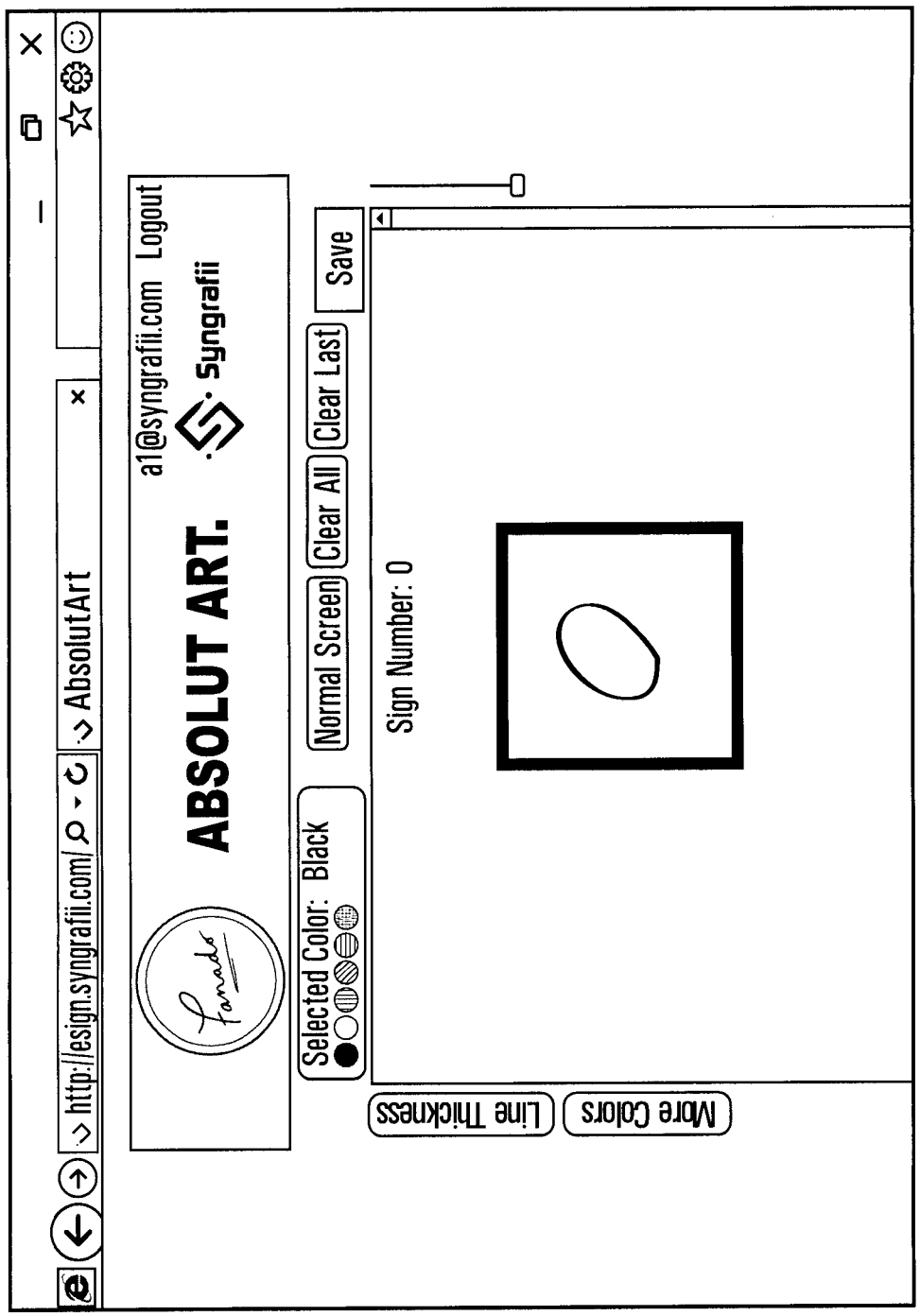
FIG. 13 is an example screenshot of the interface of FIG. 12 after a user has entered a number into the signing area.

In one embodiment, the artist may record their handwritten numbers on the device, for example the tablet, with a writing instrument, for example a stylus. As shown in FIG. 13, the user application may display a signing box or signing area that presents a boundary as to where the artist should sign on the screen of the device. The screen may be a touch screen that is operable to receive signals representing strokes and points through contact with a stylus. The user application may display a label that indicates the handwritten number to be provided by the artist. The artist may use the stylus of the device to sign the handwritten numbers as shown in the label above the signing box, as shown in FIG. 13.

In some embodiments, the user application for signature collection may be used in a setting such that the user interface, as well as the signing box, is at its largest, such as in full screen mode. The artist may click on a button displayed by the user application, for example a "Full Screen" button, as shown in FIG. 12, in order to cause the user interface to expand and fill the screen of the device. The artist may return the display of the user application to its default mode by clicking on a button displayed by the user application, for example a "Normal Screen" button, as shown in FIG. 13.

The user interface may provide certain editing and saving functions for the user to edit or save their handwritten numbers. As shown in FIG. 13, the user application for signature collection may display buttons at the top of the user application so the artist may trigger certain editing and saving functions. For example, a "Clear All" button may be displayed by the user application to allow the artist to clear all the current annotations in the signature or number box, a "Clear Last" button may be displayed by the user application to clear the last annotation that was applied, and a "Save" button may be displayed by the user application to save and send a desired handwritten number or signature to server 30.

Figure 14:
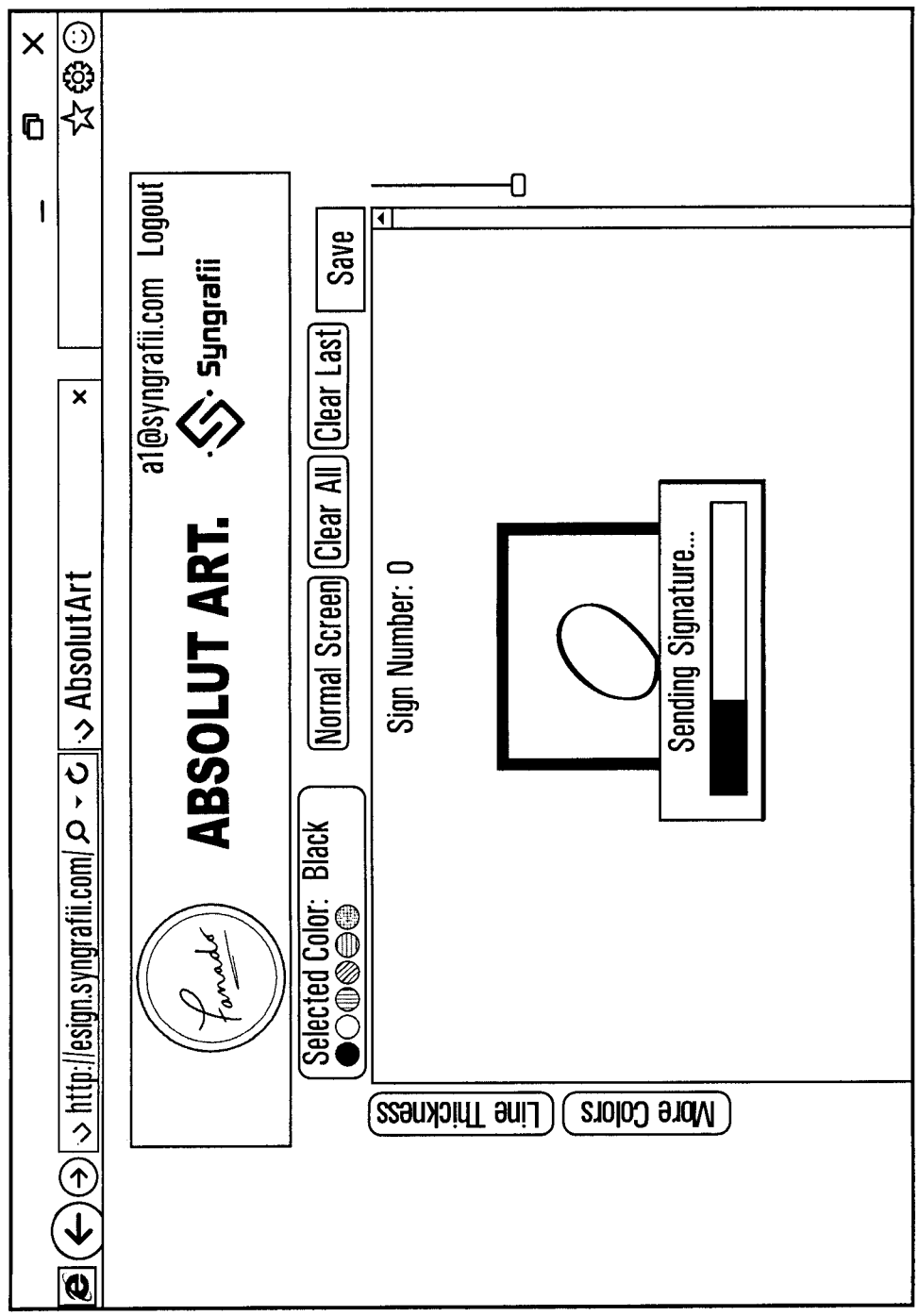
FIG. 14 is an example screenshot of the interface of FIG. 13 in which a prompt is displayed signifying that the number is being saved.

While a handwritten number is being transmitted to and stored by server 30, the user application may display a prompt that the handwritten number is being saved, as shown in FIG. 14.

Figure 15:
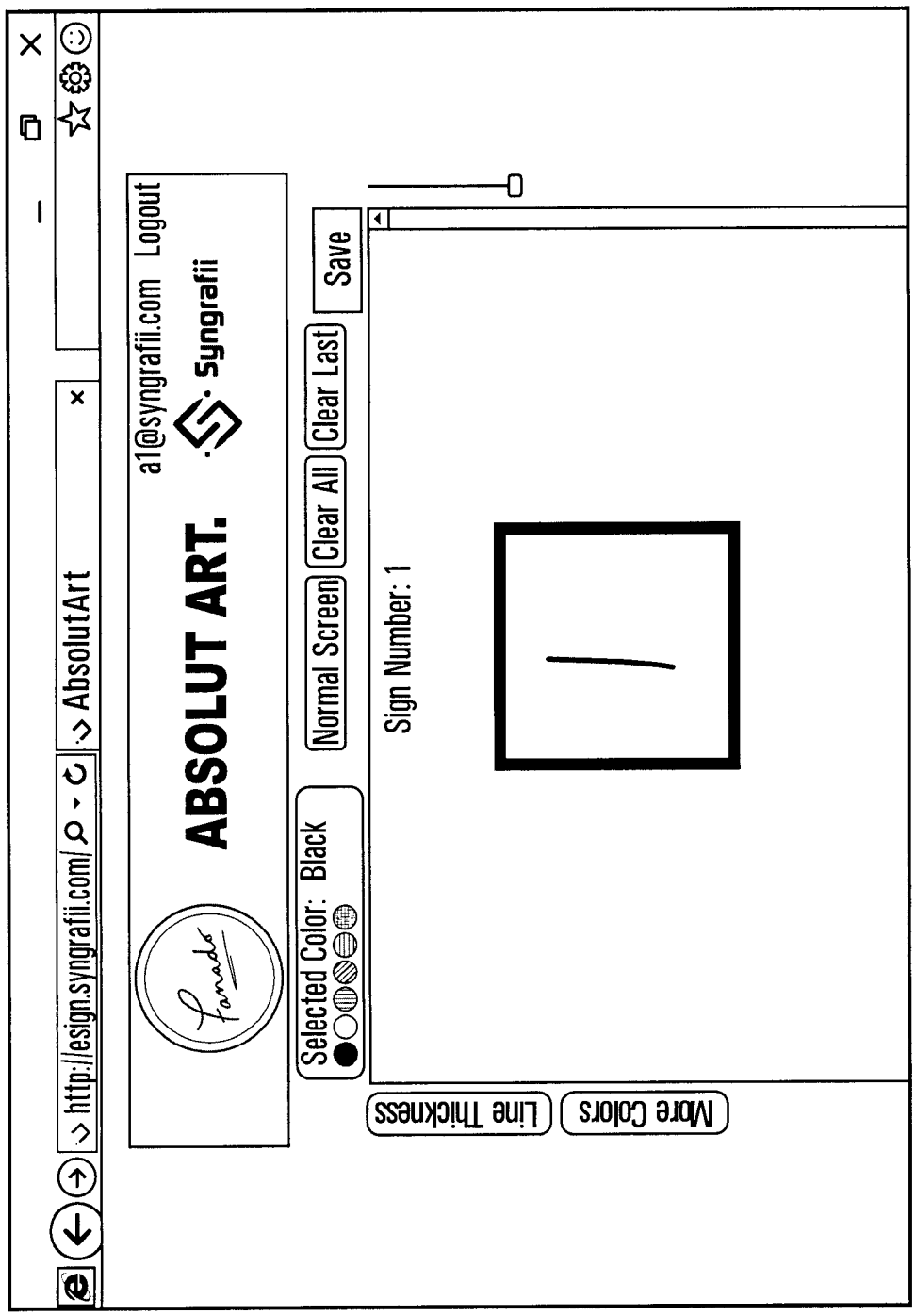
FIG. 15 is an example screenshot of an interface of a user application in which a user has entered the number "1".

Once the artist's handwritten signature is saved, the user application for signature collection may automatically clear the signing box and the user application may display the next number or character that the artist needs to provide in the label above the signing box, as shown in FIG. 15.

Figure 16:
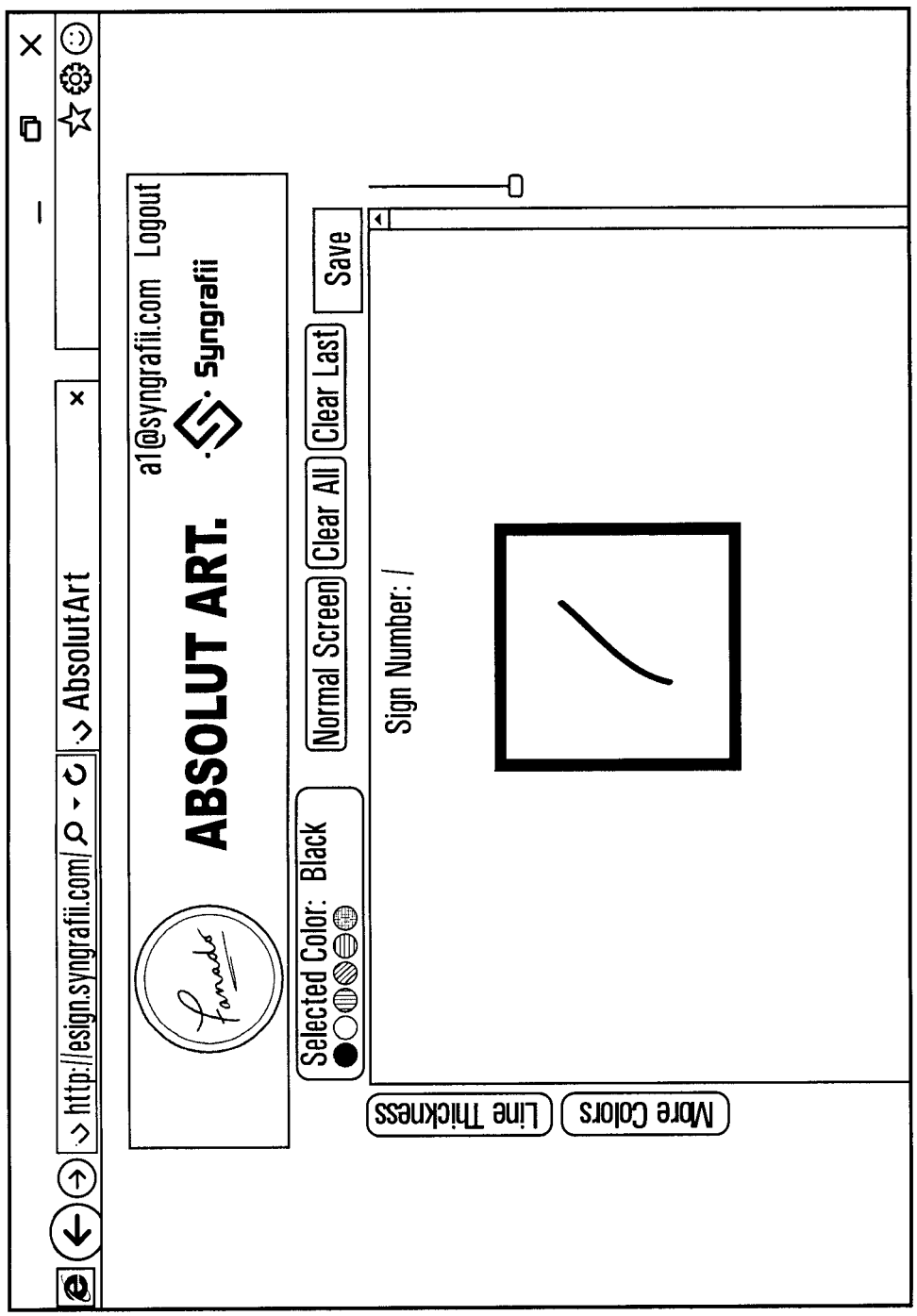
FIG. 16 is an example screenshot of an interface of a user application in which a user has entered the "/" character.

The artist may continue to sign the handwritten numbers from "0" to "9" and may also sign a slash "/", as shown in FIG. 16.

Figure 17:
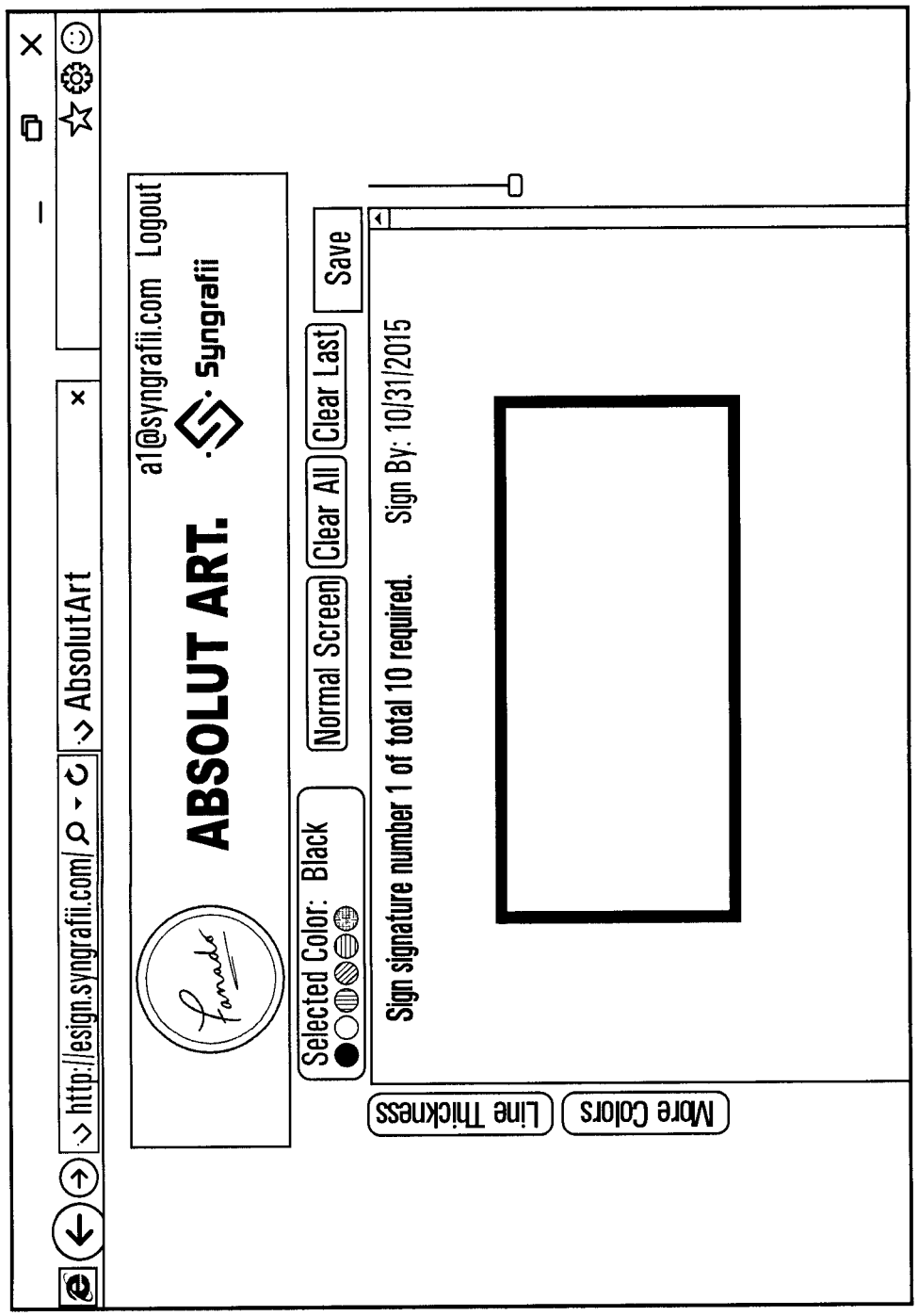
FIG. 17 is an example screenshot of an interface of a user application for entering a user's signature.
Figure 18:
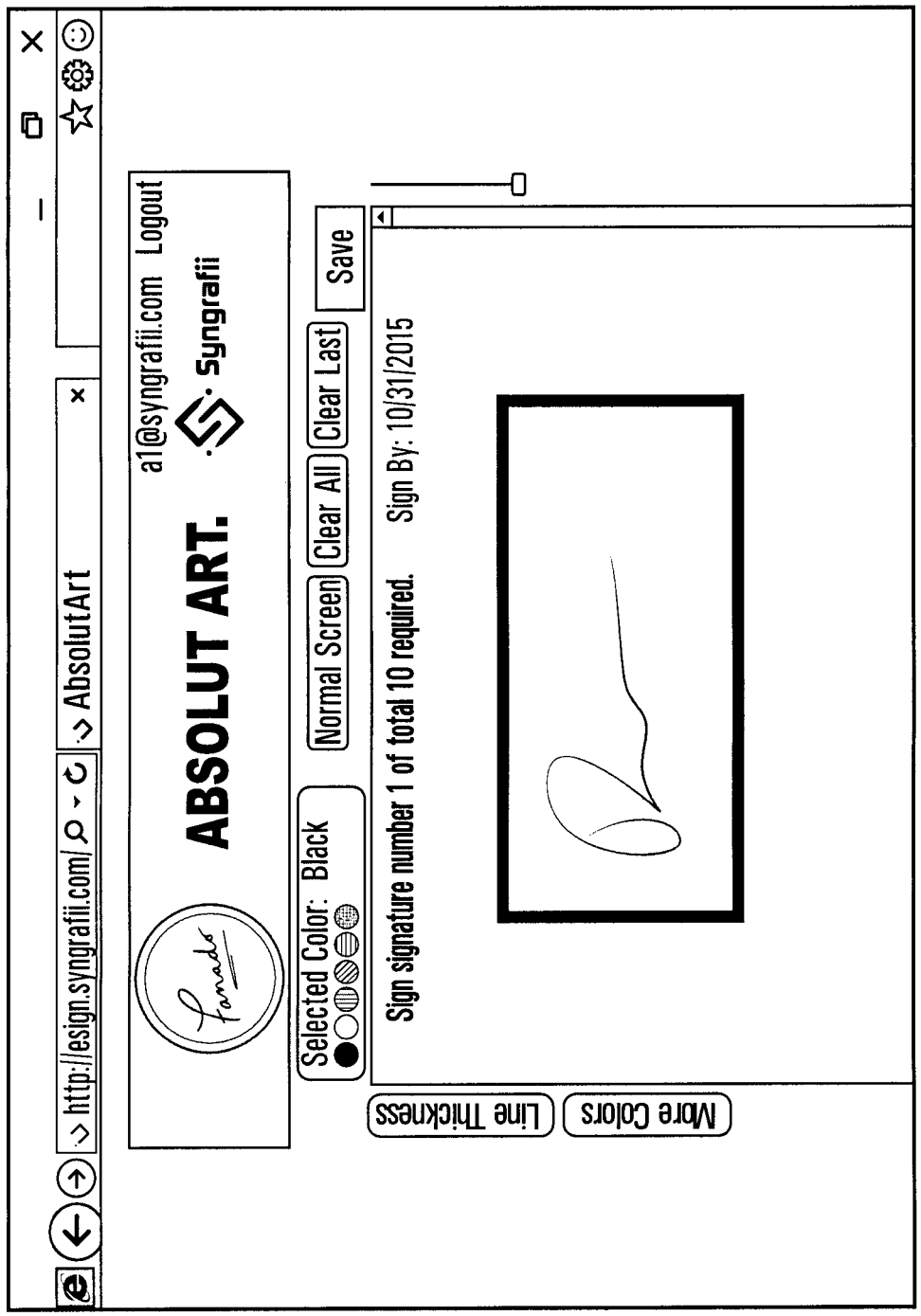
FIG. 18 is an example screenshot of the interface of FIG. 17 in which the artist has entered a signature.

Once the artist has provided all the required handwritten numbers and the slash, the user interface may show a signature box or area for recording the artist's one or more handwritten signatures as requested, as shown in FIG. 17. The artist may provide a handwritten signature within the signature box, as shown in FIG. 18.

Figure 19:
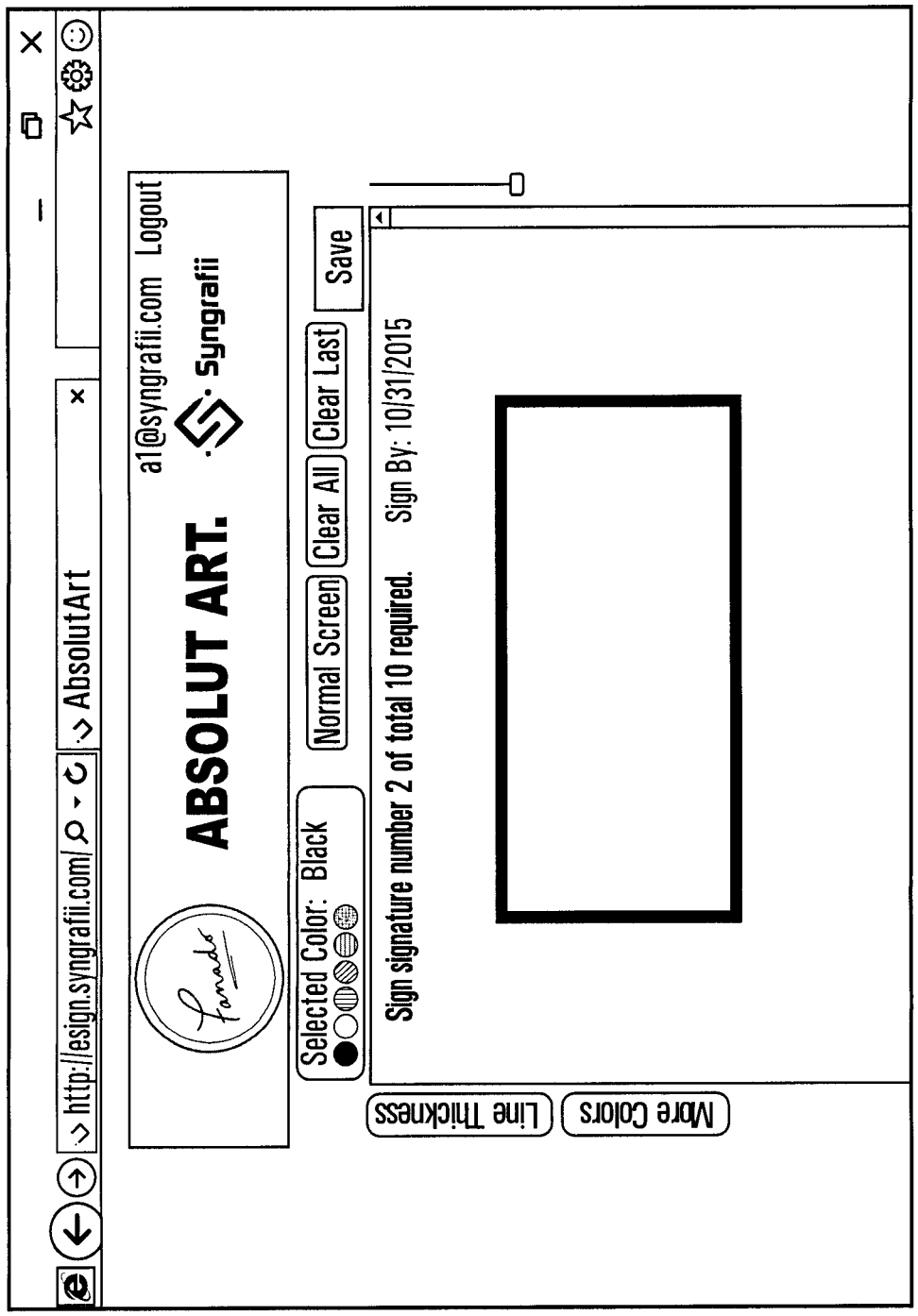
FIG. 19 is an example screenshot of the interface of FIG. 17 in which a subsequent signature from the user is being requested.

Similar to the artist's handwritten numbers, once the artist's handwritten signature is recorded by the user application, the artist may press a button displayed by the user application to save the handwritten signature and send to server 30. For example, a "Save" button is pressed to save the changes and continue to the next requested signature, as shown in FIG. 19. The artist may not have to enter any handwritten numbers at this point, only their handwritten signatures, as the artist has already provided their handwritten signature.

Figure 20:
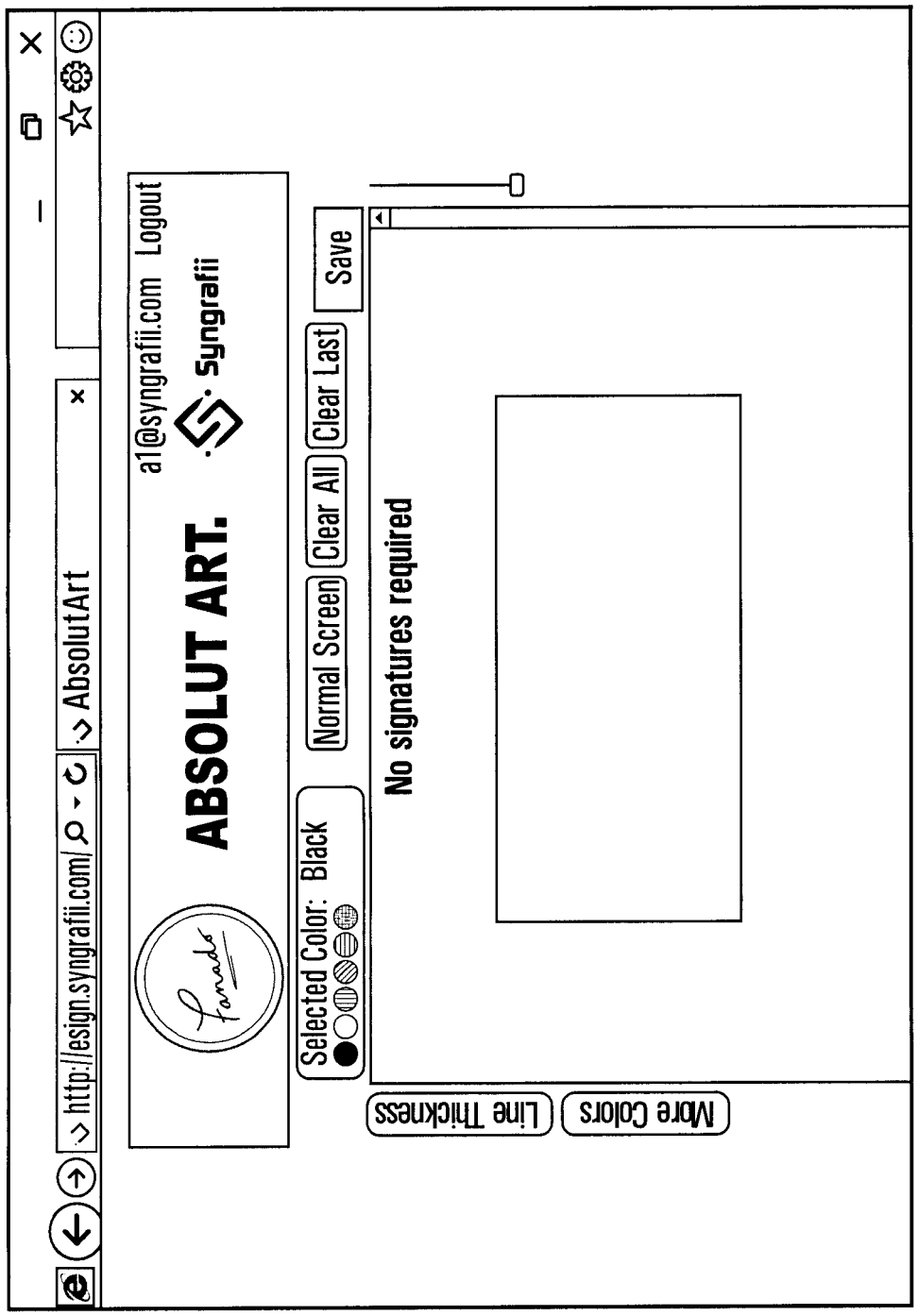
FIG. 20 is an example screenshot in which a message is displayed which informs the user that no further signatures are required.

Once the artist has provided all the required handwritten signatures that have been requested by the administrator, the label above the signature box may notify the artist that all the required handwritten signatures required have been recorded, as shown in FIG. 20. In some embodiments, the signature box may notify the artist that all the required handwritten signatures have been recorded, such as by a change in colour of the signature box, as shown in FIG. 20.

In some embodiments, the artist may have the option to continue providing additional handwritten signatures, notes, numbers or other handwritten messages as deemed appropriate by the artist.

In some embodiments, the artist may log off from the user application for signature collection. The user application may display a hyperlink that may be clicked by the artist to log out of the user application.

In some embodiments, the artist may log out of one device and log into another device to continue recording handwritten signatures and handwritten numbers.

In some embodiments, the artist may log out of one signature capture request session and log into a different signature capture request session.

In some embodiments, the artist may reset the user application for signature collection. The artist may click on the user application address as displayed by the user application, for example at the top of the user application in the address bar. A keyboard may be displayed when the artist clicks on the user application address. The user may click on the "enter" button displayed on the keyboard to restart the user application for signature collection. Alternatively, the artist may close the user application by clicking on the "X" button displayed by the user application, for example on the top of the user application in the address bar, and the artist may click on the menu as shown on the device, such as the Start menu of the tablet, and may launch the user application by clicking on the shortcut for the user application.

In some embodiments, the presentation of a stroke in digital "ink" corresponding to and mirroring the artist's handwritten stroke on the tablet may appear to be one step behind when the artist is providing their handwritten signatures or handwritten numbers. There may also be some lag when the artist is providing their handwritten signatures or handwritten numbers on the tablet screen. The artist may attempt to resolve this issue by ensuring that the user application for signature collection is in full screen mode. The user application may be set to full screen mode by clicking on a button displayed by the user application, such as the "Full Screen" button as illustrated in FIG. 12. If triggering the user application to enter into full screen mode does not solve this issue, the artist may restart the user application by following performing other actions as described herein, or by restarting the tablet.

In some embodiments, it may appear that the signature box does not display correctly when it is time for the artist to provide their handwritten signature after the artist has recorded their handwritten numbers. If this happens, the artist may have to restart the user application by following the steps as described herein.

In some embodiments, the refresh button in the browser may appear to not refresh the user application for signature collection. If this happens, the user application may be refreshed by using the steps as described herein.

In some embodiments, it may appear that nothing is displayed on the screen of the tablet when the artist logs into the user application. If this happens, the operator may need to create a signature capture request for the artist.

Figure 7:
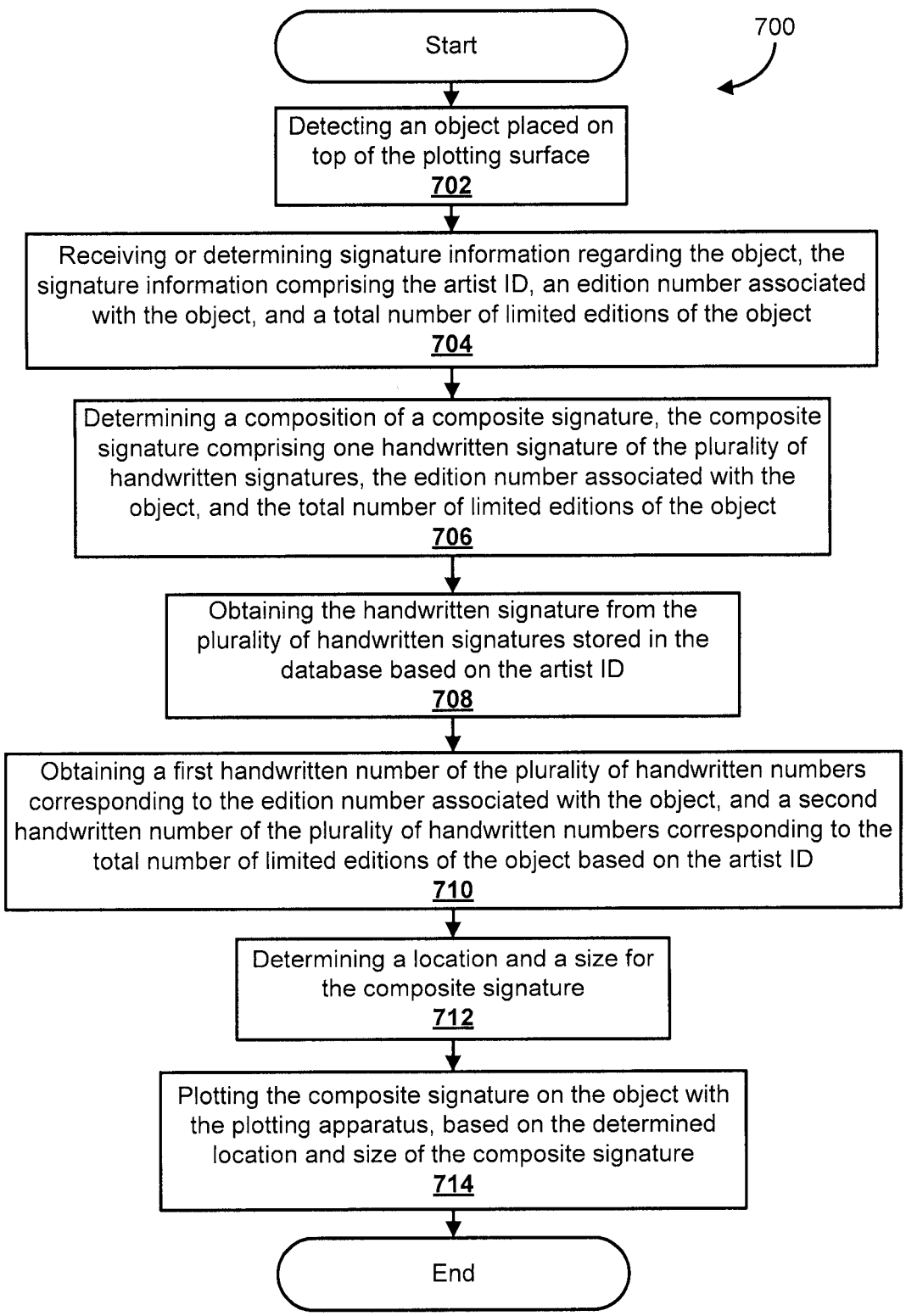
FIG. 7 is a flow chart illustrating an example method for plotting the artist's signature and numbers onto an object.

Referring now to FIG. 7, which illustrates a flowchart of an example process 700 for plotting the collected artist's signature and numbers to an object. System 10 may carry out process 700 in its entirety or in part to plot the collected artist's signature and numbers to the object.

For example, server 30 of system 10 may be configured to detect, at 702, an object placed on top of plotting surface 230, receive or determine at 704 signature information regarding the object, the signature information comprising the artist ID, artist signature 310, edition number 320 associated with the object, and total number of limited editions 330 of the object, determine at 706 a composition of composite signature 300 comprising one artist signature 310 of the plurality of artist signatures, edition number 320 associated with the object, and total number of limited editions 330 of the object, obtain at 708 the artist signature 310 from the plurality of artist signatures stored in the database 50 based on the artist ID, obtain at 710 a first handwritten number of the plurality of handwritten numbers corresponding to edition number 320 associated with the object, and a second handwritten number of the plurality of handwritten numbers corresponding to total number of limited editions 330 of the object based on the artist ID, determine at 712 a location and a size for the composite signature 300, and plot at 714 the composite signature 300 on the object with plotting apparatus 20 at the determined location and size.

In some embodiments, the electronic signals representative of the artist's handwritten signatures and handwritten numbers may be received on system 10, for example, by server 30, and may be stored in database 50, and may be retrieved on demand as the object to be plotted with the artist's handwritten signature and handwritten numbers may be printed or retrieved. The object to be plotted may include one or more of the artist's works, books, clothes, paintings, drawings, prints, sketches, and digital works.

In another embodiment, the artist may provide the handwritten signatures and handwritten numbers to server 30 of system 10, which may be stored on database 50 of system 10. Once a limited edition of an object is printed or retrieved, server 30 may allocate an artist's handwritten signatures and handwritten numbers to the limited edition of the object. Server 30 may combine the artist's handwritten signatures and handwritten numbers to compose composite signature 300, and server 30 may control plotting apparatus 20 to plot composite signature 300 on the object.

In yet another embodiment, an artist may provide their handwritten signatures and handwritten numbers on a computer device (not shown), which may process the artist's handwritten signatures and handwritten numbers into electronic signals representative of the handwritten signatures and handwritten numbers. The computer device may be connected to server 30 via network 60, and may send the electronic signals representative of the handwritten signatures and handwritten numbers to server 30. In some embodiments, the artist may provide their handwritten signatures and/or handwritten numbers to the computer device by means of a writing instrument, such as a stylus.

In some embodiments, server 30 may prompt or request for an artist to create an inventory of the artist's handwritten signatures and handwritten numbers. The request from server 30 may include the artist ID, the number of handwritten signatures required, and the deadline as to when the artist's signatures need to be collected. Server 30 may communicate the signature request to a computer device being used by the artist via network 60. Server 30 may be able to delete, edit, and/or view the progress of the collection request. In some embodiments, the artist may respond to the signature collection request by logging into the computer device and may provide handwritten signatures and handwritten numbers. The artist may be able to save, clear, edit, and/or undo their handwritten signatures and handwritten numbers on the computer device. When one of the artist's handwritten signatures and/or handwritten numbers is saved, the artist may provide another signature and/or number, until all the required signatures and numbers are captured.

In another embodiment, an operator of system 10 may cause server 30 to send the request to create an inventory of the artist's handwritten signatures and handwritten numbers.

In some embodiments, server 30 of system 10 may send a reminder to the artist to provide the artist's handwritten signatures and handwritten numbers to meet the signature collection deadline. Server 30 may indicate the number of handwritten signatures and/or handwritten numbers that the artist has already provided, the number of required handwritten signatures and/or handwritten numbers, and the number of handwritten signatures and/or handwritten numbers to be captured.

In another embodiment, an operator of system 10 may cause server 30 to send the reminder to provide the artist's handwritten signatures and handwritten numbers.

The artist may only need to provide their handwritten signatures if the artist had previously provided their handwritten numbers.

In some embodiments, the artist may log into a web application on a computer device that may be in communication with server 30 and may provide their handwritten signatures and handwritten numbers through the web application. The web application may provide a signing area to collect the artist's handwritten signatures and handwritten numbers.

In one embodiment, an artist's handwritten signature as stored or collected may be used only once. That is, once server 30 has chosen a particular signature for plotting on an object, from the artist's plurality of signatures stored on database 50, the signature may be marked by system as "used" or alternatively deleted from database 50, such that the server 30 cannot use the exact same signature again for plotting to another object.

In another embodiment, an artist's handwritten signature may be reused.

In yet another embodiment, the artist may provide their handwritten signatures and/or handwritten numbers over one or more instances.

In some embodiments, server 30 may log the artist's signing sessions, which may be for audit trail purposes. The artist may be identified by server 30 through login credentials, geographical location, IP address, and/or other data.

In another embodiment, server 30 may create a project to allocate the stored signatures of an artist to a limited edition of an object. A project may include the artist ID, the art ID, and/or miscellaneous notes. As a handwritten signature of an artist may be plotted on a limited edition of an object by plotting apparatus 20, server 30 may then indicate that the particular handwritten signature of the artist that was plotted may not be reused (i.e., "one-use" signature), for example, by deleting the copy of handwritten signature from database 50, or by tagging a binary flag of the handwritten signature with value "FALSE" or "0", where "FALSE" indicates that a signature is not to be used for plotting, and a value of "TRUE" or "1" indicates that a signature is usable for plotting. All handwritten signatures 310 may be tagged with a TRUE flag when initially stored in database 50. Server 30 may also reduce or decrement a total number of remaining or available handwritten signatures associated with an artist ID each time a limited edition object has been signed with a handwritten signature.

In one embodiment, a project may be created by server 30 by generating a record in database 50 is given a unique project ID. The project ID may be linked to a plurality of data fields. For example, the data fields may be one or more of: artist ID, art ID, miscellaneous note, expected delivery date and time, or the like. Such projects may be pre-programmed.

An artist may have more than one piece of work available for sale, where each work or object has a limited edition run (for example, the object can be a digital drawing entitled "sunset" with art ID "X10", and the object may have a total number of 50 limited copies worldwide). A project may be generated for each time an object needs to be plotted with a composite signature, where the object has a limited edition number associated therewith, with each project containing specific signature information necessary for plotting a composite signature onto the corresponding object.

In some embodiments, a project may retrieve or reserve one or more signatures that have been collected and made available for use. At the creation of the project, a total number of limited edition prints (e.g. 10 copies) as well as the particular number designating the edition (e.g. "2 of 10") are defined in order for the signatures and numbers to be assembled by the system as required.

In some embodiments, server 30 may confirm that a limited edition of the object is available, and may adjust the number of available limited editions of the object upon receipt of a confirmed order of a limited edition of the object from e-commerce platform 40. Server 30 may process the confirmed order of a limited edition of the object and may retrieve or print the object on demand. Server 30 may retrieve a handwritten signature and handwritten numbers for artist signature 310, edition number 320 and total number of limited editions 330. Server 30 may retrieve artist signature 310 with edition number 320 and total number of limited editions 330 to create composite signature 300.

Server 30 may control plotting apparatus 20 to plot composite signature 300 on the object. Server 30 may control plotting apparatus 20 to plot an edition number 320 that has not been used for an earlier retrieved or printed limited edition of the object.

Edition number 320 may be the next available edition number 320 or may be a different edition number that has not been used. In some embodiments, the operator of system 10 may choose the edition number 320 from among a plurality of available options.

In some embodiments, an operator of system 10 may log into server 30 of system 10 and may select an artist and project for the selected artist. The operator may cause server 30 to select edition number 320 and may cause plotting apparatus 20 to apply composite signature 300 on the limited edition of an object that may use edition number 320 selected by the operator.

Server 30 may be configured to adjust the size and/or orientation of composite signature 300 and may select the location on the object to plot composite signature 300 based on the artist ID and art ID. In some embodiments, server 30 may select a default location to plot composite signature 300. For example, the default position may be the bottom right of the object, as illustrated in FIG. 4. In some embodiments, the default location to plot composite signature 300 may be configured to be any area of the object.

In another embodiment, server 30 may detect, through a plotting control module, presence of an object to be plotted onto plotting surface 230 of plotting apparatus 20. In some embodiments, an operator of system 10 may load the object to be plotted onto plotting surface 230 of plotting apparatus 20. The object may be loaded onto plotting surface 230 of plotting apparatus 20 in a configuration compliant with physical space requirements.

In yet another embodiment, plotting apparatus 20 may have a video display or object assessment functionality (not shown) to assist server 30 and/or operator of system 10 to adjust the size and/or orientation of composite signature 300 and to select the location on the object upon which to plot composite signature 300.

In some embodiments, operator of system 10 may orient composite signature 300 via server 30 based on the physical placement of the object in plotting apparatus 20.

In another embodiment, server 30 may test the plotting of composite signature 300 onto the object. The test plotting may not use composite signature 300 but may plot a bounding box of composite signature 300. The test plotting may be applied on an article other than the object, for example a scrap piece of paper. In some embodiments, the test plotting may allow an operator of system 10 to know where composite signature 300 may be plotted on the object. In some embodiments, the test plotting of a composite signature does not cause a count of allowable signatures to be decremented unless the signature 300 is also plotted on the object that is the subject of the received order.

Server 30 may cause plotting apparatus 20 to plot composite signature 300 onto the object upon determination of the appropriate size and orientation of composite signature 300, and appropriate location to plot onto the object. In some embodiments, server 30 may control plotting apparatus 20 via software that controls plotting apparatus 20. For example, the software controlling plotting apparatus 20 may be a controller application.

In some embodiments, after plotting apparatus 20 has plotted composite signature 300 onto the object, server 30 may generate a report associated with the plotting of composite signature 300 on the object. The report may be stored in database 50. Server 30 may adjust data stored in database 50, such as artist ID or art ID. In addition, server 30 may prevent a used edition number 320 from being reused. In some embodiments, the generated report may record a complete transaction history, and may include an audit history of the artist providing a signature. An example of such a system is further described in U.S. Pat. No. 8,843,552, which is incorporated by reference in its entirety.

In one embodiment, an authentication file may be generated with each object that has been signed with system 10. The authentication file may be used to show that a limited edition of an object has been engraved or plotted with an authentic signature from the artist. The authentication file may also be used during an audit process for the artist, if needed. In some embodiments, the authentication file may be referred to as a MasterFile™. The MasterFile™ may include, for example, video recording of the limited edition object being engraved with signature by plotting apparatus 20. The MasterFile™ may also include photos of the object before and after it has been engraved or printed with the composite signature, such that it is evident that the limited edition object has an authentic signature from the artist. The MasterFile™ may include a document from the artist attesting to the authenticity of the limited edition and the associated signature. In some embodiments, the MasterFile™ may be an encrypted file that only the customer who has purchased the limited edition objection may decrypt. For example, the customer may be provided with a specific private key.

In some embodiments, if there is an error in plotting, server 30 may re-plot composite signature 300. Server 30 may record or adjust data stored in database 50 to reflect that an error in plotting occurred. For example, server 30 may allow edition number 320 and/or composite signature 300 associated with the erroneous plot to be reused.

In another embodiment, if there is an error in plotting, an operator of system 10 may cause server 30 to re-plot composite signature 300 and may select a different edition number 320. Upon review of logged reports, for example the MasterFile™ report, the operator of system 10 via server 30 may allow edition number 320 associated with the erroneous plot to be reused.

Errors in plotting may include, for example, the incorrect placement of composite signature 300 on the object.

In yet another embodiment, if there is an error in plotting, an operator of system 10 may notify an administrator of system 10 to report the error, and the administrator of system 10 may identify the used composite signature 300 as void and allow said composite signature 300 associated with the erroneous plot to be reused.

In some embodiments, server 30 includes an error reporting functionality in order to reuse composite signature 300 associated with the erroneous plot.

In another embodiment, system 10 may include a user interface to preview an artist's handwritten signatures and handwritten numbers that have been collected or stored.

In yet another embodiment, server 30 may generate various reports such as sales report, inventory report, signature inventory report, and so on.

In some embodiments, server 30 may include native or web applications that may facilitate the use of a computer device for an artist to transmit electronic signals representative of the artist's handwritten signatures and handwritten numbers to server 30.

Example Web Interfaces

In some embodiments, a web interface through, for example, a web portal, as configured by instructions stored on server 30, may be provided for an administrator or operator to create a new signature capture session request.

For example, the administrator may log into the web interface and create a Signature Capture Session for a particular artist. The request may specify number of handwritten signatures or numbers required.

In some embodiments, the signature Capture Session for an artist may include one or more the following fields:
Artist (from dropdown list)
Number of signatures required
Date of when the signatures need to be collected
Any reminders for collecting said signatures
The system may automatically check if this artist already has numbers captured from a previous session. If not, the artist may be required to capture these as well during the signature collection.

The administrator may be able to delete, edit, view progress of the collection request.

In one embodiment, the artist may have a tablet specifically customized for receiving handwritten signatures. In other embodiments, the artist may use any tablet device or computing device, including a mobile device, for recording handwritten signatures.

In some embodiment, a web interface, through for example, a web portal, as configured by instructions stored on server 30, may be provided for an artist to easily record and save handwritten signatures and numbers.

As example use case, an artist may, through the web interface, log into an user application for signature collection and see a Signature Capture Session request from server 30. The request may indicate number of handwritten signatures required. The artist may provide handwritten signatures and numbers accordingly. The web interface may be user-friendly and intuitive to use.

In some embodiments, the artist may log into the user application through a tablet device, for example, an iPad™ or Microsoft™ Surface Tablet.

Once logged in, the artist may be provided with a signing area to capture their signature. An indicator on the screen will let the artist know how many signatures are completed so far, how many are required in total, how many are left to be captured and when they are needed by. The artist may write their signature with the stylus and have the option to clear, undo or save the signature, and once saved, automatically start the next one, until all the signatures are captured.

If handwritten numbers also need to be provided, the artist may be prompted by the user application to capture these first. The Artist does not have to capture all signatures in one sitting, they can return to the application at any time to continue from where they left off.

The artist may be identified or authenticated, by the user application, through login credentials, location data, IP address, or the like. The artist may provide an inventory of original signatures as well as generic number characters 0-9 and a slash (/) so that server 30 can assemble unlimited numbers of different limited edition runs. The system may log these artist signing sessions for audit trail purposes. The logged sessions may be part of a Masterfile™.

A web interface may also be provided to enable an Administrator to allocate a number of an Artist's saved signatures to a limited edition piece of artwork i.e. create a 'Project' for each new artwork.

For example, when a new limited edition of an artwork is released, an Administrator may log into the web interface and for a particular Artist, creates a Project.

A project may include one or more of:
The Artist name, ID, address
The artwork name (for identification when the signatures need to be pulled down)
The number of limited editions of this artwork
Miscellaneous Notes
The number of limited editions may be deducted from the total number of signatures remaining for this artist to arrive at a new total of remaining signatures for the artist. The Administrator cannot create a project that requires more signatures than what is left in the artist signature inventory or pool.

Server 30 and/or e-commerce platform 40 may determine what art will be offered and what number of pieces will be offered for any given art piece. This may be programmed in advance in the form of an artist's "Project", which can contain data fields such as [artist name or ID], [art work name or ID], [number of limited editions available], and so on. When an art piece is ordered online (e.g. via e-commerce platform 40), system 10 may confirm signed editions are available and further adjust the total number of signed limited editions available as each time a limited edition is sold and produced. The ordered limited edition art piece may then be processed and sent to the print-on-demand service (POD) by server 30. The Print-on-demand service may receive the order in the form of a "Project", including information such as artists name or ID, art work name or ID, and proceed to print the physical artwork and sign it with plotting apparatus 20 on-demand for the purchaser, in a manner described herein.

Another web interface may be provided to allow an Administrator or operator to take a saved signature for an artist and apply it on a piece of limited edition art that was created as a Project.

An artist and a Project for this artist may be selected through a web or user interface. The user can select a limited edition from a list of numbers that are available and apply this signature on a piece of art that is placed on the plotting surface of plotting apparatus 20.

The system may enable a user to select an artist and a project for the selected artist. The system may know which signatures have been used for this project so far, and can show the available limited edition numbers for selection (by default, the next available limited edition may be selected). When the limited edition signature is retrieved by server 30 via the application, it may also append the number part of the signature. For example, a composite signature 300 may include the generic format "<signature> x/y", where x is the limited edition number 320 and y is the total number of limited editions 330 in this project.

Once the signature and numbers are retrieved from the server, the user can then re-size the signature as necessary based on a live feed from the plotting apparatus 20 in the application. The signature may be placed on the top left of the signing area and be rotated by 180 degrees in order to enable the artwork or object to be loaded correctly into the plotting apparatus 20 to enable signatures on the bottom of the artwork. Artwork may be loaded upside down due to physical space requirements. The user may further rotate the signature based on the physical placement of the object under the plotting apparatus 20.

The user can either do a test signing or apply the signature and numbers as needed. The test signing may not use the signature but will, however, draw the bounding box of the signature and numbers so that the user can know with a relative degree of certainty as to where a signature will be placed on the artwork. The test can be, for example, carried out on a scrap piece of paper.

A "project" number may then be entered. Server 30 may determine which handwritten signature of the artist to retrieve from the artist's signature inventory as stored in database 50; as well as the X (limited edition) number 320 and the Y (how many in total are available to be signed) number 330, and presents this data to the an operator for review.

The operator may select any "unused" X value (in the event the customer specifies 10/20 instead of the next number in default mode), but at no time can the same limited edition number be used twice.

Server 30 may then retrieve following writing data from database 50 based on project information and selected information: handwritten signature, handwritten [X], handwritten [I] and handwritten [Y].

With the object to be signed placed on top of plotting surface, a camera may capture the image of the object and show the image on a monitor, along with a digital overlay of the project information. The operator may then locate, re-size (if desired) and position, including inverting the writing so it may be placed on any corner in the proper orientation, the writing data on the object before it is plotted by plotting instrument in a selected ink or material. Once satisfied all required writing has been assembled, the operator may print or engrave the assembled writing data onto the piece of art. The printing or engraving may be in pencil (e.g. graphite), for example.

A controller application for plotting apparatus 20 may be used to authorize the connection of the signature application so that the signature and numbers can be sent to plotting apparatus 20.

The controller application may authorize incoming connections as well as create the compliance data known as the MasterFile™. It may also be used for the alignment process that ensures that the signature is applied on the correct position on the object or artwork.

A Masterfile™ report may be generated for each successful production of a limited edition object with a composite signature and associated with the signing process in a database 50. All project data values may be adjusted for the next signing session for the same project.

If there is an error in printing, a re-production may be ordered. However, in such an event, a different "X" limited edition value may be selected. Upon review of the MasterFile™ and/or with appropriate authorization, server 30 may re-authorize the failed print value of "X" for future use.

In one embodiment, server 30 may provide an interface for operators to preview signatures, such as to see the images of the an artist's collected signatures up to date.

In one embodiment, reporting of usage of the system may be generated for various stakeholders.

In yet another embodiment, native or web applications may be configured to enable Artists to use their own devices in order to capture signatures in a highly accurate manner in real time or near real time.

As another example, Artist A may have the following art pieces being sold on e-commerce platform 40: Art #1 with a run of only 20 copies available, Art #2 with a run of 100 copies available and Art #3 with a run of 200 signed copies available. As each project is created per limited production copy of object, until a project has been generated, the signatures collected from the artist and stored in the database 50 do not yet need to be matched or linked with the precise piece of art to which it would eventually be assigned (e.g. #1, #2 or #3). For instance, in the case of Art #1 with a limited run of 20 copies, server 30, upon having generated a project after receiving a request for a limited copy of Art #1, may retrieve a handwritten signature from the "signature inventory" of that artist as stored in database 50, which may contain for example 400 signatures, and may also compile the following string as a composite signature 300: Artist Signature+X (number of the run of 20 that is being signed)+ (/)+Y (total number of art copies for art #1 that will ever be signed)—i.e., "J.DOE 1/10" in the Artist' own handwriting, as shown in FIG. 3. The control for values of Art #1, X and Y may be pre-configured or programmed as part of the "project". In some embodiment, the application of the signature and run data may be managed by a staff, where tools may be provided that allow the staff to retrieve and assemble all of the components of the composite signature of an artist on the fly, including resizing and placement.

Example Workflow

Examples of server 30 workflow are described herein. In some embodiments, server 30 may include a transaction web server. An administrator of system 10 may create and view signature capture requests, may create and view projects, which may be associated with a project ID, and may retrieve and apply the artist signature 310, to the object.

A user application for signature collection may be configured to provide suitable functionalities to record and store an artist's signatures, numbers "0-9" and the character "/" in the artist's own handwriting. These stored original signatures may be recalled on demand at a printing facility through the use of the user application. Server 30 may cause plotting apparatus 20 to plot the original signatures and limited edition markings in the artist's handwriting at a production printing facility.

At the time when an artist's signature is recorded by the tablet, the number of limited editions for a particular object or the number of objects to be retrieved or printed in the future may be undetermined. The tablet and the corresponding user application for signature collection may enable an artist to sign a pre-determined amount of their signatures and numbers separately. Once a limited edition of an object is released, server 30 of system 10 may allocate a specified number of artist signatures 310 for a particular run of limited editions of the object through the creation of a project associated with a project ID. The project ID may be linked to a plurality of data fields. For example, the data fields may be one or more of: artist ID, the art ID, miscellaneous note, expected delivery date and time. When server 30 recalls artist signature 310 on demand from database 50, the appropriate edition number 320 and total number of limited editions 330 may be appended and merged to artist signature 310 in order to create composite signature 300 including a limited edition number.

Server 30 may be configured to perform administrative functions, for example, to view and create a signature capture request, to view and create a project associated with a project ID, and to print on demand composite signature 300 using plotting apparatus 20.

In some embodiments, server 30 may be configured to provide a web interface that may facilitate an administrator user to create a new signature capture request for an artist.

In some embodiments, server 30 may be configured to provide a web interface to enable an administrator to allocate a number of an artist's saved artist signatures 310 to a limited edition of an object. For example, the administrator may create a 'project' for each new object. The project may be associated with a project ID.

In some embodiments, server 30 may be configured to provide a web interface to facilitate retrieval of a saved artist signature 310 and may apply artist signature 310, along with edition number 320, and total number of limited editions 330 as composite signature 300 on a limited edition of an object that may correspond to a created project.

An artist may use a device, such as a tablet, and a corresponding user application for signature collection, to provide and save their handwritten signatures and handwritten numbers for limited edition of an object, as described herein.

Figure 21:
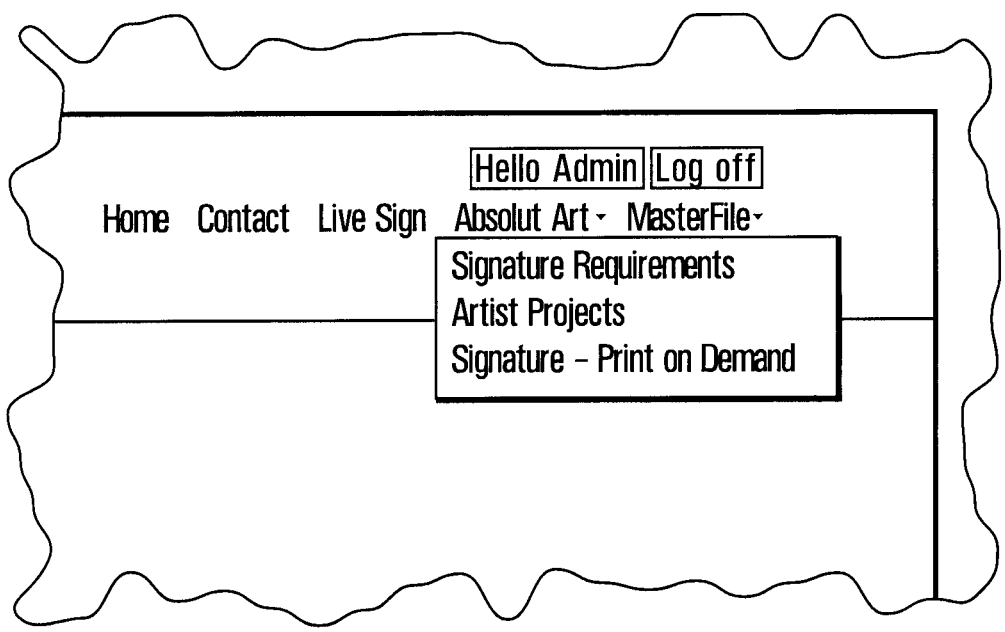
FIG. 21 is an example screenshot of a menu in a web interface.

In some embodiments, an administrator may log into server 30 using an administrator log in name and a password. An administrator may choose their administrator log in name and password. Once logged into server 30, the administrator may click on a tab provided by server 30 in order to display a menu, for example, the menu illustrated by FIG. 21.

When an artist's handwritten signatures are required, an administrator may log into server 30 and may create a new signature capture request.

Figure 22:
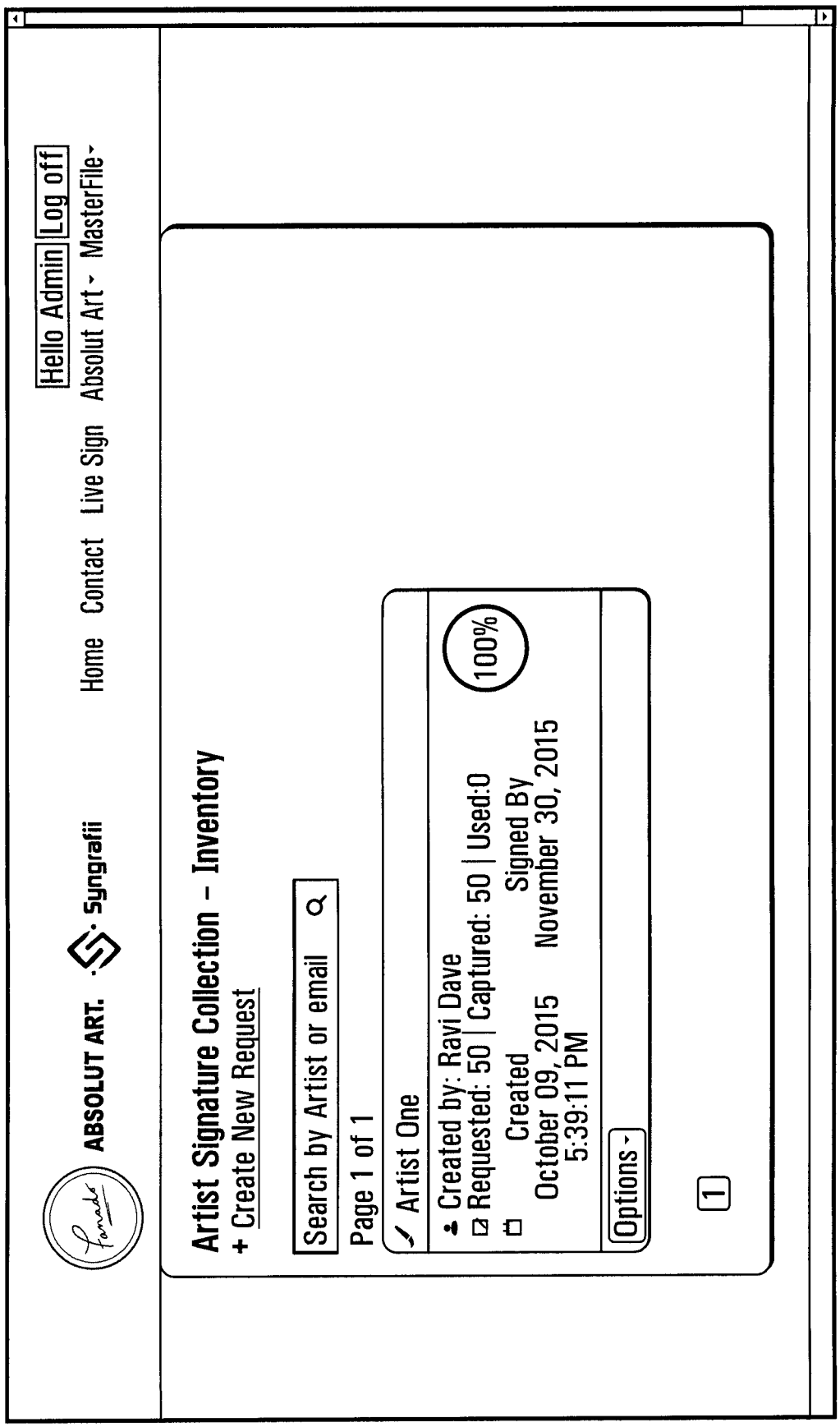

In some embodiments, as shown in FIG. 22, the administrator may click on a tab provided by server 30, for example, the "Absolut Art" tab, and may click on a link provided by server 30, for example, the "Signature Requests" link. A screen, for example, the screen as illustrated by FIG. 22, may show all current signature capture requests and the capture progress to date.

Figure 23:
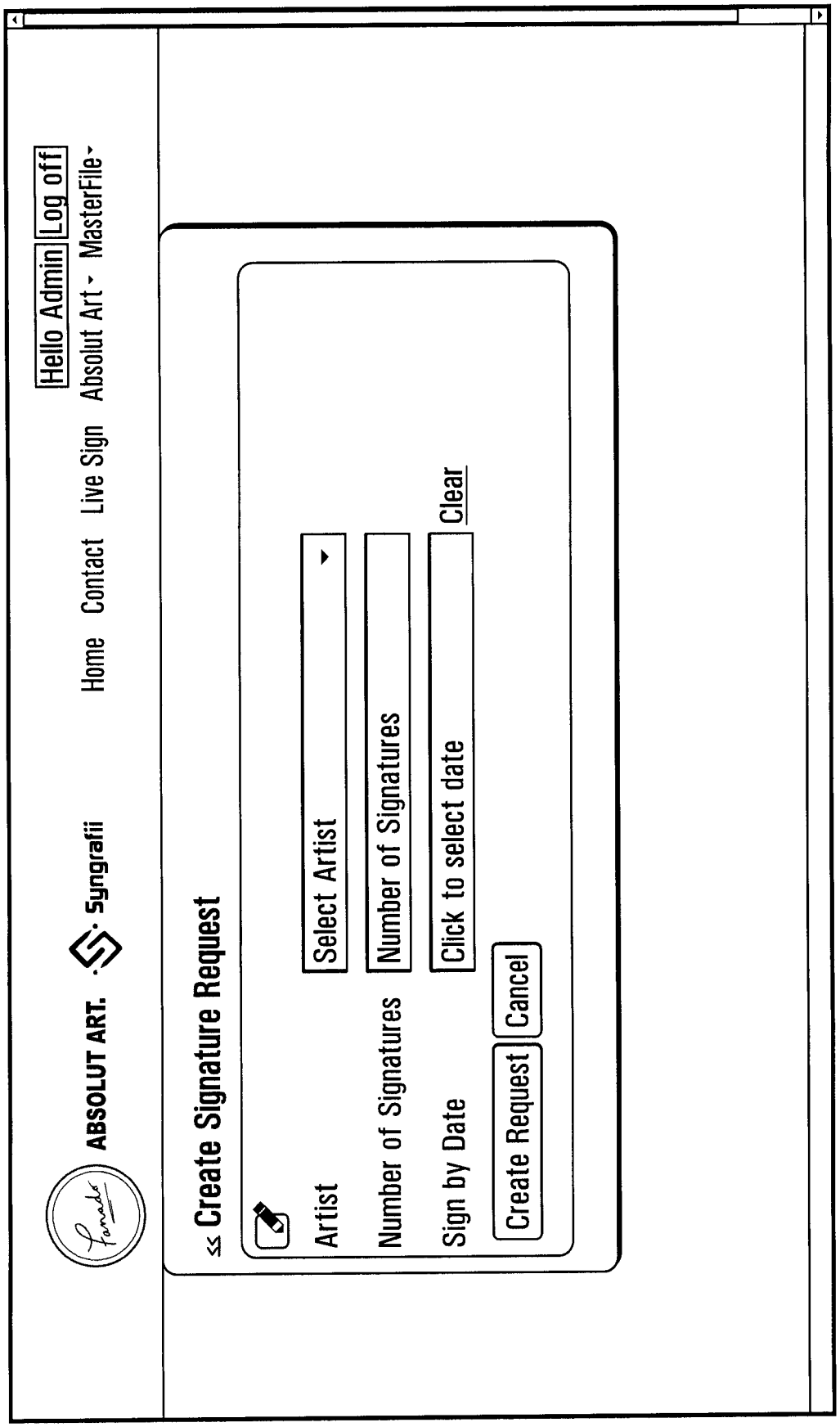

To create a new request, an administrator may click on a link, for example the link named "Create New Request", and a screen, for example, the screen shown on FIG. 23, may be displayed.

In some embodiments, to create a new signature capture request, an administrator may select an artist name from the drop down list, enter the number of handwritten signatures that the artist may be required to sign, select a date that these handwritten signatures may need to be completed by, and may click on a link, such as the "Create Request" link as shown in FIG. 23, to save the changes.

Once a signature capture request has been created, the administrator may be able to track the progress of the signature capture. The administrator may be able to see how many artist signatures 310 have been signed to date and clicking on a button provided by server 30, such as the "Options" button illustrated in FIG. 24, and the administrator may see the images of the artist signatures 310 and the number of artist signatures that have been received or captured so far.

Figure 24:
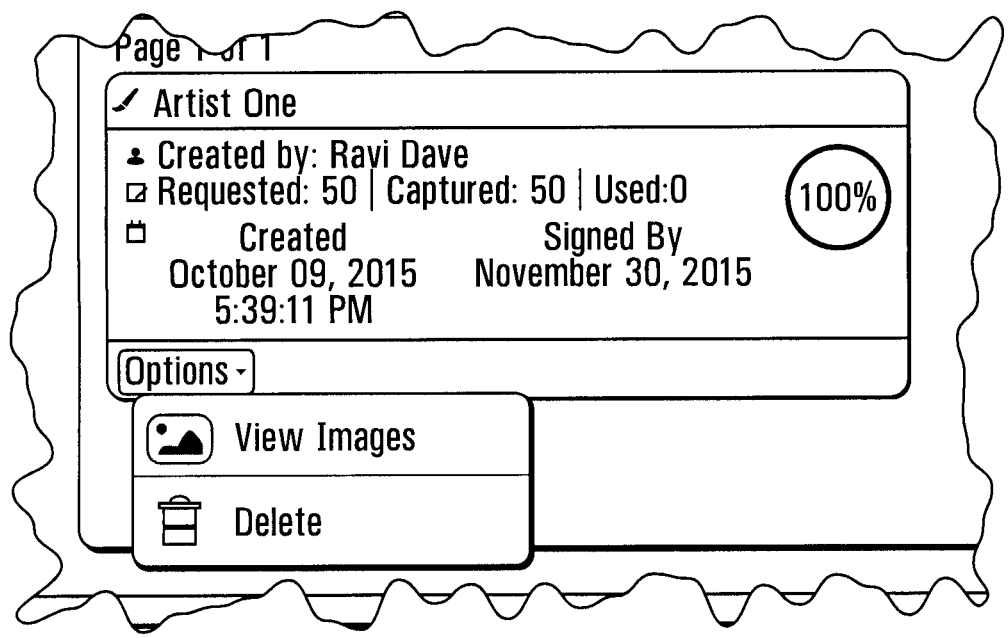
Figure 25:
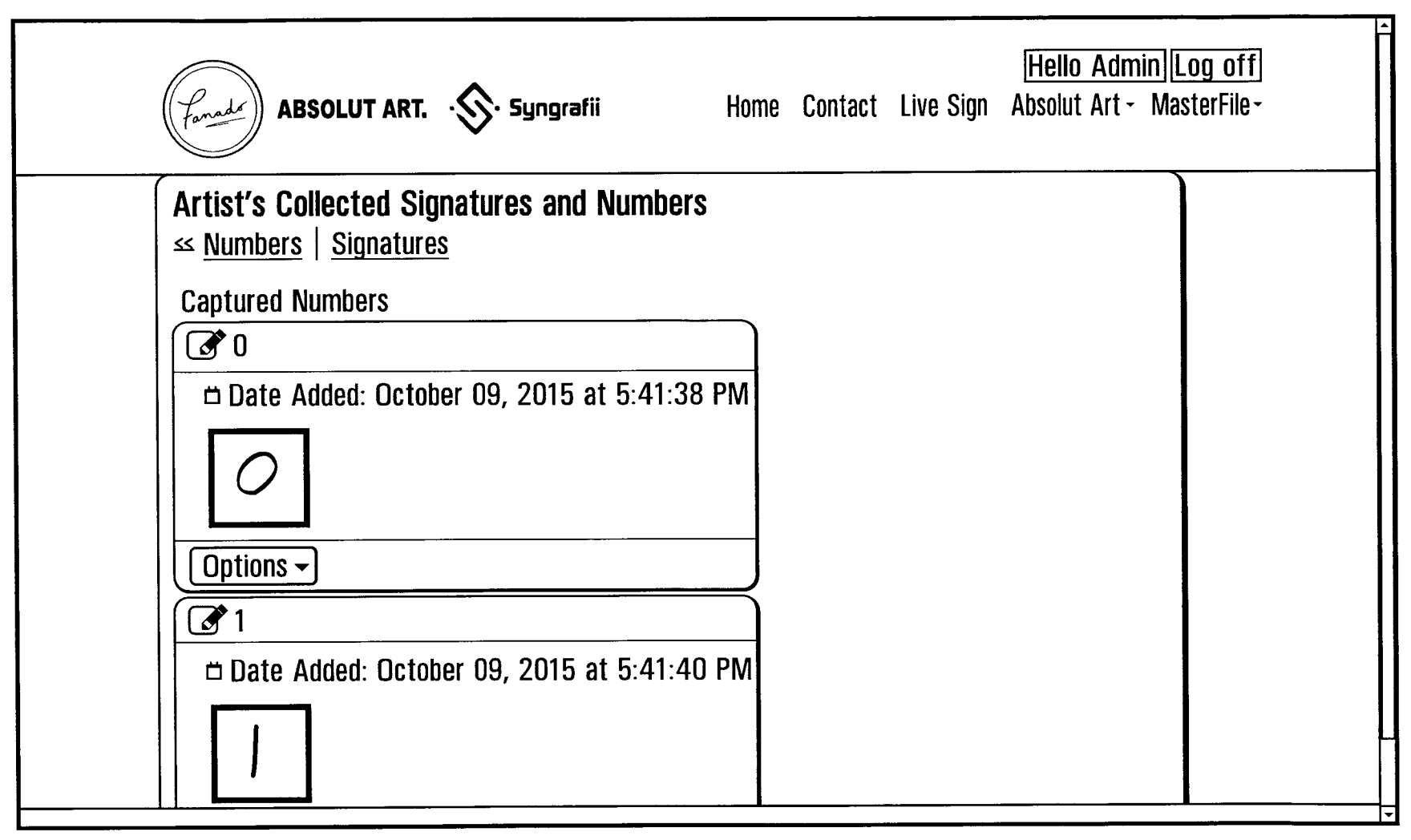

When a link provided by server 30 is clicked, such as the "View Images" link as shown in FIG. 24, the administrator may be presented a screen, for example the screen illustrated in FIG. 25, that displays the number of handwritten signatures collected and the images of artist signatures 310 collected. The administrator may select whether to view the number of handwritten signatures collected or to view the images of artist signatures 310 by clicking on links that may be provided by server 30, for example the "Numbers" link or "Signatures" link as shown in FIG. 25.

Figure 26:
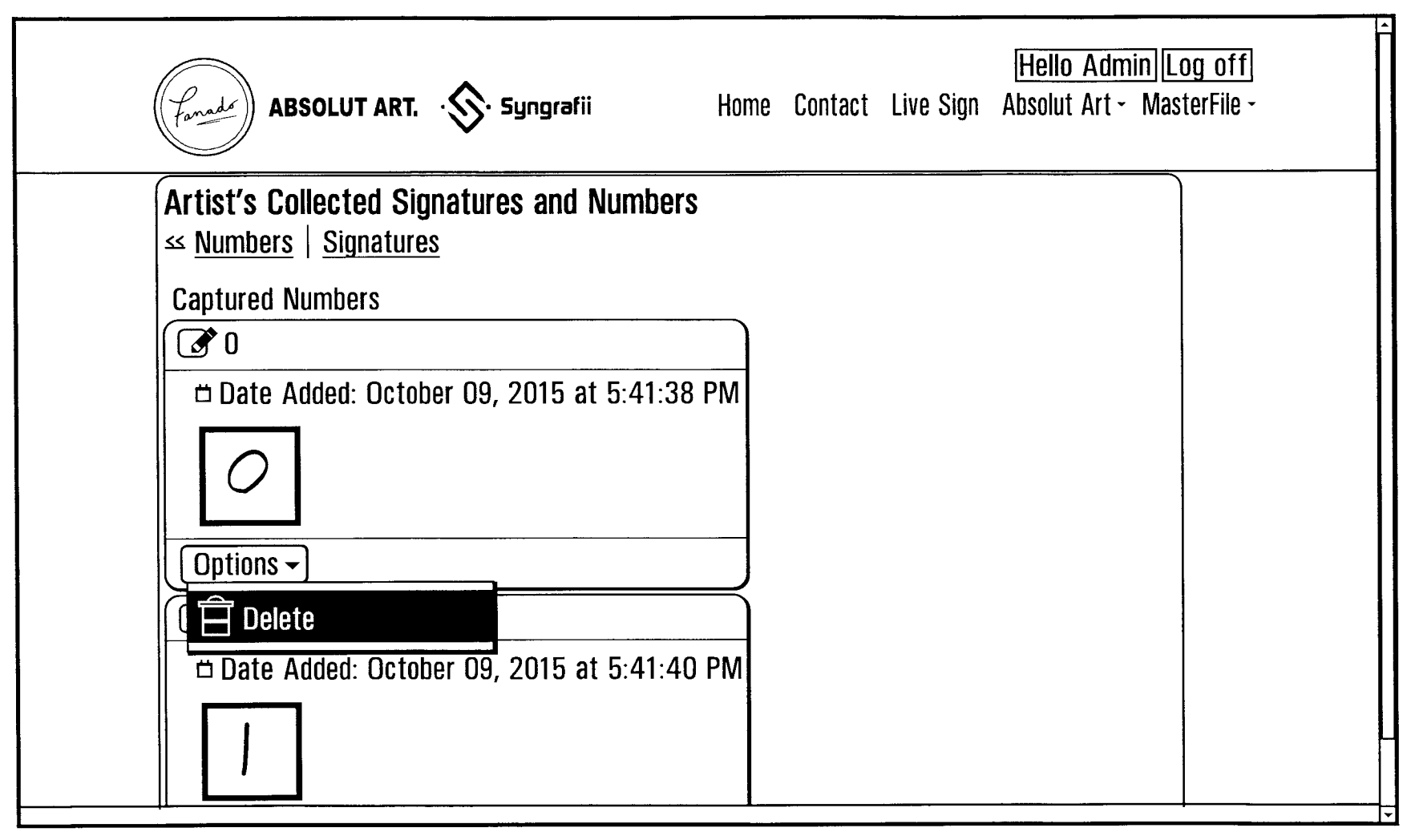

As shown in FIG. 26, once the artist's handwritten numbers have been collected, an administrator may be able to delete a particular handwritten number, for example, if there was an error in the recording of that handwritten number. If the handwritten number is deleted, the artist may log into the user application for signature collection on a device, in order to re-record and re-save that particular deleted handwritten number. The user application may automatically detect that the deleted handwritten number may to be missing and would need to be provided once the artist logs into the user application on the tablet.

Figure 27:
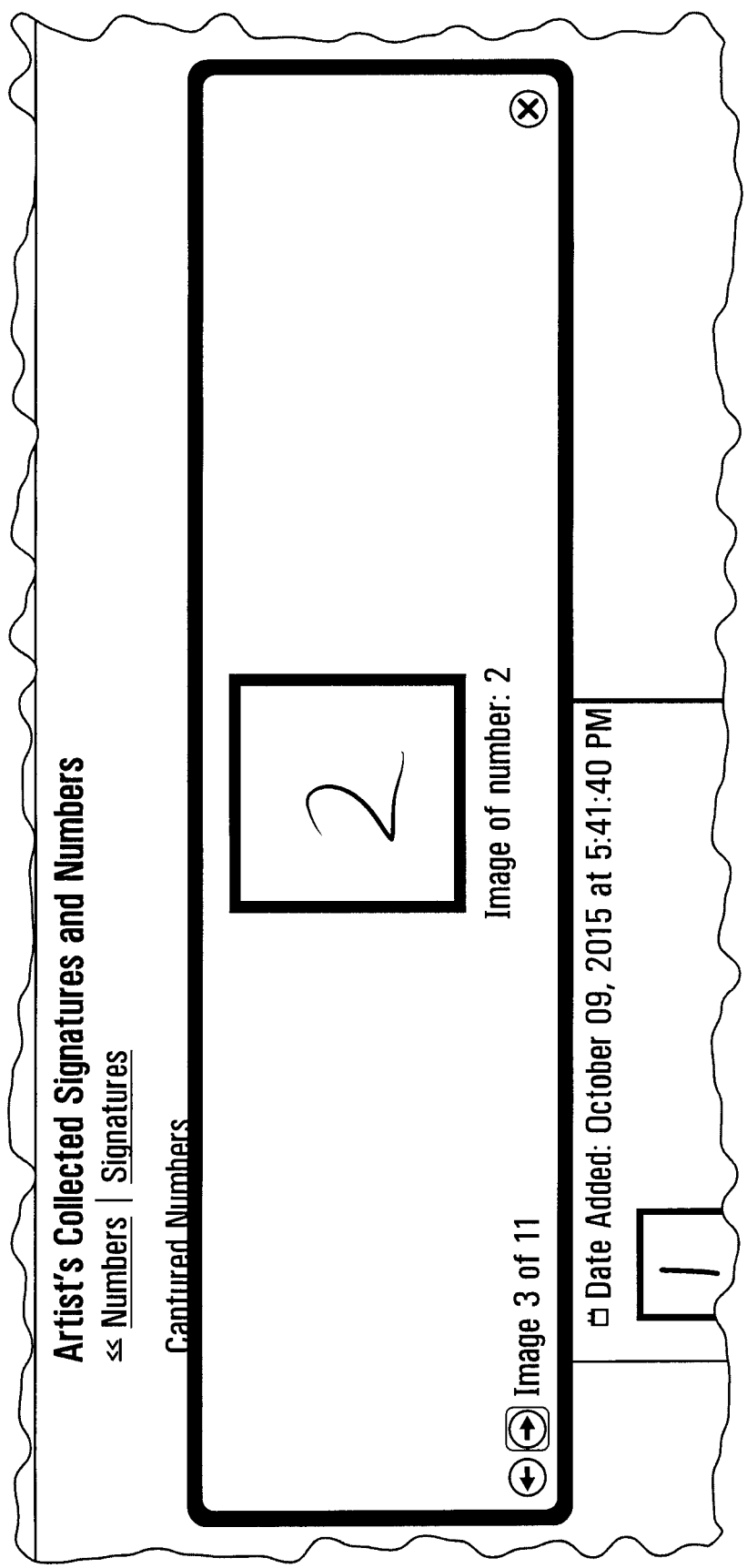

In some embodiments, if an administrator clicks on any of the image thumbnails of a handwritten signature or a handwritten number, an enlarged view of the handwritten signature or the handwritten number may be presented, for example, as shown in FIG. 27.

Figure 28:
Figure 29:
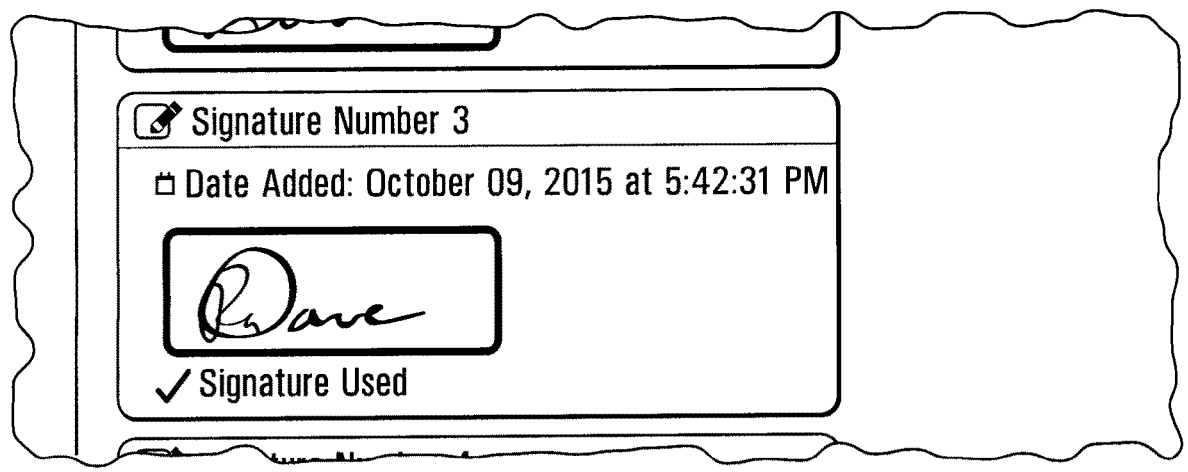

When an administrator clicks on a link provided by server 30, such as the "Signatures" link as shown in FIG. 28, the handwritten signatures captured for the artist may be displayed. If an artist's handwritten signature has been used, server 30 may indicate that it has been used. For example, as illustrated in FIG. 29, server 30 may cause the handwritten signature as displayed on the web application to be greyed out and a note under the image may state that is has been used on a piece of limited edition of an object.

Figure 30:
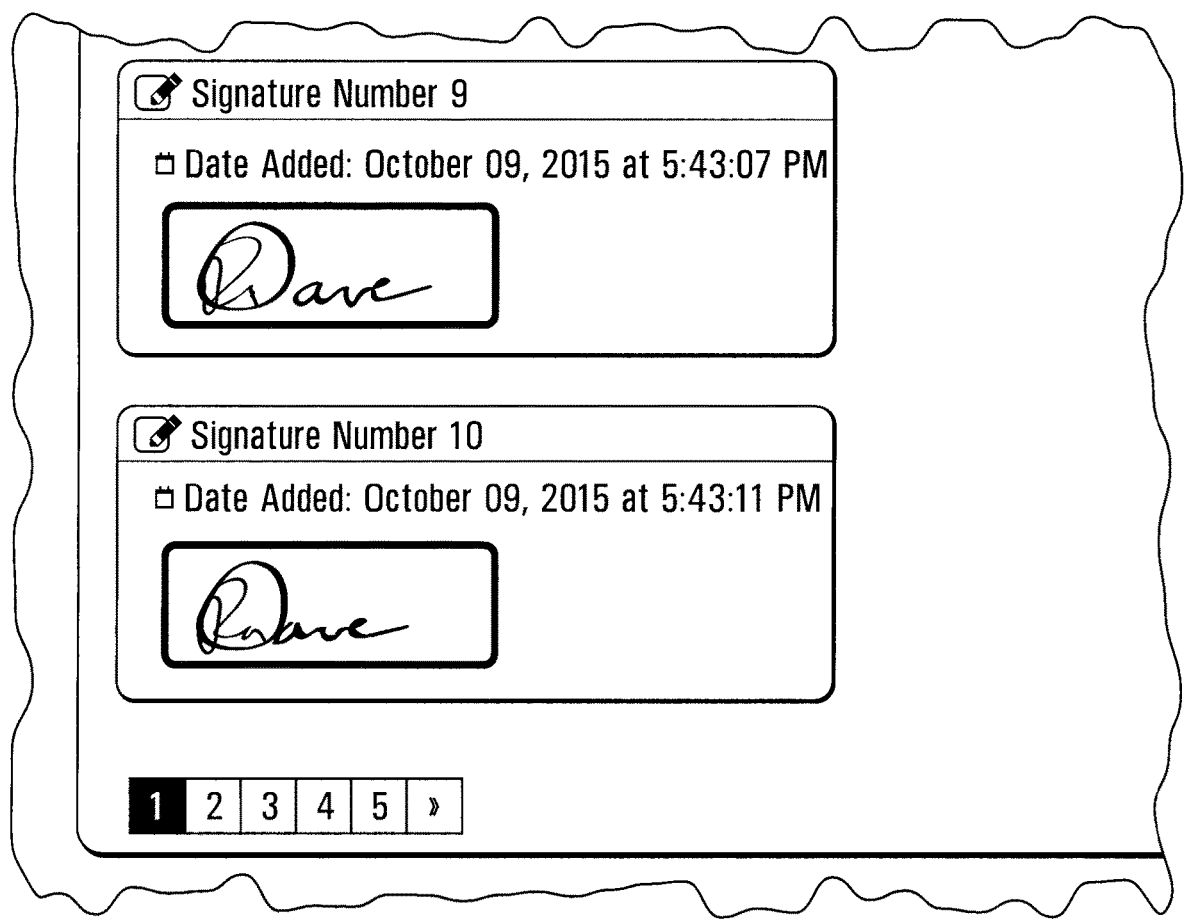

In some embodiments, ten artist signatures 310 may be displayed per page of the web interface by server 30. Server 30 may provide buttons at the bottom of each page of the web interface, such as the ones shown in FIG. 30, for the administrator to control which page of the web interface to be viewed.

A signature capture request may only be deleted if there are no artist signatures 310 captured.

In some embodiments, once an inventor of handwritten signatures has been created and recorded for an artist, a project associated with a project ID may be created when a limited edition of an object has been released. Server 30 may cause a number of previously collected handwritten signatures to be reserved for a project, and may facilitate an administrator to call on demand a handwritten signature for a limited edition of the object. When a project is created, the number of limited editions of the object may need to be known so that the handwritten signatures and handwritten numbers are assembled by server 30 as required.

Figure 31:

On the user interface provided by server 30, an administrator may click on a tab, such as the "Absolut Art" tab as shown in FIG. 31, and a link, such as the "Artist Projects" link as shown in FIG. 31, in order to view and create a project. A screen is presented, such as the screen shown in FIG. 31, where the administrator may be able to select the projects to view. In some embodiments, the administrator may view all projects, projects that may be complete, or projects that may be incomplete.

To create a new project, an administrator may click on a link, such as the "Create New Project" link as shown in FIG. 31, and a screen may be displayed to the administrator, such as the screen shown in FIG. 32.

Figure 33:
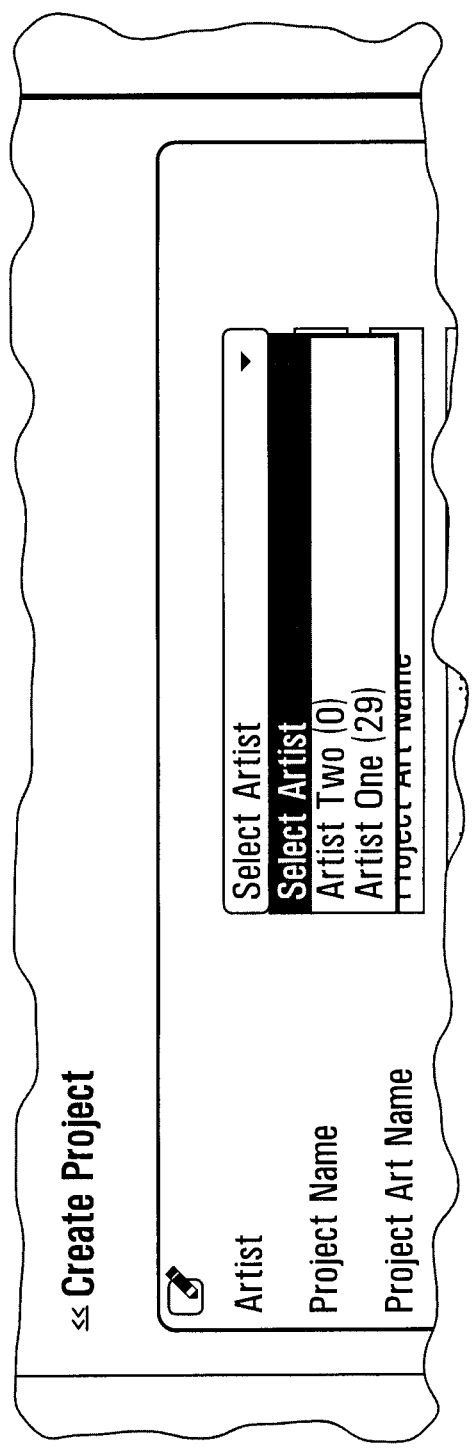

To create a new project, which may be associated with a project ID, an administrator may select the artist name from a dropdown list, where the number of signatures remaining in the artist's inventory of signatures may be displayed, for example, in brackets, as shown in FIG. 33. An administrator may then enter a project name, which may help identify the project once the on demand handwritten signatures may be required to be plotted by plotting apparatus 20. An administrator may then enter a project object name, which may be associated with an art ID. An administrator may then enter the total number of limited editions 330 of this particular object. Server 30 may not allow total number of limited editions 330 to be larger than the number of handwritten signatures that are remaining in this artist's inventory. The administrator may then click on a button provided by server 30, for example the "Create Project" button, to create and save the project.

In some embodiments, the administrator may enter any notes about the project.

Figure 34:

Once a project has been created, the administrator may be able to track the progress of the project. The administrator may be able to see how many handwritten signatures have been applied to date, and using a button provided by server 30, such as the "Options" button as shown in FIG. 34, the administrator may see the images of the handwritten signatures that have been used for limited editions of an object to date.

Figure 35:
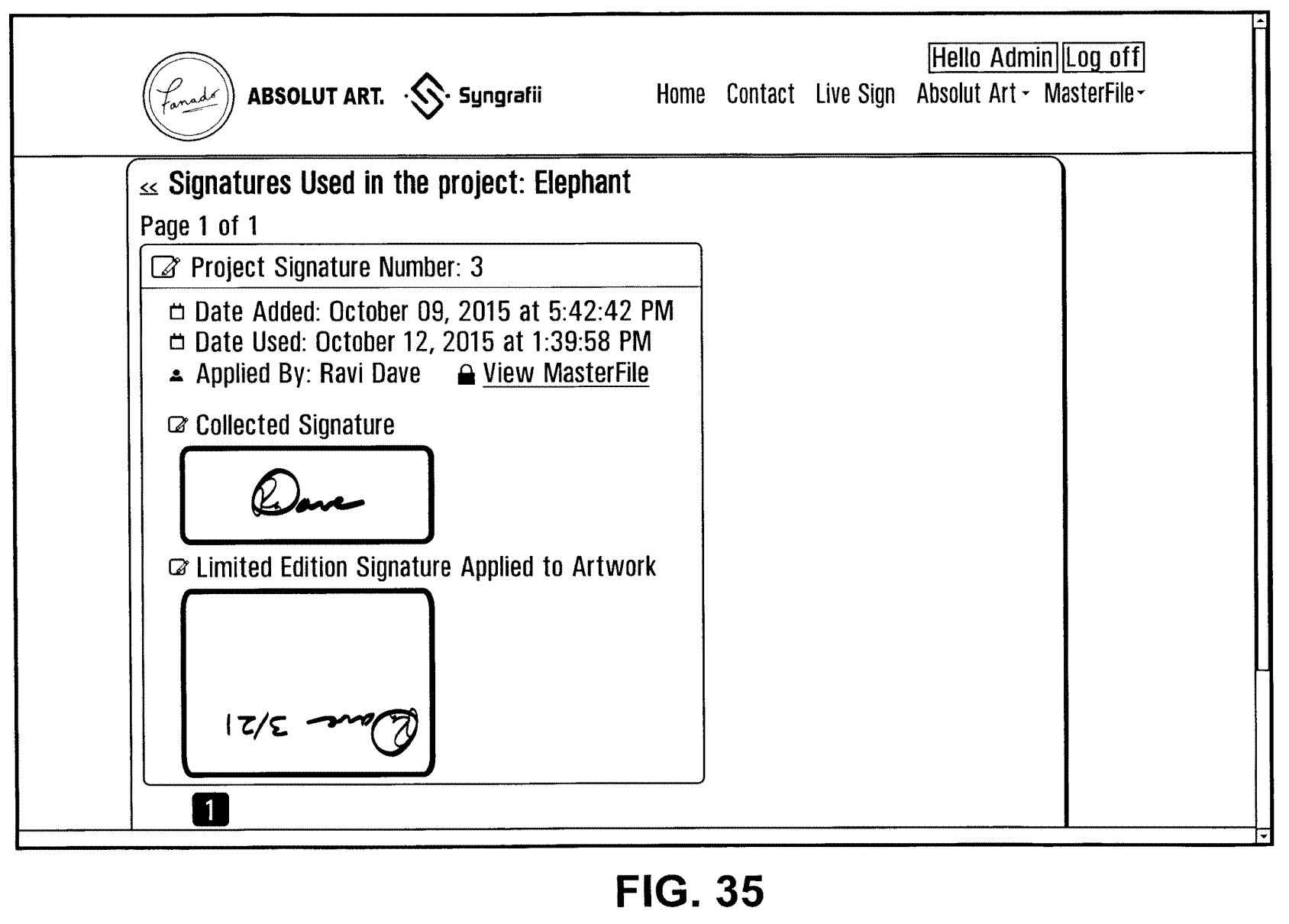

In some embodiments, when an administrator clicks on a link provided by server 30, such as the "View Used Signatures" link shown on FIG. 35, the administrator may see a screen, for example the screen shown on FIG. 35, that may show the date and time when the handwritten signature intended to be plotted on a limited edition of an object was added and used. Server 30 may also record which administrator applied the handwritten signature to the limited edition of the object, an image of the handwritten signature that was collected, and an image of composite signature 300 that was plotted by plotting apparatus 20.

In some embodiments, server 30 may record a MasterFile™, as described herein, of the transaction.

In some embodiments, server 30 may provide a link to the MasterFile record, which may show information associated with the signing session and may show snapshots from plotting apparatus 20 of the object before and after the object was plotted.

In some embodiments, a handwritten signature may be used only once.

In some embodiments, the object being plotted may be a physical object or a digital object.

An administrator may delete a project if none of the handwritten signatures intended to be plotted on limited editions of an object have been used on demand.

In some embodiments, a Print on Demand application may be used to plot composite signature 300 on a limited edition of an object. The Print on Demand application may be accessed from any device, for example a laptop or tablet, to select the project, artist signature 310, edition number 320, and total number of limited editions 330, and may make adjustments to composite signature 300. Server 30, or alternatively, an operator of plotting apparatus 20 may authorize plotting apparatus 20 to plot composite signature 300 on the limited edition of the object. A live view of the object under plotting apparatus 20 may be shown so that the position, size and other variables of composite signature 300 may be adjusted to fit the available space.

In some embodiments, to launch the Print on Demand application, on a web application provided by server 30, an operator may click on a tab provided by server 30, for example the "Absolut Art" tab, and then a link provided by server 30, for example the "Signature—Print on Demand" link. Server 30 may display a screen, for example the holding screen as illustrated in FIG. 36.

In some embodiments, the holding screen as shown in FIG. 36 may be displayed until a plotting session is started by server 30 or operator to plot composite signature 300 onto a limited edition of an object. In some embodiments, the session may be a referred to as a "Signing Session".

In some embodiments, there may be one Signing Session associated with a connection between server 30 and plotting device 20.

Figure 37:
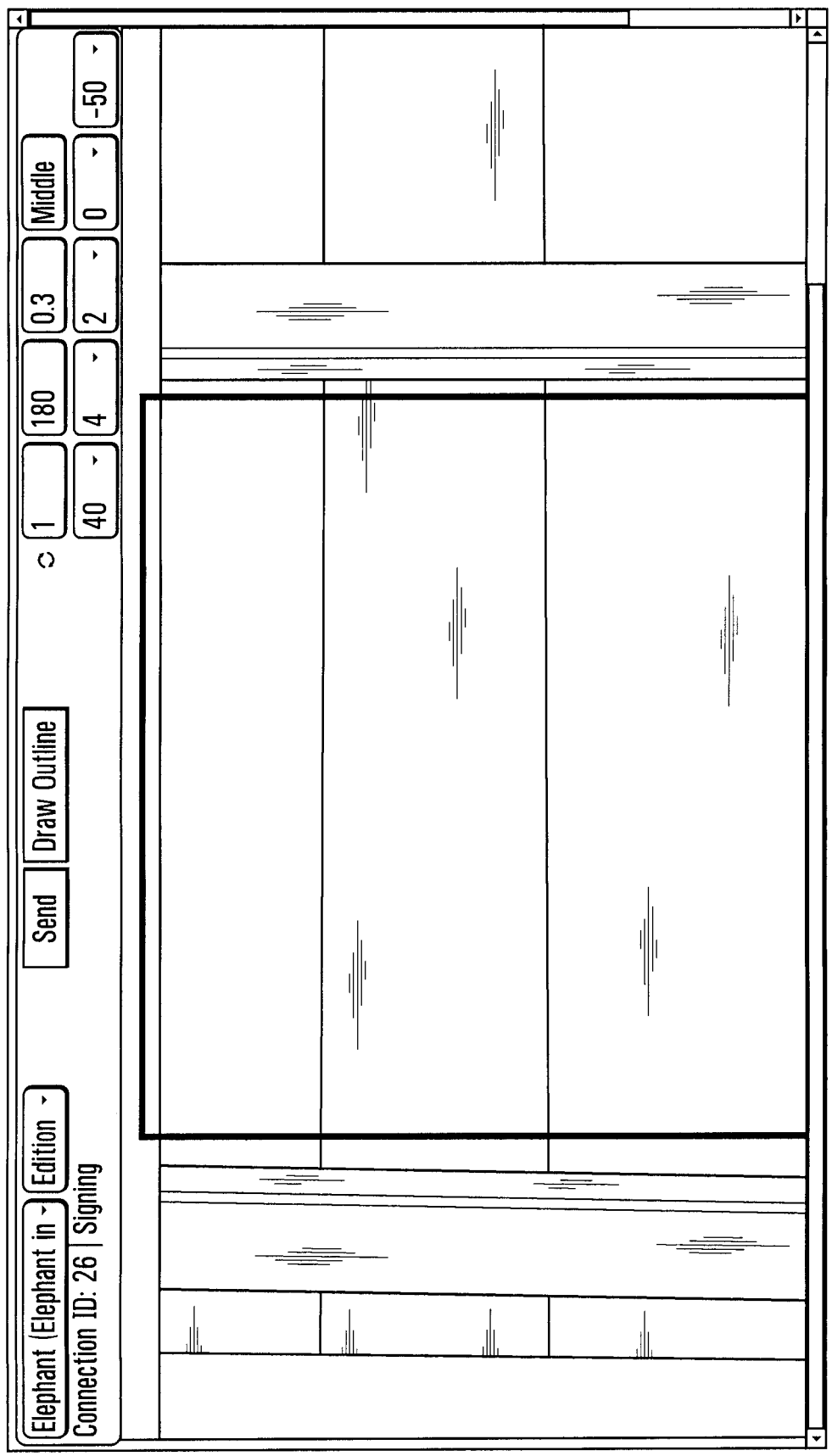
FIGS. 37-43 are example images of a camera feed of a plotting surface.

Once a Signing Session has started, the holding screen may transition into a live image feed from plotting apparatus 20, for example, as shown in FIG. 37.

Figure 38:
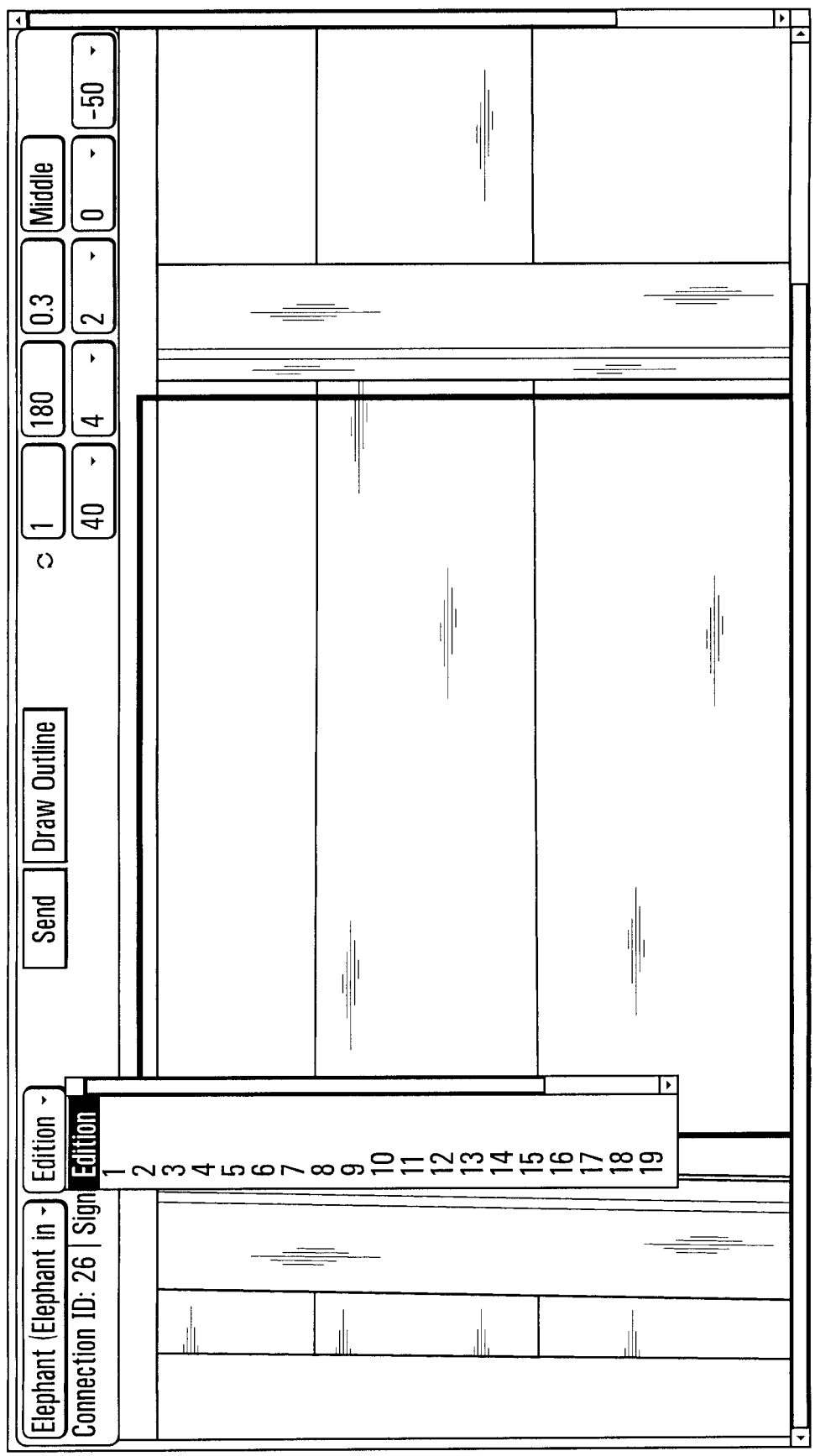

In some embodiments, as shown in FIG. 38, a project name may be selected, by server 30 or operator, at the top of the screen, followed by edition number 320 that may be printed on demand by plotting apparatus 20.

Figure 39:
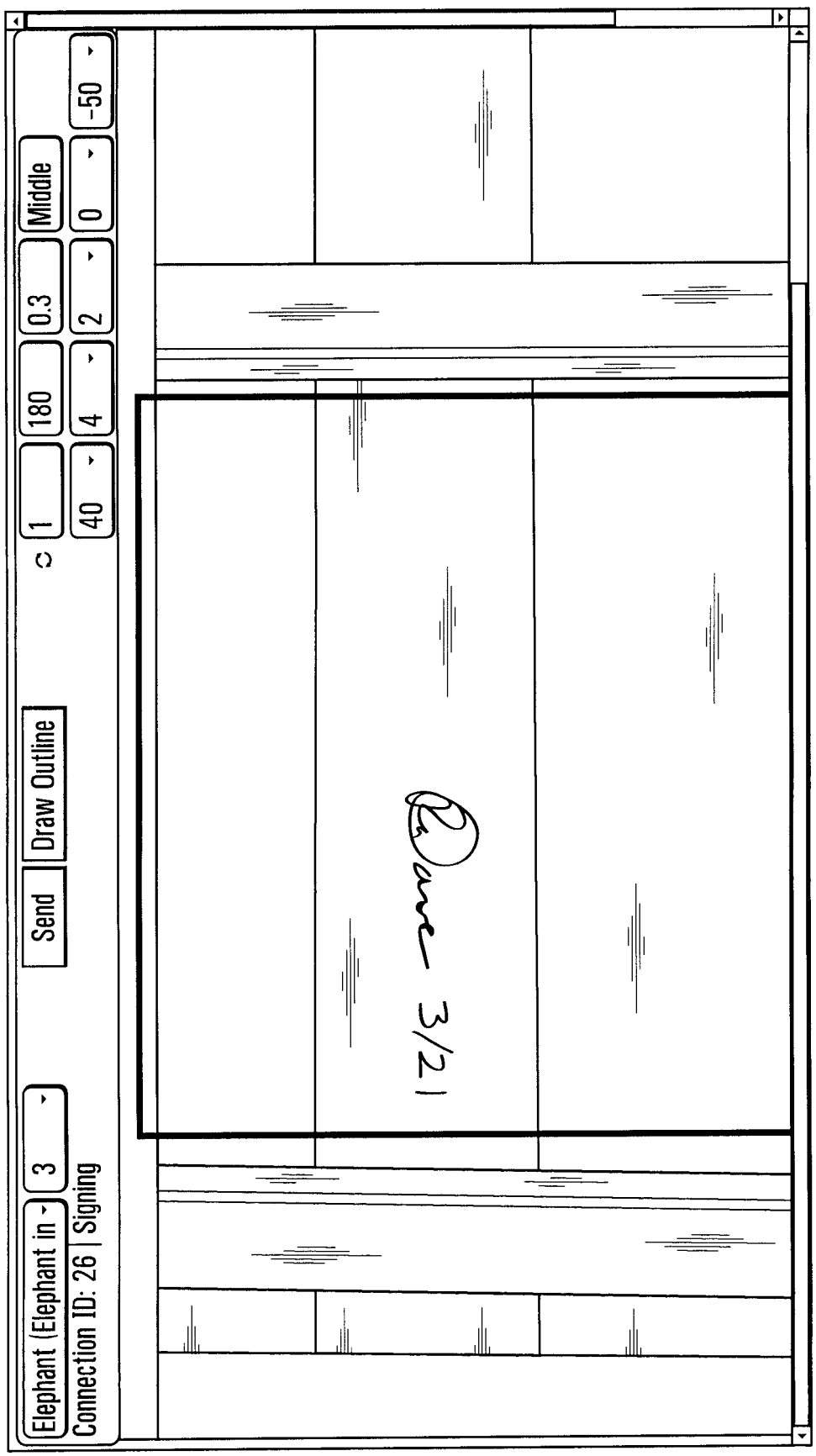

Once edition number 320 is selected, artist signature 310, edition number 320 and total number of limited editions 330 in this project may be retrieved by server 30 and may be compiled into composite signature 300. Server 30 may display composite signature 300 on the live image feed of the Print on Demand application in a "digital ink", as shown in FIG. 39. The digital ink may be in any suitable cover, for example, blue. This digital ink may allow the operator to preview and configure composite signature 300 before applying it to the object.

Once composite signature 300 is retrieved, compiled, and displayed in the live image feed of the Print on Demand application, it may be manipulated in order to accommodate for certain variables. For example, these variables may include differences in the size of composite signature 300, size of the object, or other variations as described herein.

Figure 40:
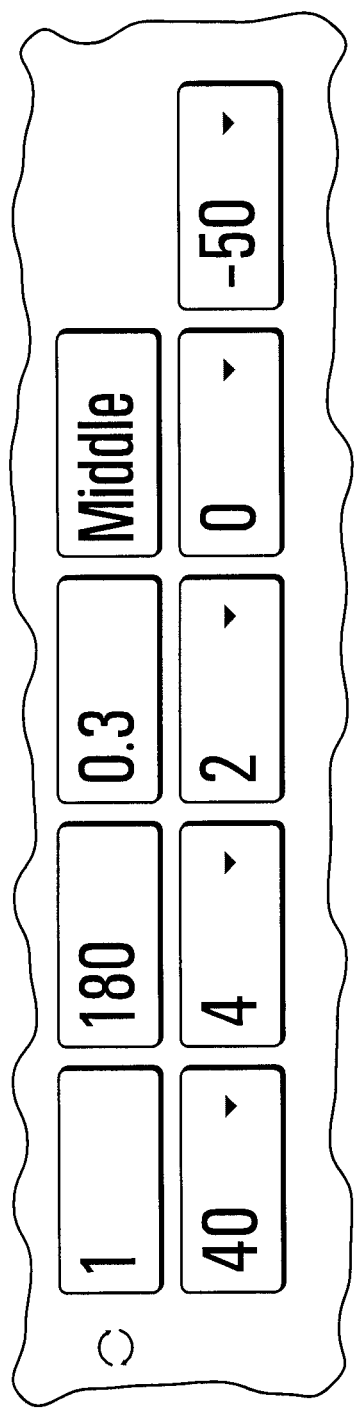

In some embodiments, an operator may have one or more signature manipulation options available, as shown in FIG. 40. For example, an operator may manipulate the signature scale, which may be the size of composite signature 300. An operator may select a scaling number to multiply to the size of composite signature 300, which may cause server 30 to change the size of composite signature 300 by the scaling number. For another example, an operator may manipulate the signature rotation, which may be the rotation to apply to composite signature 300. For yet another example, the operator may manipulate a number-to-signature size ratio, which may be the size of edition number 320 and total number of limited editions 330 in relation to artist signature 310. Manipulating the number to signature ratio may facilitate the operator to increase or decrease the size of edition number 320 and total number of limited editions 330 to a maximum height equal to the height of artist signature 310. In yet other examples, the operator may manipulate: the number position, which may be the vertical alignment of edition number 320 and total number of limited editions 330 in relation to artist signature 310; the signature space, which may be the space in between artist signature 310 and edition number 320 and total number of limited editions 330 that follow artist signature 310; the number space, which may be the space in between each of the individual numbers that may comprise edition number 320 and total number of limited editions 330; the splash space, which may be the space before and/or after the slash "/"; the nudge number, which may be the number of pixels by which to move edition number 320 and total number of limited editions 330 slightly up or down; and/or the nudge signature, which may be the number of pixels by which to move composite signature 300 slightly up or down.

In some embodiments, an operator may reset the size and/or orientation of composite signature 300 to its default size and/or orientation by clicking on an icon, for example the reset icon to the left of the options as shown in FIG. 40.

Once composite signature 300 has been adjusted as desired, the operator may either cause server 30 to send composite signature 300 to plotting apparatus 20, or for test purposes, may cause server 30 to send an outline of composite signature 300 to an article other than the limited edition of the object, such as a piece of paper, so that the operator at plotting apparatus 20 may see the adjusted size of composite signature 300.

Figure 41:
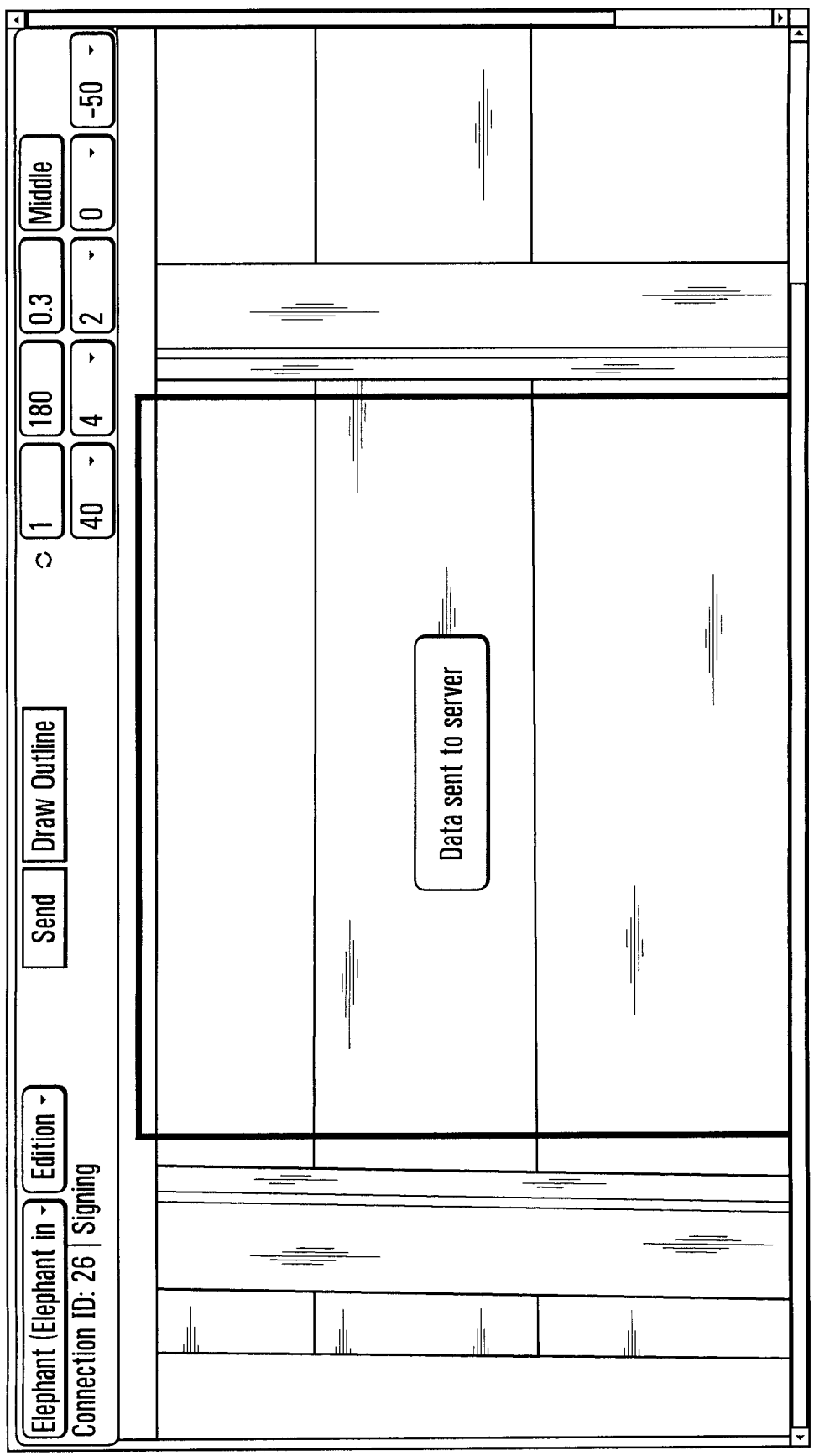

Once an operator clicks on a button, for example the "Send" button as shown on FIG. 41, composite signature 300 may be sent to plotting apparatus 20 for plotting.

Figure 42:
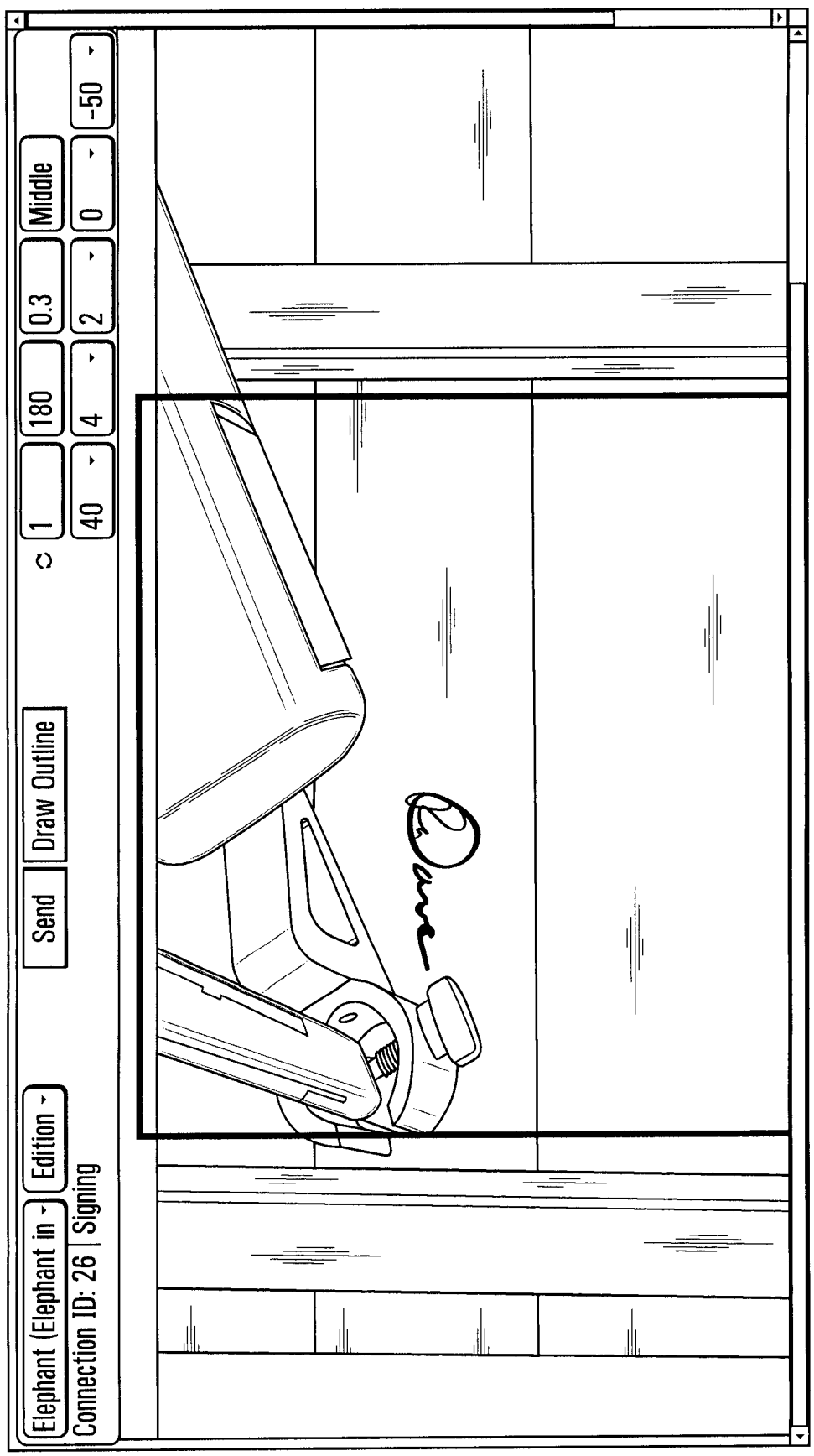

The live image feed on the Print on Demand application may be updated in real time or near real time, as composite signature 300 is applied to the limited edition of the object, as shown in FIG. 42.

Figure 43:
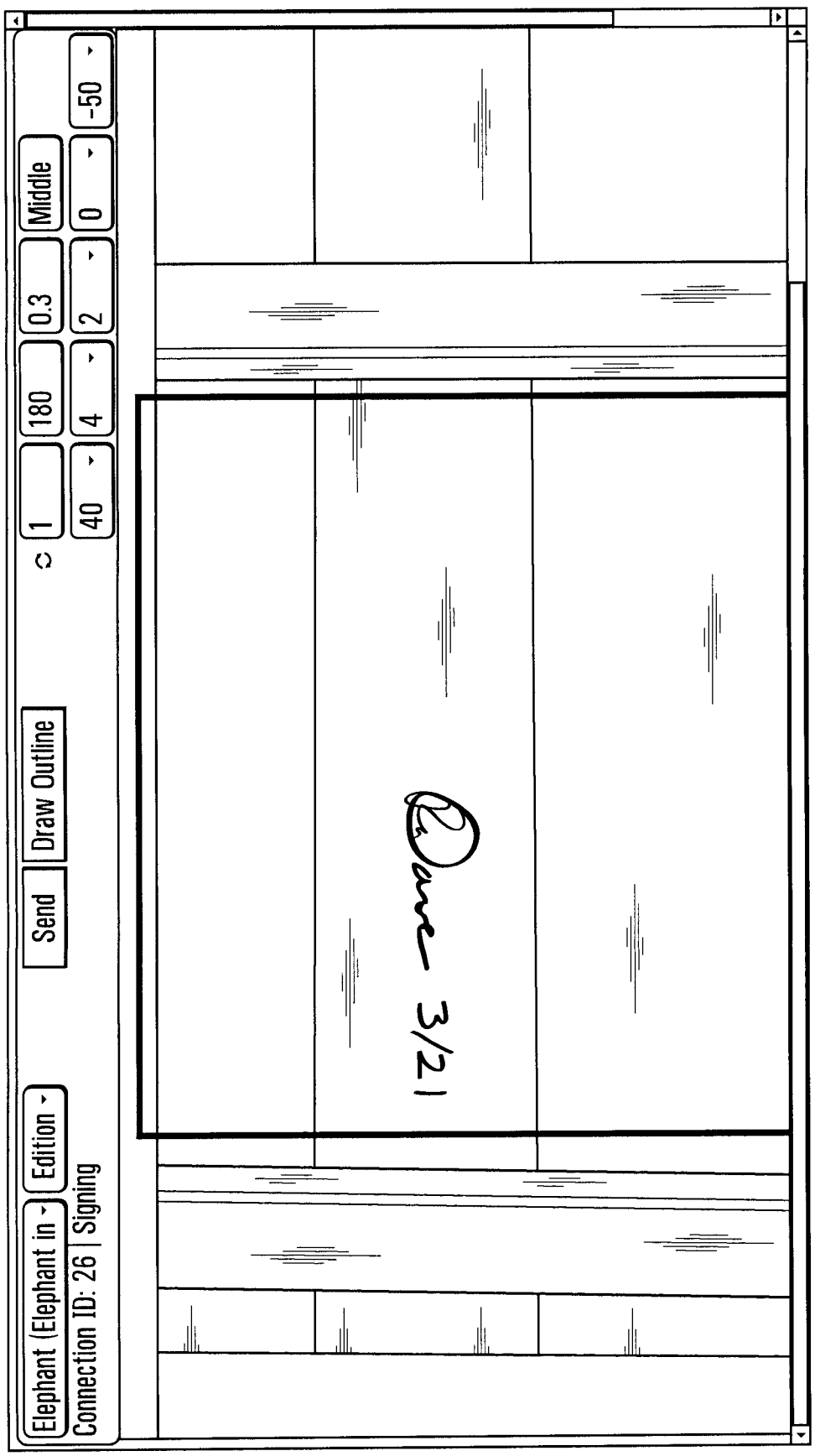

In some embodiments, the live image feed on the Print on Demand application may display the completed composite signature 300 on the limited edition of the object as shown in FIG. 43 once plotting apparatus 20 has finished plotting composite signature 300.

At this point, the Signing Session may be ended or another composite signature 300 may be applied.

Example Web Interface and Work Flow of Plotting Apparatus

Example operation of plotting apparatus 20 is disclosed. A plotting application may be used by an operator at plotting apparatus 20 in order to control which user logged into a user application for signature collection may have access to plotting apparatus 20 at any given time. The operator may independently control each of one or more user applications for signature collection, which may give the user (e.g. artist) access to view or sign a document remotely.

In some embodiments, a document may be a physical document (e.g. a book or a painting) or may be a digital document (e.g. a digital photograph).

In one embodiment, at any given time, a user application for signature collection may be in one of a plurality of different states.

For example, the user application for signature collection may be in an idle states, which may be when the user application is connected to server 30 and a holding screen is displayed on a device, for example a tablet, and a user or artist has logged into the user application. The user may not have access to view or sign any documents when in this state.

In some embodiments, the user application for signature collection may be in a viewing state, in which the user utilizing the user application may have been granted viewing privileges from server 30. The user may be able to see the document that may be placed on plotting surface 230 of plotting apparatus 20 or uploaded to plotting apparatus 20 but not be able to sign it. This mode may useful in a session with one or more users engaging with the document on one or more user applications for signature collections.

In some embodiments, the user application for signature collection may be in a signing state, in which the user may have full access to view the document and sign the document, for example with the tablet's stylus or with their finger, to send electronic signals representative of their handwritten signatures or handwritten numbers to server 30. Server 30 may send the handwritten signatures or handwritten numbers to plotting apparatus 20 to be plotted onto the document.

In some embodiments, the user application for signature collection may be in a disconnected state, in which the user application may be disconnected from server 30. The user would have to sign into the user application in order to establish a new connection.

The ability for an operator to set a state for a user application for signature collection may enable the operator to have control over which user, which may be logged onto a user application, may view and sign documents in a preferred sequence. The operator may use a plotting application as described herein in order to apply these states to the user applications.

In one embodiment, the plotting application controlling plotting apparatus 20 may provide a primary interface with the operator. The plotting application may be installed at server 30 or a separate computing device connected to network 60.

Figure 44:
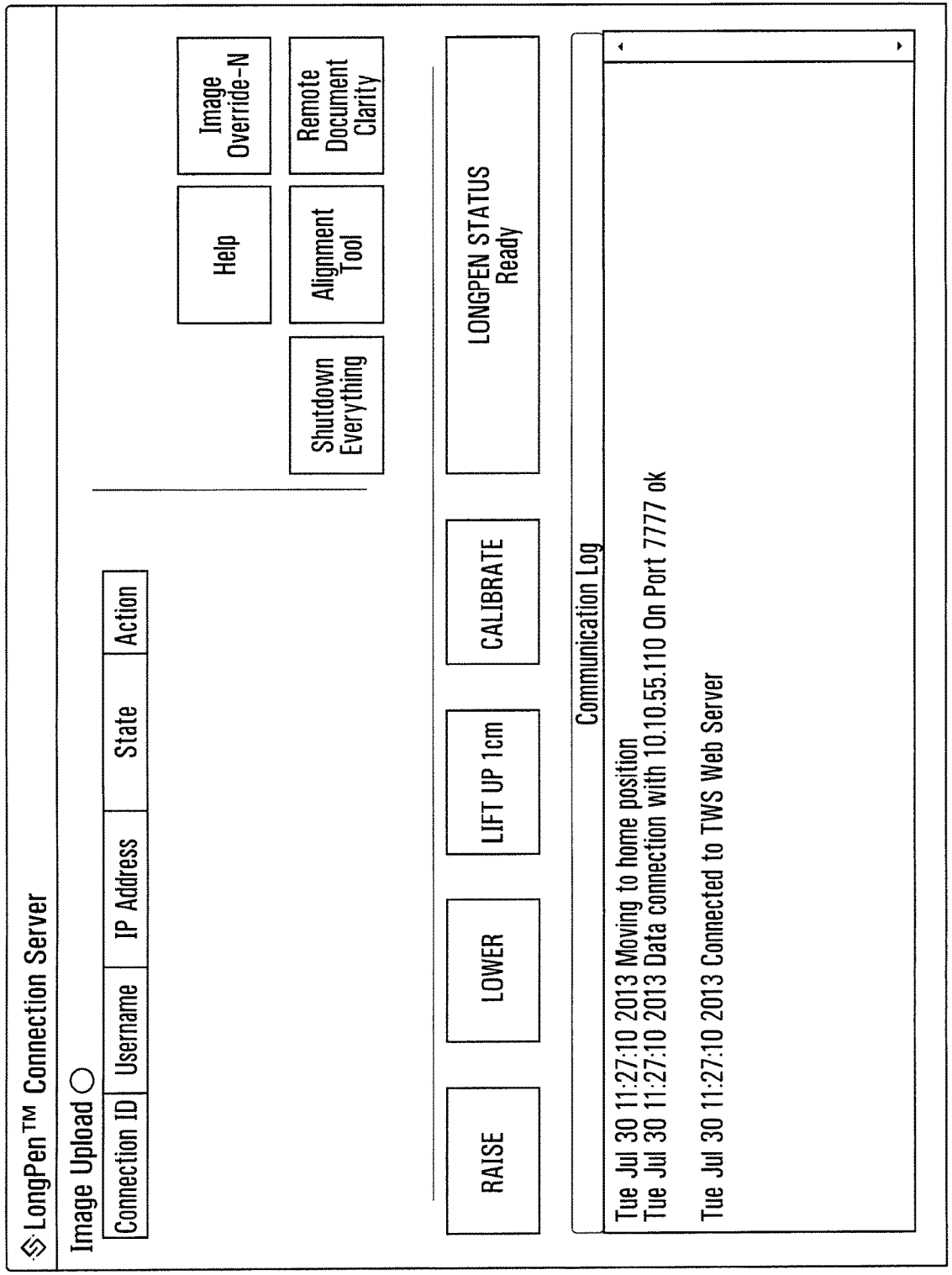
FIGS. 44-53 are example images of a user interface for user with a plotting device.

Once the plotting application has been launched and plotting apparatus 20 may be calibrated, server 30 may display the plotting application as shown in FIG. 44. The plotting application may be displayed on a device, for example a computer device with a monitor, associated with server 30. When plotting apparatus 20 is connected to server 30 correctly, a message may confirm this correct connection. For example, the message "Connected to TWS Server" may be displayed in a communications log, as shown in FIG. 44. When plotting apparatus 20 is connected to server 30 correctly, plotting apparatus 20 may be ready to accept connections.

In some embodiments, "alignment" may refer to the corresponding relationship between the placement of writing as indicated on the screen of a device, for example a tablet, that may be running a user application, and where plotting apparatus 20 plots on a document or object. When properly aligned, plotting apparatus 20 may write in a place on the object where the writing is provided by an artist on the tablet. That is, an artist may utilize a user application at tablet to remotely, and in real time or near real time, sign an object through plotting apparatus 20.

A camera that may be associated with plotting apparatus 20 may be sensitive to movement in its position, which may result in a change of alignment. An alignment application may help to correct the alignment of plotting apparatus 20.

In some embodiments, a camera (e.g. webcam) may be installed on or connected to plotting apparatus 20.

Figure 45:
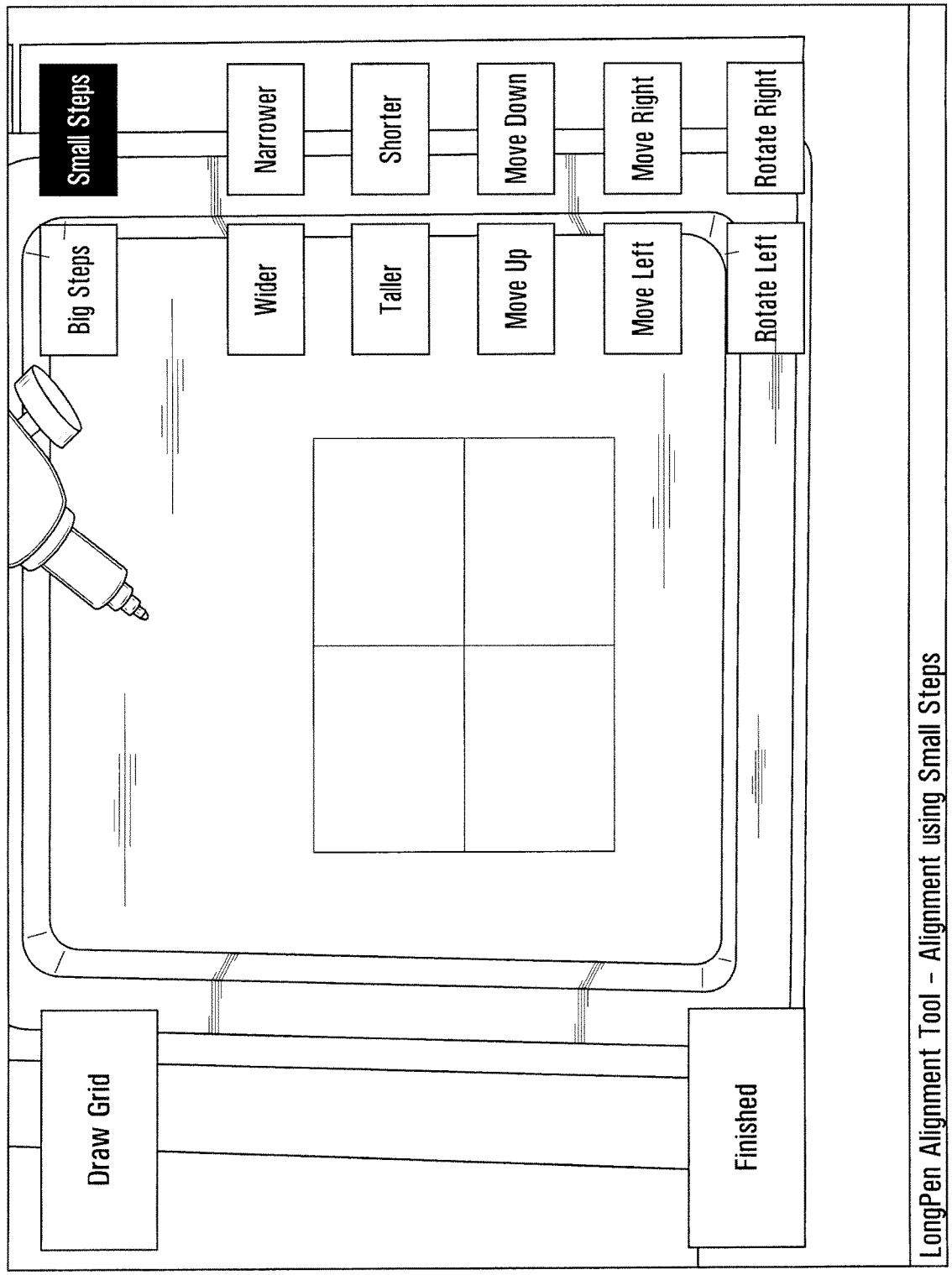

In some embodiments, an alignment tool may be provided. The alignment tool may be displayed by server 30 on a user screen. The operator may press a button provided by server 30, for example, a button labeled "Alignment Tool", as shown in FIG. 44. When the alignment tool is activated, the operator may see a live image feed from a document camera associated with plotting apparatus 20, and a number of buttons, as shown in FIG. 45. An operator may place a blank sheet of paper on plotting surface 230 when aligning plotting apparatus 20.

An operator may click on a button, for example, the "Draw Grid" button. This may cause server 30 to send a command to plotting apparatus 20 to draw a rectangular grid on the blank sheet of paper on plotting surface 230. A digital blue grid may also be applied by server 30 on the screen.

Figure 46:
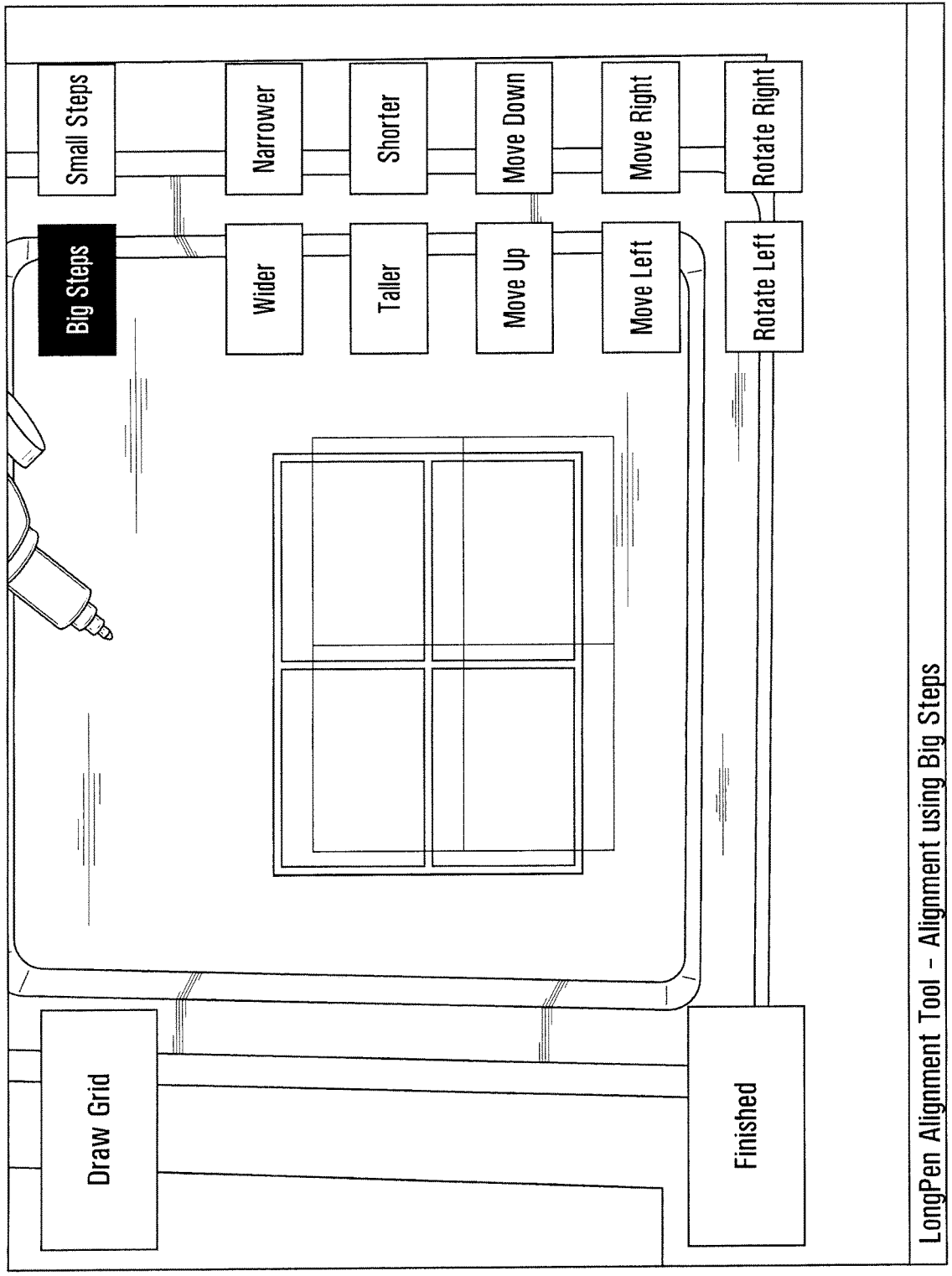

Once plotting apparatus 20 has drawn the rectangular grid, the digital blue may stay on the screen of server 30 running the alignment application. This may allow the operator to align the drawn rectangular grid on the paper to the digital blue grid on the screen. A combination of the buttons provided by server 30, for example, on the right hand side of the alignment application as shown in FIG. 46, may help the operator align the drawn rectangular grid with the digital blue grid. In some embodiments, server 30 may provide a description of the functionality of a button if the operator places a cursor over the button.

Figure 47:
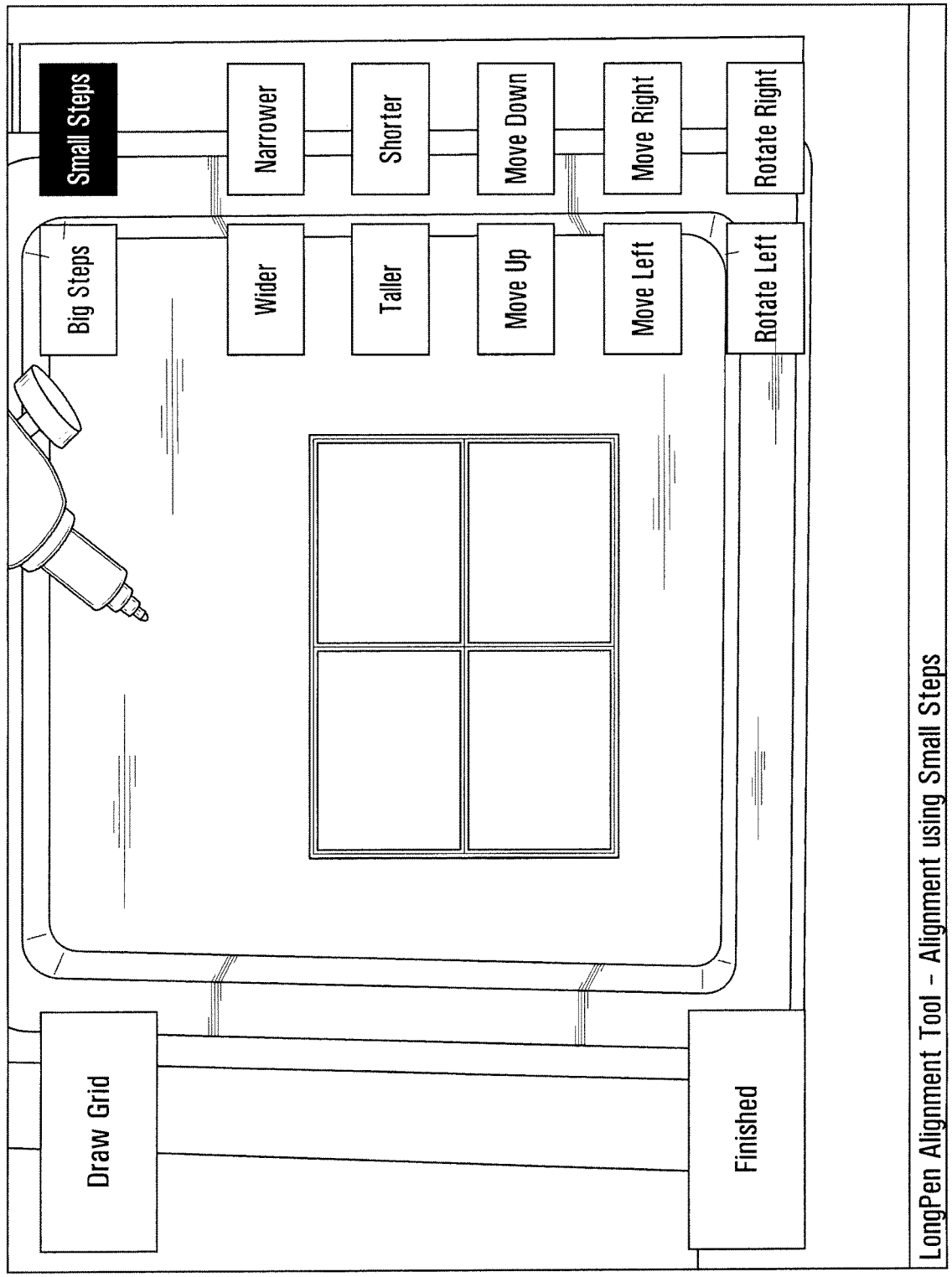

As shown in FIG. 47, alignment of plotting apparatus 20 may be complete when the rectangular grid drawn on the paper by plotting apparatus 20 is aligned with the digital blue grid applied on the screen by server 30.

Upon completion of the alignment of plotting apparatus 20, the operator may click a button to signal end of alignment process, for example the "Finished" button as shown in FIG. 47. This may cause server 30 to record the alignment data and server 30 may return the operator to the plotting application as shown in FIG. 44.

Figure 48:
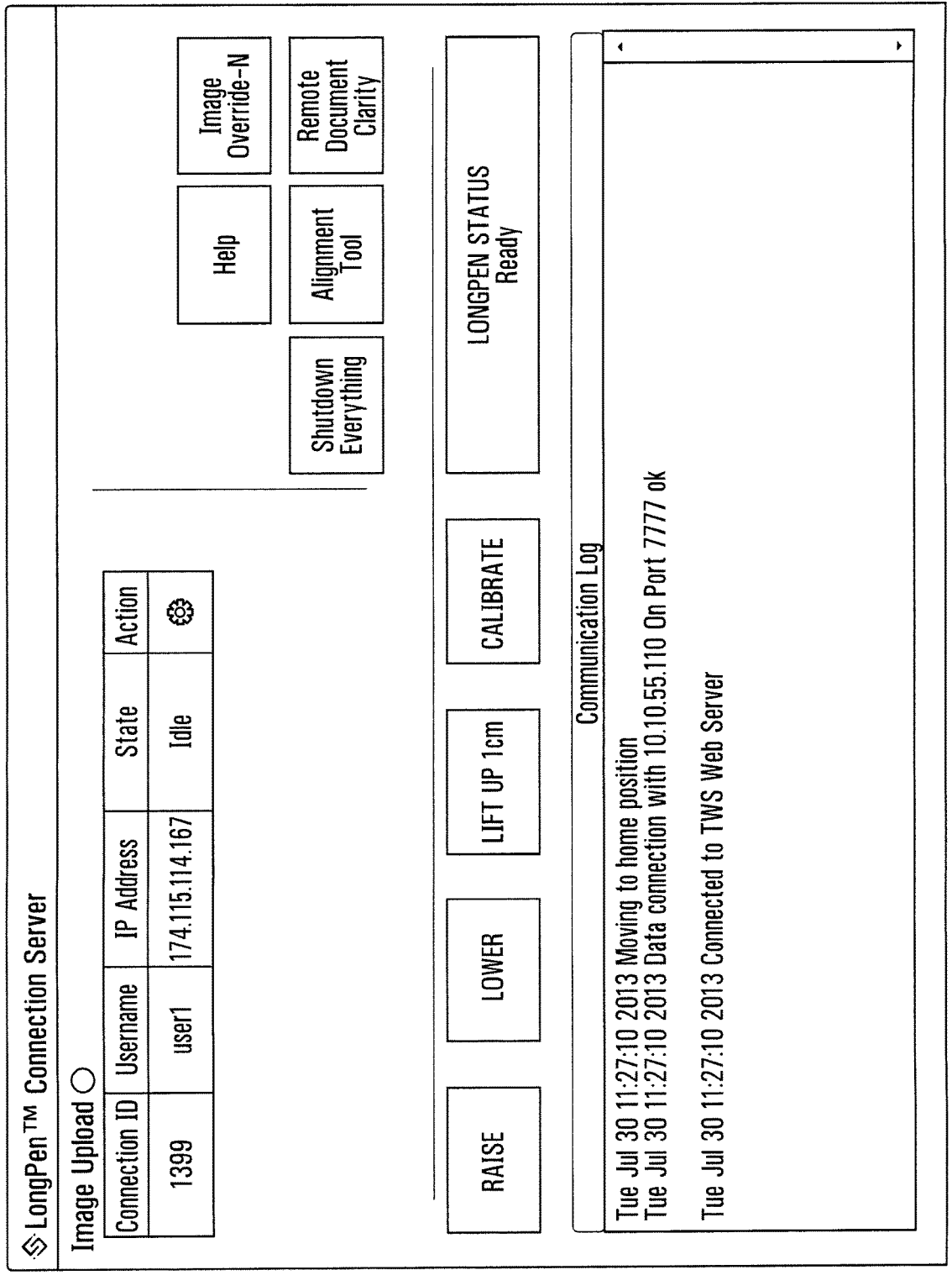

In some embodiments, there may be a notification at the upper left of the plotting application that indicates if images may be sent to the server. For example, if the circle, as shown in FIG. 48, may be solid green, then the document images may be sent to server 30. The image upload may occur when the current connections may be in a signer state or viewer state.

When a user logs into a user application launched on a device, for example a tablet, a table on the plotting apparatus may be updated by populating information into the table. The information may include a connection ID associated with the user, username, the user's IP address, the state associated with the user application, and an action symbol, as shown in FIG. 48.

Figure 49:
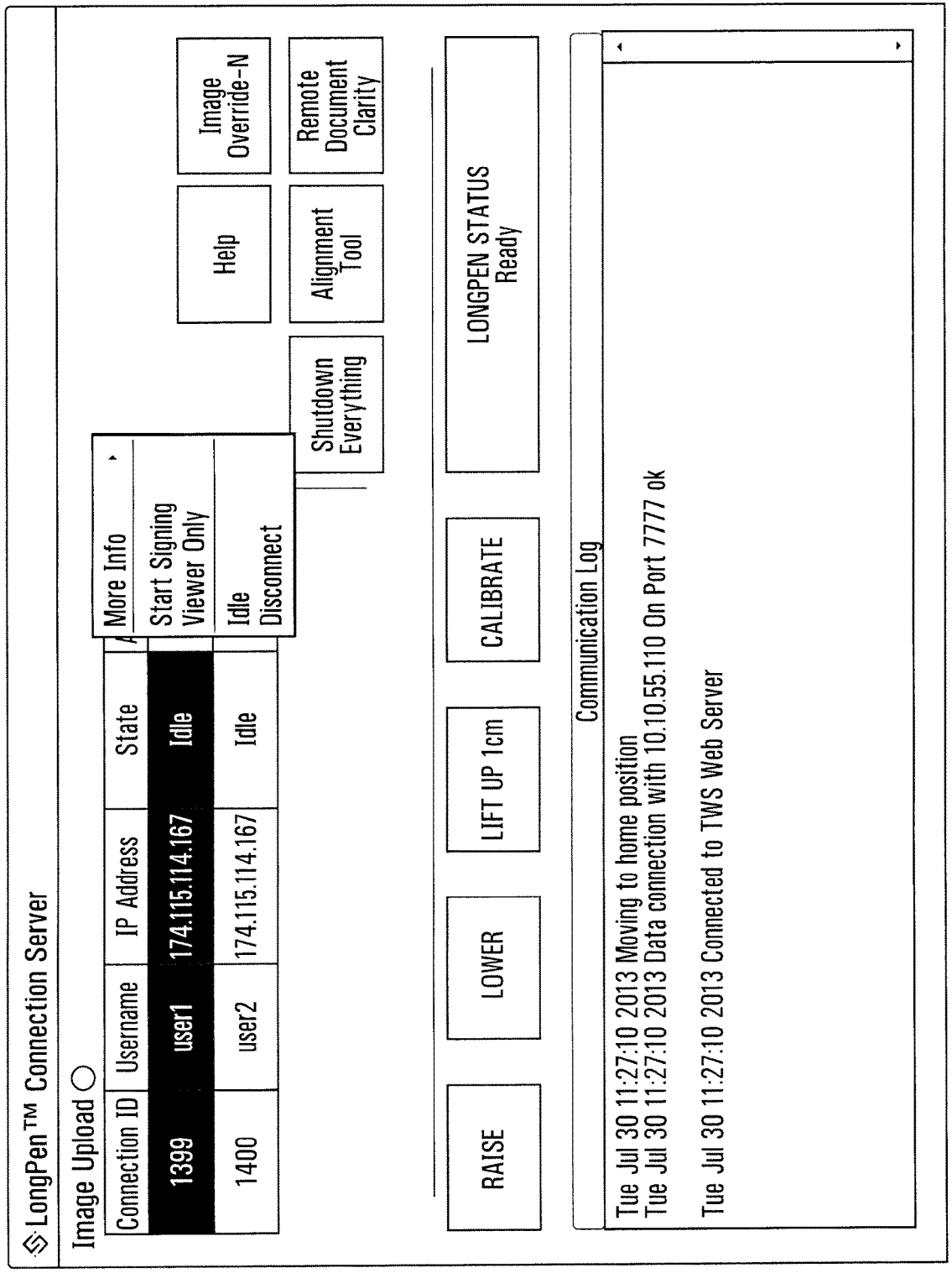

When "Action" button located at the top row of the table is clicked, as shown in FIG. 49, server 30 may display a menu with additional options for each row of the table. For example, one option that may be displayed by server 30 may be the option for the operator to change the state of a user application and/or a connection associated with a user application.

Figure 50:
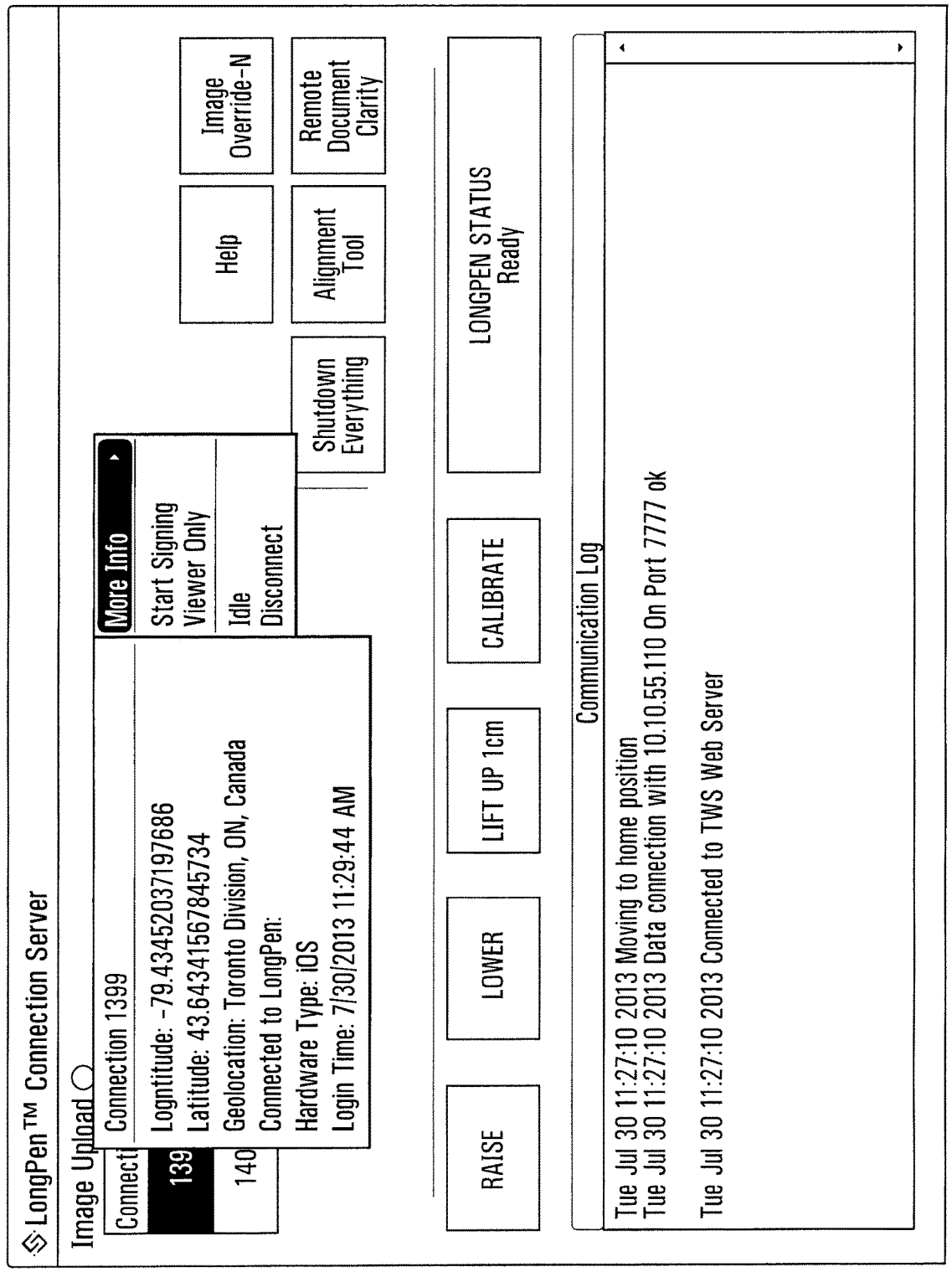

The operator may place a mouse cursor over a button, for example the "More Info" button as shown in FIG. 50, which may cause server 30 to display additional information associated with a user application and/or a connection associated with a user.

Figure 51:
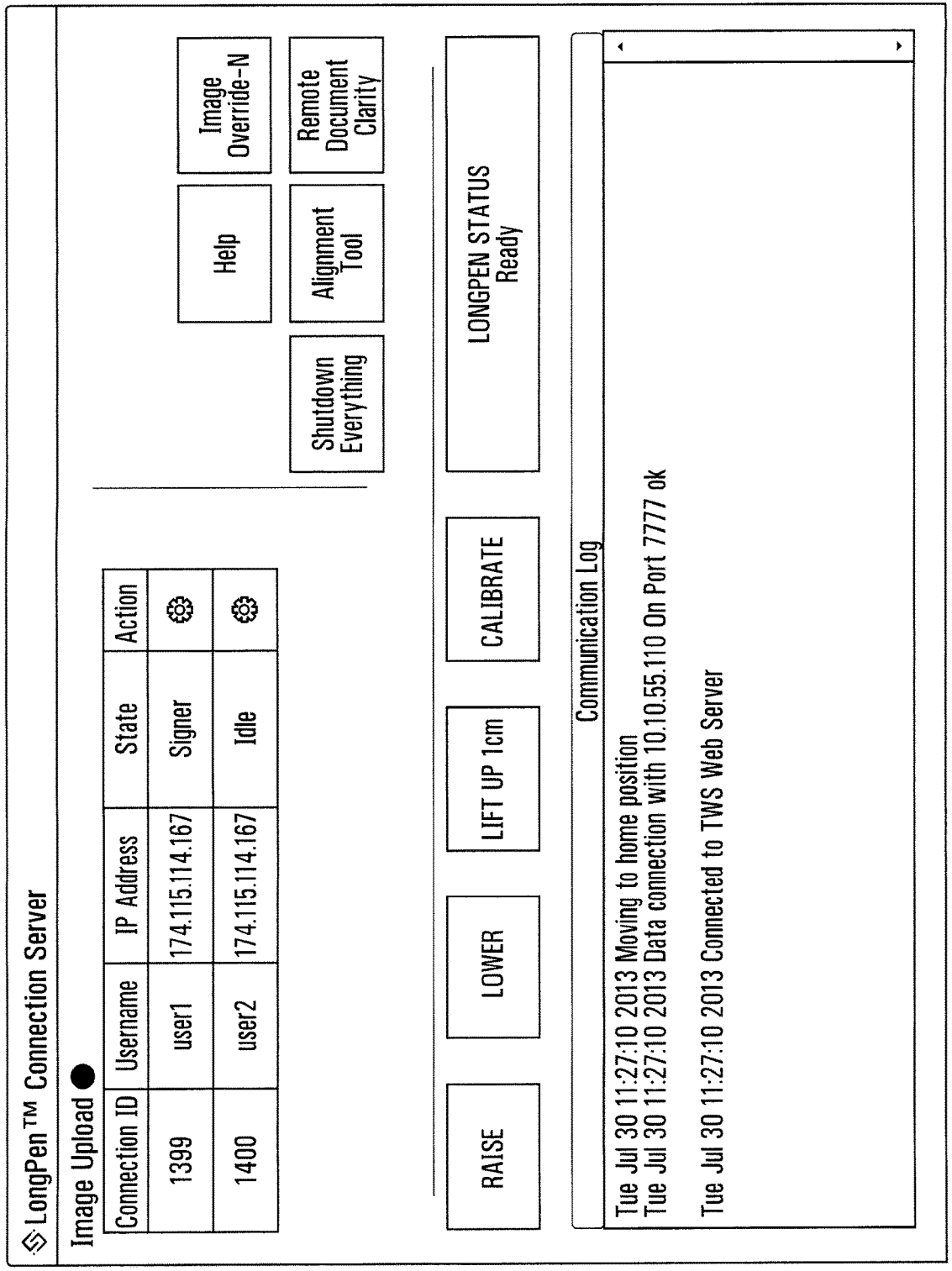

In some embodiments, when a document is to be signed, the operator may cause server 30 to change a user application's state from idle to signing by clicking on the 'Start Signing' button as shown under the "Action" menu in FIG. 50. FIG. 51 may show two connections in the plotting application. One user application designated by user1, may have a state of signing. A second user application designated by user 2, may have a state of idle. This may mean that user 1 may see and sign the document at placed on plotting surface 230 of plotting apparatus 20 and user 2 may not see anything at all. For example, user 2 may only see a waiting screen or welcome screen. The image upload notification, as shown in FIG. 51, may be a solid green circle since at least one connection, namely user 1, may be a viewer or signer.

Figure 52:
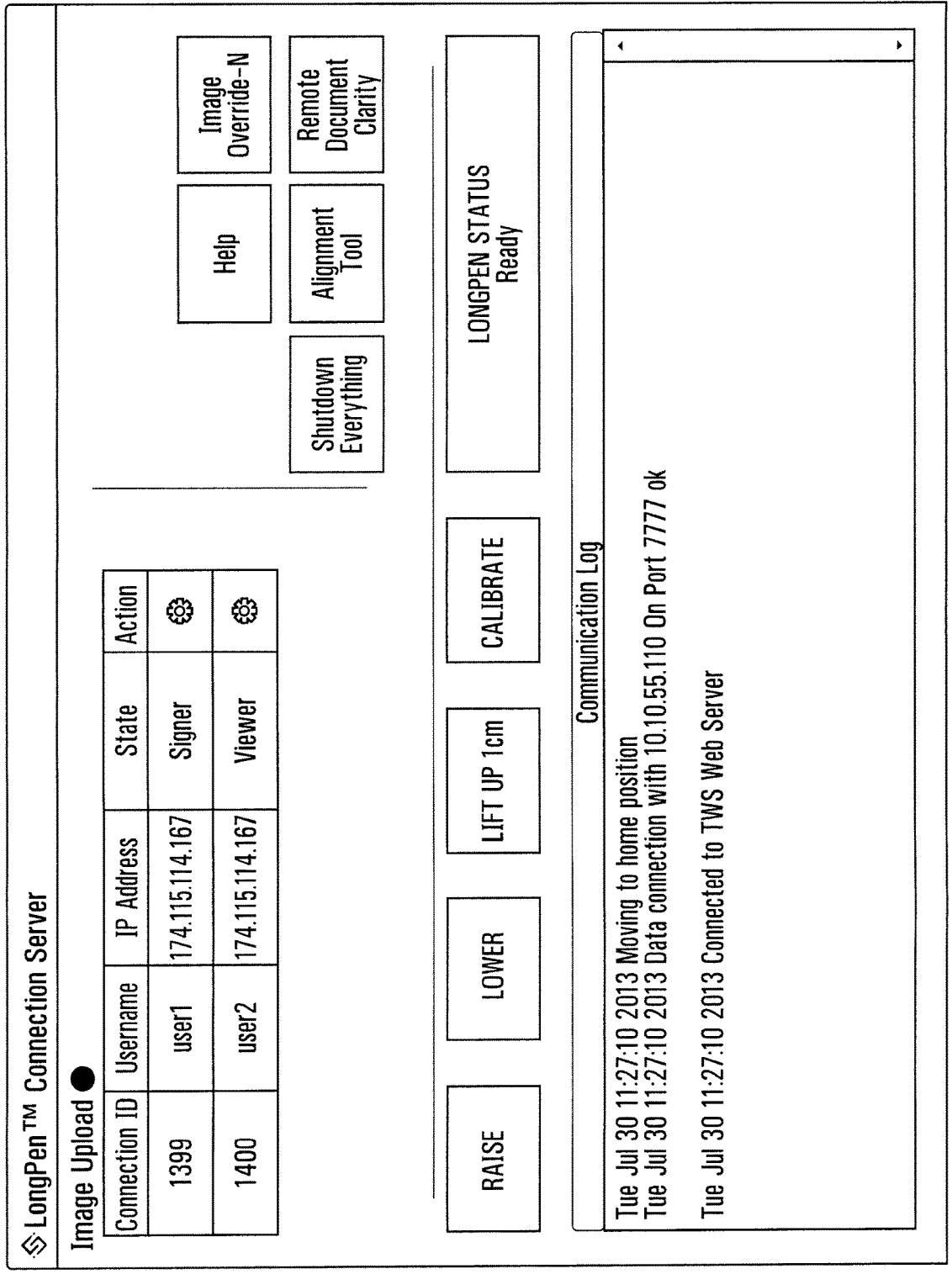

The operator may be able to change the state of a user application at any time as needed. For example, in FIG. 52, the operator may have one connection, such as user 2, in a viewer state, while the other connection, user 1, may be in a signing state.

In some embodiments, the operator of plotting apparatus 20 may set both connections to signer states. However, this may cause some confusion as to which of the users associated with the connections may sign the document first.

Figure 53:
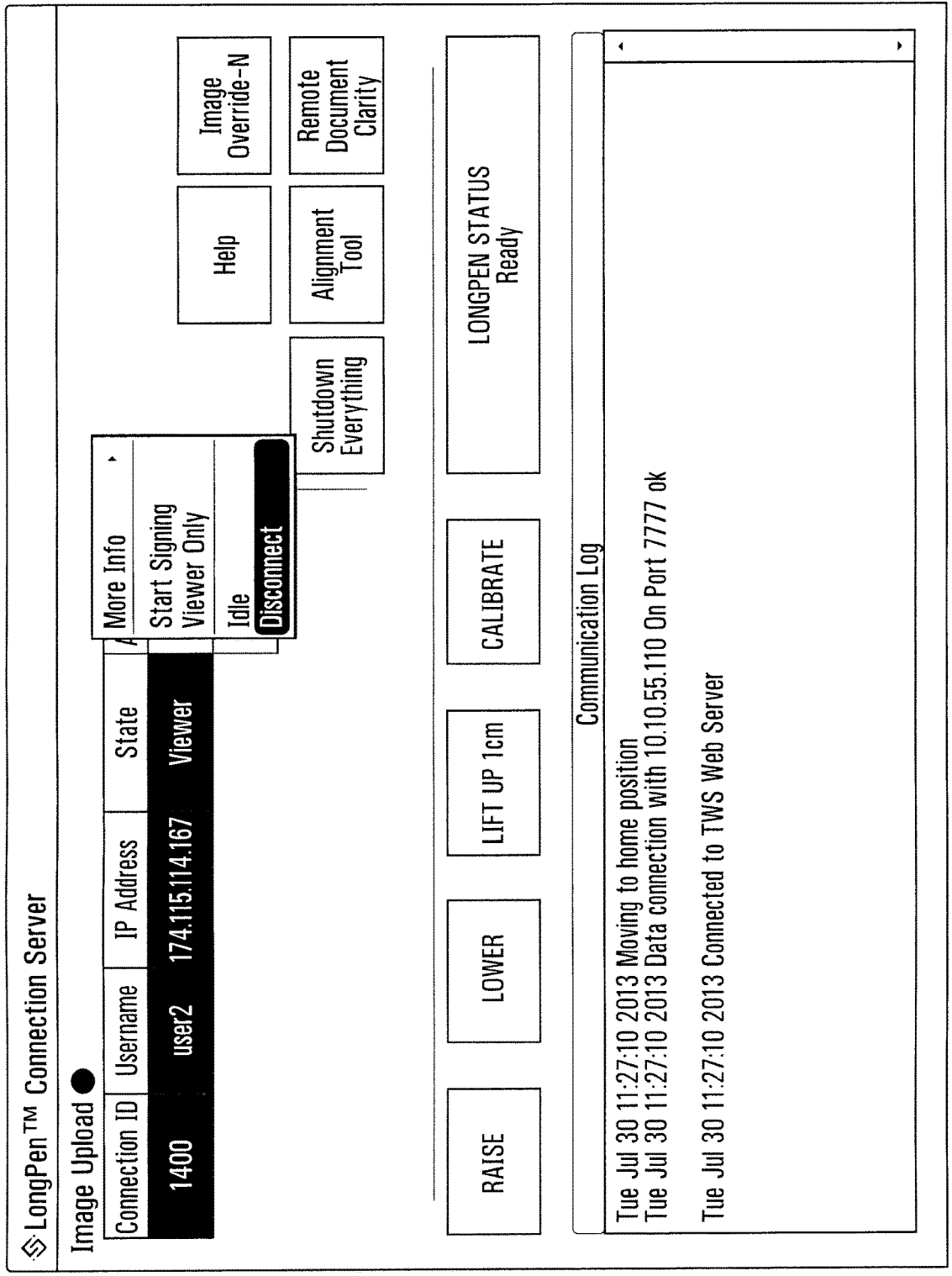

When the documents have been signed by all required users, the operator may disconnect all connected devices to system 10, for example the tablets the users may have used to log into server 30, by clicking on a button, for example the action button as shown in FIG. 53, and then clicking on "Disconnect" for each connection. The record indicating the connection of the user's device, for example a tablet, may disappear from the table displayed on the plotting application as the tablet may be disconnected. The user may have to reconnect through the user application launched on the tablet in order to sign more documents once the user may have been disconnected.

In some embodiments, plotting apparatus 20 may appear to not have calibrated the first time it was started by the operator. If this issue occurs, the operator may check that the green power light on the surface of plotting apparatus 20 is active as well as that the camera associated with plotting apparatus 20 and the USB connectors of plotting apparatus 20 may be plugged in correctly.

In some embodiments, the user may state that where he or she applied handwritten strokes on the device, for example a tablet, may not where plotting apparatus wrote on the paper to be plotted. If this issue occurs, the operator may run the alignment application as described herein to realign plotting apparatus 20. The user may have to sign into the user application again.

In some embodiments, it may appear that there may be no response when the user provides a handwritten signature on the tablet. If this issue occurs, the operator may verify that the user may be connected to server 30 and the operator has changed their user application to a signing state. The operator may also ensure that the user's connection (e.g. a VPN connection) may still be active on the tablet.

In some embodiments, there may be an error message saying that the plotting application fails to connect to server 30. If this issue occurs, the operator may ensure that plotting apparatus 20 controller module, which may be installed on server 30 or an independent computing device, has proper access to network 60 and the plotting apparatus 20.

In some embodiments, it may appear that the user may be disconnected without the operator having completed the session. If this issue occurs, it may be due to a time limit set on each connection in order to avoid a buildup of connections to the plotting application.

In some embodiments, the time limit set on each connection may be a pre-determined duration, such as two hours.

The present system and method may be practiced on computer devices including a desktop computer, laptop computer, tablet computer or wireless handheld having the ability to connect with the Internet and/or various social networking platforms and/or promotional offer inventory systems. In some embodiments, the systems and methods may be performed on distributed networking devices, such as devices arranged in a "cloud computing" implementation.

The computing device components may be connected in various ways including directly coupled, indirectly coupled via a network, and distributed over a wide geographic area and connected via a network (which may be referred to as "cloud computing").

For example, and without limitation, a computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods and processes described herein.

As will be further understood by those skilled in the relevant arts, significant advantage may be realized through the full or partial automation of any of the processes described above, or portions thereof. Such automation may be provided in any suitable manner, including for example the use of automatic data processors executing suitably-configured, coded, machine-readable instructions using a wide variety of devices, some of which are known and others of which will doubtless be developed hereafter. Processor(s) suitable for use in such implementations can comprise any one or more data processor(s), computer(s), and/or other system(s) or device(s), and necessary or desirable input/output, communications, control, operating system, and other devices or components, including software, that are suitable for accomplishing the purposes described herein. For example, a suitably-programmed general-purpose data processor provided on one or more circuit boards will suffice.

The present system and method may also be implemented as a computer-readable/useable medium that includes computer program code to enable one or more computer devices to implement each of the various process steps in a method in accordance with the present disclosure. In case of more than computer devices performing the entire operation, the computer devices are networked to distribute the various steps of the operation.

It is understood that the terms computer-readable medium or computer useable medium comprises one or more of any type of physical embodiment of the program code. In particular, the computer-readable/useable medium can comprise program code embodied on one or more portable storage articles of manufacture (e.g., an optical disc, a magnetic disk, a tape, etc.), on one or more data storage portioned of a computing device, such as memory associated with a computer and/or a storage system.

The mobile application of the present disclosure may be implemented as a web service, where the mobile device includes a link for accessing the web service, rather than a native application.

The functionality described may be implemented to various mobile platforms, including but not limited to the iOS™ platform, ANDROID™, WINDOWS™ or BLACK-BERRY™.

It will be appreciated by those skilled in the art that other variations of the embodiments described herein may also be practiced without departing from the scope of the disclosure. Other modifications are therefore possible.

In further aspects, the disclosure provides systems, devices, methods, and computer programming products, including non-transient machine-readable instruction sets, for use in implementing such methods and enabling the functionality described previously.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or step.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the disclosure, the scope of which is defined by the claims.

What is claimed is:

1. A system for generating a limited edition of a signed object, the system comprising:

an electronic database storing electronic data representative of a plurality of handwritten signatures and a plurality of handwritten numbers of a user associated with a user ID;
a signing component;
a server comprising a processor configured to:
detect or receive an object for signing;
receive or determine signature information regarding the object, the signature information comprising the user ID, an edition number associated with the object, and a total number of limited editions of the object;
determine a composition of a composite signature, the composite signature comprising one handwritten signature of the plurality of handwritten signatures, the edition number associated with the object, and the total number of limited editions of the object;
obtain the handwritten signature from the plurality of handwritten signatures stored in the database based on the user ID;
obtain a handwritten number of the plurality of handwritten numbers corresponding to the edition number associated with the object, and a second handwritten number of the plurality of handwritten numbers corresponding to the total number of limited editions of the object based on the user ID;
determine a location and a size for the composite signature; and
apply the composite signature on the object, by the signing component, based on the determined location and size of the composite signature.

2. The system of claim 1, wherein the signing component comprises a plotting apparatus.

3. The system of claim 2, wherein the plotting apparatus comprises a plotting instrument and a plotting surface upon which the object is placed for signing.

4. The system of claim 1, wherein the processor is configured to apply the handwritten signature from the plurality of handwritten signatures only once to the object.

5. The system of claim 1, wherein the processor is configured to apply the handwritten number of the plurality of handwritten numbers only once to the object.

6. The system of claim 1, wherein the signing component is configured to apply the composite signature digitally on the object.

7. The system of claim 4, wherein the processor is configured to remove the handwritten signature from the plurality of handwritten signatures stored in the database once the handwritten signature has been applied to the object.

8. The system of claim 1, wherein the processor is configured to reject the object for signing when the total number of limited editions of the object exceeds a total number of the plurality of handwritten numbers stored in the database.

9. The system of claim 1, wherein the processor is configured to determine the edition number associated with the object based on one or more of the plurality of handwritten numbers available for application to the object.

10. The system of claim 1, further comprising a device configured to receive electronic signals representative of one or more of the plurality of handwritten signatures, or one or more of the plurality of handwritten numbers.

11. A computer-implemented method for generating a limited edition of a signed object, the method comprising:
receiving or detecting an object for signing;

receiving or determining signature information regarding the object, the signature information comprising a user ID, an edition number associated with the object, and a total number of limited editions of the object;

determining a composition of a composite signature, the composite signature comprising one handwritten signature of a plurality of handwritten signatures stored in a database, the edition number associated with the object, and the total number of limited editions of the object;

obtaining the handwritten signature from the plurality of handwritten signatures based on the user ID;

obtaining a handwritten number of the plurality of handwritten numbers corresponding to the edition number associated with the object, and a second handwritten number of the plurality of handwritten numbers corresponding to the total number of limited editions of the object based on the user ID;

determining a location and a size for the composite signature; and applying the composite signature on the object, by a signing component, based on the determined location and size of the composite signature.

12. The method of claim 11, wherein applying the composite signature on the object comprises controlling a plotting apparatus to applying the composite signature on the object.

13. The method of claim 12, wherein the plotting apparatus comprises a plotting instrument and a plotting surface upon which the object is placed for signing.

14. The method of claim 11, wherein the handwritten signature from the plurality of handwritten signatures is applied only once to the object.

15. The method of claim 11, wherein the handwritten number of the plurality of handwritten numbers is applied only once to the object.

16. The method of claim 11, comprising digitally applying the composite signature on the object.

17. The method of claim 14, comprising removing the handwritten signature from the plurality of handwritten signatures stored in the database once the handwritten signature has been applied to the object.

18. The method of claim 11, comprising rejecting the object for signing when the total number of limited editions of the object exceeds a total number of the plurality of handwritten numbers stored in the database.

19. The method of claim 11, comprising determining the edition number associated with the object based on one or more of the plurality of handwritten numbers available for application to the object.

20. The method of claim 11, comprising receiving, from a remote device, electronic signals representative of one or more of the plurality of handwritten signatures, or one or more of the plurality of handwritten numbers.

* * * * *